(12) United States Patent
Banerjee et al.

(10) Patent No.: US 11,798,254 B2
(45) Date of Patent: Oct. 24, 2023

(54) BANDWIDTH LIMITED CONTEXT BASED ADAPTIVE ACQUISITION OF VIDEO FRAMES AND EVENTS FOR USER DEFINED TASKS

(71) Applicant: Northwestern University, Evanston, IL (US)

(72) Inventors: Srutarshi Banerjee, Chicago, IL (US); Henry H. Chopp, Glencoe, IL (US); Juan Gabriel Serra Pérez, Evanston, IL (US); Zihao Wang, Evanston, IL (US); Oliver Strider Cossairt, Evanston, IL (US); Aggelos K. Katsaggelos, Chicago, IL (US)

(73) Assignee: Northwestern University, Evanston, IL (US)

( * ) Notice: Subject to any disclaimer, the term of this patent is extended or adjusted under 35 U.S.C. 154(b) by 7 days.

(21) Appl. No.: 17/462,423

(22) Filed: Aug. 31, 2021

(65) Prior Publication Data

US 2022/0067417 A1  Mar. 3, 2022

Related U.S. Application Data

(60) Provisional application No. 63/073,313, filed on Sep. 1, 2020.

(51) Int. Cl.
*G06V 10/25* (2022.01)
*G06T 7/277* (2017.01)
(Continued)

(52) U.S. Cl.
CPC .............. *G06V 10/25* (2022.01); *G06T 7/277* (2017.01); *G06V 20/52* (2022.01); *H04N 7/183* (2013.01);
(Continued)

(58) Field of Classification Search
None
See application file for complete search history.

(56) References Cited

U.S. PATENT DOCUMENTS

| 2015/0131715 A1* | 5/2015 | Ozawa | H04N 19/102 |
| | | | 375/240.02 |
| 2019/0043207 A1* | 2/2019 | Carranza | G06V 20/62 |

(Continued)

FOREIGN PATENT DOCUMENTS

| AU | 2008264196 A1 * | 7/2010 | ........... G11B 27/034 |
| KR | 10-2018-0038196 * | 4/2018 | ............ G06Q 30/06 |

OTHER PUBLICATIONS

Noor and E. L. Jacobs, "Adaptive compressive sensing algorithm for video acquisition using single pixel camera," *SPIE J. Electronic Imaging*, vol. 22, No. 2, pp. 021013-021013, Jul. 2013.
(Continued)

*Primary Examiner* — Lindsay J Uhl
(74) *Attorney, Agent, or Firm* — Bell & Manning, LLC

(57) ABSTRACT

A system to process imaging data includes an imaging system configured to capture image data and event data of a scene, compress the image data and the event data, and transmit the compressed image data and compressed event data to a host. The host is operatively coupled to the imaging system, and includes a processor configured to perform object detection on the compressed image data and the compressed event data to identify one or more objects. The processor is also configured to perform object tracking on the one or more objects. The processor is also configured to predict one or more regions of interest for subsequent data capture based on the object detection and the object tracking. The processor is further configured to provide the one or more regions of interest to the imaging system to control capture of additional image data and additional event data by the imaging system.

18 Claims, 38 Drawing Sheets

(51) Int. Cl.
| | |
|---|---|
| *H04N 19/96* | (2014.01) |
| *H04N 19/176* | (2014.01) |
| *H04N 19/46* | (2014.01) |
| *H04N 19/132* | (2014.01) |
| *H04N 19/147* | (2014.01) |
| *H04N 19/167* | (2014.01) |
| *H04N 7/18* | (2006.01) |
| *G06V 20/52* | (2022.01) |
| *H04N 23/61* | (2023.01) |
| *H04N 23/60* | (2023.01) |

(52) U.S. Cl.
CPC ........... *H04N 7/188* (2013.01); *H04N 19/132* (2014.11); *H04N 19/147* (2014.11); *H04N 19/167* (2014.11); *H04N 19/176* (2014.11); *H04N 19/46* (2014.11); *H04N 19/96* (2014.11); *H04N 23/61* (2023.01); *H04N 23/64* (2023.01); *G06T 2207/20084* (2013.01); *G06T 2207/20192* (2013.01); *G06T 2207/30232* (2013.01)

(56) References Cited

U.S. PATENT DOCUMENTS

| | | | | |
|---|---|---|---|---|
| 2019/0222652 | A1* | 7/2019 | Graefe | H04L 67/12 |
| 2020/0007889 | A1* | 1/2020 | Chao | H04N 19/423 |
| 2021/0101791 | A1* | 4/2021 | Ishizaki | G06V 40/10 |
| 2021/0168372 | A1* | 6/2021 | Zhao | H04N 19/17 |
| 2021/0223780 | A1* | 7/2021 | Bramley | G06V 10/82 |

OTHER PUBLICATIONS

S. Ren, K. He, R. Girshick and J. Sun, "Faster R-CNN: Towards Real-Time Object Detection with Region Proposal Networks," in *IEEE Transactions on Pattern Analysis and Machine Intelligence*, vol. 39, No. 6, pp. 1137-1149, Jun. 1, 2017.

J. Chen, X. Zhang, and H. Meng, "Self-adaptive sampling rate assignment and image reconstruction via combination of structured sparsity and non-local total variation priors," *Digital Signal Processing*, vol. 29, pp. 54-66, Jun. 2014.

R. Koller et al., "High Spatio-Temporal Resolution Video with Compressed Sensing," *Opt. Express* vol. 23, Iss. 12, pp. 15992-16007, 2015.

Michael Iliadis, Leonidas Spinoulas, and Aggelos K Katsaggelos, "Deep fully-connected networks for video compressive sensing,". *Digital Signal Processing*, 72:9-18, 2018.

Henri Rebecq, Guillermo Gallego, Elias Mueggler, and Davide Scaramuzza. Emvs: "Event-based multi-view stereo—3d reconstruction with an event camera in real-time," *International Journal of Computer Vision*, 126(12):1394-1414, 2018.

* cited by examiner

| Sequence | Bit Rate (%) | PSNR (dB) | SSIM |
|---|---|---|---|
| Airplane Sequence | 0.75 | 26.4150 | 0.8962 |
| | 1.00 | 28.4576 | 0.9166 |
| | 1.50 | 32.1420 | 0.9477 |
| | 2.00 | 35.0587 | 0.9639 |
| | 3.00 | 37.7115 | 0.9745 |
| | 5.00 | 39.5348 | 0.9809 |
| | 7.00 | 40.1643 | 0.9836 |
| | 10.00 | 40.5849 | 0.9852 |
| | 25.00 | 41.1766 | 0.9867 |
| Boat Sequence | 0.75 | 16.7498 | 0.4214 |
| | 1.00 | 17.9076 | 0.4411 |
| | 1.50 | 20.2070 | 0.4685 |
| | 2.00 | 21.8621 | 0.5301 |
| | 3.00 | 23.8621 | 0.5963 |
| | 5.00 | 25.0364 | 0.6713 |
| | 7.00 | 26.3222 | 0.7194 |
| | 10.00 | 27.8823 | 0.7724 |
| | 25.00 | 32.5498 | 0.8964 |
| Car Sequence | 0.75 | 22.1733 | 0.7390 |
| | 1.00 | 24.2945 | 0.7683 |
| | 1.50 | 27.8283 | 0.8335 |
| | 2.00 | 29.7073 | 0.8609 |
| | 3.00 | 32.3193 | 0.9018 |
| | 5.00 | 35.0724 | 0.9348 |
| | 7.00 | 36.8468 | 0.9508 |
| | 10.00 | 38.5461 | 0.9638 |
| | 25.00 | 40.6701 | 0.9795 |

Fig. 27

Car Sequence

Watercraft Sequence

Airplane Sequence

Fig. 41

| Sequence | $T_{error}$ | | | CR (bit rate ratio) | | |
|---|---|---|---|---|---|---|
| | 8 | 16 | 24 | 8 | 16 | 24 |
| Indoor3 | 0.269 | 0.134 | 0.089 | 1029.63 | 944.44 | 890.41 |
| Outdoor5 | 0.149 | 0.076 | 0.051 | 41.84 | 40.68 | 39.65 |
| Outdoor9 | 0.183 | 0.089 | 0.062 | 45.03 | 44.23 | 43.46 |

Fig. 42

| Sequence | Bit Rate (Mbps) | PSNR (dB) | SSIM | $T_{error}$ | CR (bit rate) |
|---|---|---|---|---|---|
| Indoor3 | 0.5 | 43.07 | 0.9999 | 0.177 | 994.41 |
| | 0.3 | 41.71 | 0.9999 | 0.197 | 1048.16 |
| | 0.1 | 38.97 | 0.9999 | 0.200 | 1447.97 |
| Outdoor5 | 0.5 | 33.90 | 0.9895 | 0.510 | 47.63 |
| | 0.3 | 32.70 | 0.9868 | 0.566 | 50.30 |
| | 0.1 | 31.37 | 0.9778 | 0.684 | 59.97 |
| Outdoor9 | 0.5 | 30.99 | 0.9935 | 0.5580 | 52.90 |
| | 0.3 | 30.08 | 0.9919 | 0.6093 | 56.49 |
| | 0.1 | 28.75 | 0.9879 | 0.7055 | 65.89 |

| Sequence | PDR ($r_4$) | PSNR (dB) | SSIM | $T_{error}$ | CR (bit rate) |
|---|---|---|---|---|---|
| Indoor3 | 1 | 41.71 | 0.9999 | 0.197 | 1048.16 |
| | 2 | 39.52 | 0.9999 | 0.230 | 1117.74 |
| | 3 | 37.91 | 0.9999 | 0.257 | 1158.69 |
| Outdoor5 | 1 | 32.70 | 0.9868 | 0.566 | 50.30 |
| | 2 | 30.82 | 0.9741 | 0.712 | 60.40 |
| | 3 | 30.02 | 0.9661 | 0.783 | 69.21 |
| Outdoor9 | 1 | 30.08 | 0.9919 | 0.609 | 56.49 |
| | 2 | 27.32 | 0.9819 | 0.801 | 72.00 |
| | 3 | 25.93 | 0.9742 | 0.898 | 86.39 |

Fig. 43

BANDWIDTH LIMITED CONTEXT BASED ADAPTIVE ACQUISITION OF VIDEO FRAMES AND EVENTS FOR USER DEFINED TASKS

CROSS-REFERENCE TO RELATED APPLICATIONS

The present application claims priority to U.S. provisional patent application No. 63/073,313 that was filed Sep. 1, 2020, the entire contents of which are incorporated herein by reference.

REFERENCE TO GOVERNMENT RIGHTS

This invention was made with government support under HR0011-17-2-0044 awarded by the DARPA. The government has certain rights in the invention.

BACKGROUND

Event cameras refer to a type of camera that include sensors which capture visual information about a scene in a significantly different way than traditional cameras. Instead of outputting intensity signals as is done by the sensors in traditional cameras, event cameras are designed to compare the difference between a current log intensity state and the previous state, and to fire an event when the difference exceeds a firing positive or negative threshold. Compared to traditional cameras, event sensing provides several benefits such as low latency operation of individual pixels, high dynamic range, reduced redundant capturing of static scenes, and low power consumption.

SUMMARY

An illustrative system to process imaging data includes an imaging system configured to capture image data and event data of a scene, compress the image data and the event data, and transmit the compressed image data and the compressed event data to a host. The host is operatively coupled to the imaging system, and includes a processor configured to perform object detection on the compressed image data and the compressed event data to identify one or more objects. The processor is also configured to perform object tracking on the one or more objects. The processor is also configured to predict one or more regions of interest for subsequent data capture based on the object detection and the object tracking. The processor is further configured to provide the one or more regions of interest to the imaging system to control capture of additional image data and additional event data by the imaging system.

In some embodiments, the imaging system compresses the image data and the event data with quadtree compression. For example, the imaging system can perform a quadtree decomposition of the image data and the event data to form quadtree blocks as part of the quadtree compression. The imaging system can also be configured to spatially sample the event data based at least in part on a size of the quadtree blocks to provide spatial redundancy of the event data. The imaging system can also be configured to discretize timestamps corresponding to the event data to provide temporal redundancy of the event data. In an illustrative embodiment, the imaging system is configured to minimize a weighted rate distortion of the event data to perform the quadtree decomposition. In such an embodiment, the weighted rate distortion is normalized over an area that includes at least a portion of the one or more regions of interest. The imaging system can use a dynamic Viterbi algorithm to minimize the weighted rate distortion of the event data. In another illustrative embodiment, each of the quadtree blocks includes one or more skip modes, one or more acquire modes, and a value for each of the one or more acquire modes.

In another embodiment, the image data comprises distorted intensity data, and the object detection is performed through a faster region-based convolutional neural network. The object tracking can be performed with a Kalman filter based object tracker. In some embodiments, the processor is configured to perform edge reconstruction to correct distorted edges of the one or more objects. Also, in some embodiments, the prediction of the one or more regions of interest includes a prediction of one or more first regions of interest based on the image data and a prediction of one or more second regions of interest based on the event data. The processor can fuse the one or more first regions of interest and the one or more second regions of interest to form the one or more regions of interest that are provided to the imaging system. The one or more regions of interest can be provided to the imaging system in the form of one or more bounding box locations.

An illustrative method of processing imaging data includes capturing, by an imaging system, image data and event data of a scene. The method also includes compressing, by the imaging system, the image data and the event data. The method also includes transmitting, by the imaging system, the compressed image data and the compressed event data to a host. The method also includes performing, by a processor of the host, object detection on the compressed image data and the compressed event data to identify one or more objects. The method also includes performing, by the processor, object tracking on the one or more objects. The method also includes predicting one or more regions of interest for subsequent data capture based on the object detection and the object tracking. The method further comprises providing the one or more regions of interest to the imaging system to control capture of additional image data and additional event data by the imaging system.

In some embodiments, the compressing comprises performing a quadtree decomposition of the image data and the event data to form quadtree blocks. The method can also include spatially sampling the event data based at least in part on a size of the quadtree blocks to provide spatial redundancy of the event data. The method can also include minimizing a weighted rate distortion of the event data to perform the quadtree decomposition. The method can further include discretizing, by the imaging system, timestamps corresponding to the event data to provide temporal redundancy of the event data.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 27 is a table that shows the variations of the distortions as PSNR and SSIM metrics computed for the sequences at different bit rates in accordance with an illustrative embodiment.

FIG. 41 is a table that shows the CR and average $T_{error}$ over the sequence in accordance with an illustrative embodiment.

FIG. 42 is a performance table that shows the results of varying intensity bit rate in accordance with an illustrative embodiment.

FIG. 43 is a table showing performance with varying PDR and $T_{bin}$ in accordance with an illustrative embodiment.

DETAILED DESCRIPTION

Figure 1:
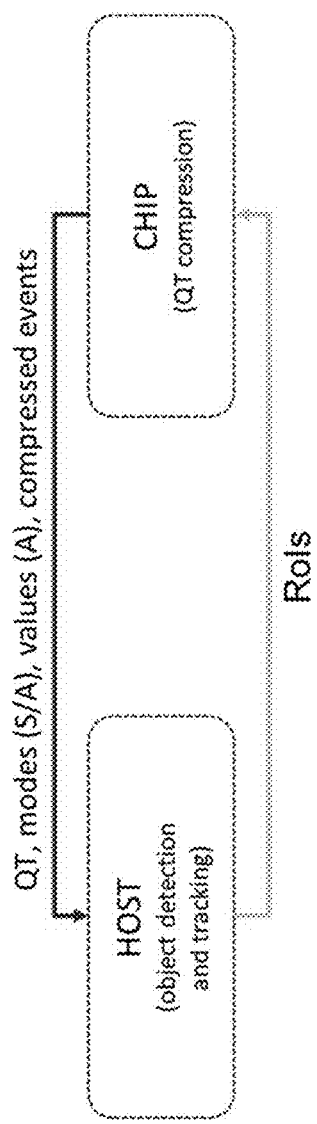
FIG. 1 depicts a framework implemented as a prediction-correction feedback system in accordance with an illustrative embodiment.

One of the embodiments described herein is directed to an adaptive multi-modal intensity-event algorithm to optimize an overall objective of object tracking under bit rate constraints for a host-chip architecture. In an illustrative embodiment, the chip is a computationally resource constrained device acquiring high resolution intensity frames and events, while the host is capable of performing computationally expensive tasks. A joint intensity-neuromorphic event rate-distortion compression framework with a quadtree (QT) based compression of intensity and events scheme were developed. The data acquisition on the chip is driven by the presence of objects of interest in the scene as detected by an object detector. The most informative intensity and event data are communicated to the host under rate constraints, so that the best possible tracking performance is obtained. The detection and tracking of objects in the scene are done on the distorted data at the host. Intensity and events are jointly used in a fusion framework to enhance the quality of the distorted images, so as to improve the object detection and tracking performance. The performance assessment of the overall system is done in terms of the multiple object tracking accuracy (MOTA) score. Compared to using intensity modality only, there is an improvement in MOTA using both these modalities in different scenarios.

The proposed system focuses on the problem of optimal information extraction for a particular task from multiple modalities using high resolution imaging sensors, specifically Red-Green-Blue (RGB) and event sensors. For high resolution sensors, the data generated result in high bit rates (often >1 Gbits/s). Primary challenges for such systems are the storage and transmission of the data over communication networks. In practice, the available data bandwidth is often limited and time varying, due to various factors, such as, lossy transmission media, and network traffic. This is further complicated due to transmission of data in multiple modalities, such as RGB-infrared, RGB-events.

Event cameras include sensors which capture visual information in a drastically different form, as compared to traditional cameras. Instead of outputting the intensity signals as in traditional cameras, they compare the difference between the current log intensity state and the previous state, and fire an event when it exceeds the firing positive or negative threshold. Compared to traditional cameras, event sensing provides several benefits such as low latency operation of individual pixels, high dynamic range, reduced redundant capturing of static scenes, and low power consumption.

The issue of selecting task specific appropriate data from either modality is critical. This problem can be framed as a rate-distortion optimization one in multiple modalities prior to transmitting data. While there can be enough computational power on the chip (remote device on the field) for processing data, followed by transmitting only vital information, the proposed framework is based on a host-chip architecture, where the chip is resource constrained to perform limited computations. It may be argued that multiple modalities represent redundant information in the scene. However, this is not the case as different imaging modalities capture data in different methods and forms and each modality provides complimentary information to the other modalities. Additionally, processing algorithms rely on joint modalities to improve upon their performance.

Rate-distortion or resource allocation optimization has been a fundamental approach, addressed mostly for video/image compression and transmission over the last few decades. However, in recent years, with the advancement of other imaging modalities, the fundamental rate-distortion formulation needs to be effectively addressed especially for the multi-modality imaging framework, with intensity—event modality being one such multi-modal system. There has been no prior work addressing the joint rate-distortion optimization for intensity-event modalities. The proposed methods develop a host-chip framework to optimize the rate-distortion equation together with the reconstruction algorithms for object detection and tracking based on both these modalities. While compression of these data can be done in several ways, one option is to use a QT decomposition of the intensity-event volume. The QT structure has been used as QT based block compression schemes fit into popular encoding schemes. The architecture is based on a host-chip model, with the chip being the computationally constrained imager on the field, while the host acts as a server with high computational power. While this system has the flexibility of optimizing any end to end task, in this work, object tracking is the goal. As discussed in more detail below, the proposed techniques jointly solve the rate-distortion problem for the intensity and asynchronous event modalities in a continuous spatio-temporal volume incorporating QT compression and lossy event compression strategy (on the chip), together with a reconstruction algorithm for object detection and tracking. In an illustrative embodiment, the host reconstructs intensity frames with the aid of events, followed by object detection and tracking separately in intensity and event modalities, before finally fusing them.

The proposed system includes development of a host-chip architecture for optimal information extraction using intensity and event modalities in a computationally resource constrained chip and bandwidth constrained communication channel. The system also includes development of resource allocation and a joint intensity and event rate-distortion framework on chip. The proposed system further involves development of detection and tracking in intensity and event modalities separately with a late fusion model. Task-specific processing of distorted intensity and events for object tracking is also performed.

In one embodiment, the system architecture includes a host and a chip for object detection and tracking in a multi-modal framework. The multiple modalities used can include the grayscale intensity and neuromorphic events. While grayscale intensity frames are generated at a fixed frame rate, the events are inherently asynchronous in nature, with each event represented as (x, y, t, p), where (x, y) is the position, t is the timestamp, and p is the polarity. FIG. 1 depicts a framework implemented as a prediction-correction feedback system in accordance with an illustrative embodiment. The system of FIG. 1 is able to work with synchronous (frame-based) and asynchronous data under the constraints of a limited bandwidth channel capacity B between the host and the chip, remotely deployed in the field. The host predicts the Regions of Interest (RoIs) in a frame and updates its prediction based on the data received from the chip. The chip acquires high resolution intensity frames at every time t and corresponding events in a scene asynchronously.

The communication bandwidth between the chip and host is limited. In such a scenario, it is not possible for the chip to transmit all the captured intensity and event data to the host. The intensity and event data are compressed using a QT structure in an optimal rate-distortion sense. For the intensity frames, the QT, modes of leaves (skip or acquire) and pixel values corresponding to the acquire mode are sent to the host. On the other hand, the asynchronous events are first quantized in time and then sampled as per the Poisson Disk Sampling method. The sampled events are then compressed as per the QT blocks before being transmitted to the host. The host reconstructs the distorted intensity frames and events based on the data sent by the chip and the previous reconstructed intensity frame. The reconstructed intensity frames and events are used for enhancing the reconstructed frame, object detection and tracking in intensity and event modalities in order to extract the regions of interest (RoIs) in each modality. The RoIs from each modality are fused to predict the overall RoIs at the next time instance t+1, which are then sent to the chip. FIG. 1 shows the predictive-corrective feedback loop between the chip and the host.

Figure 2:
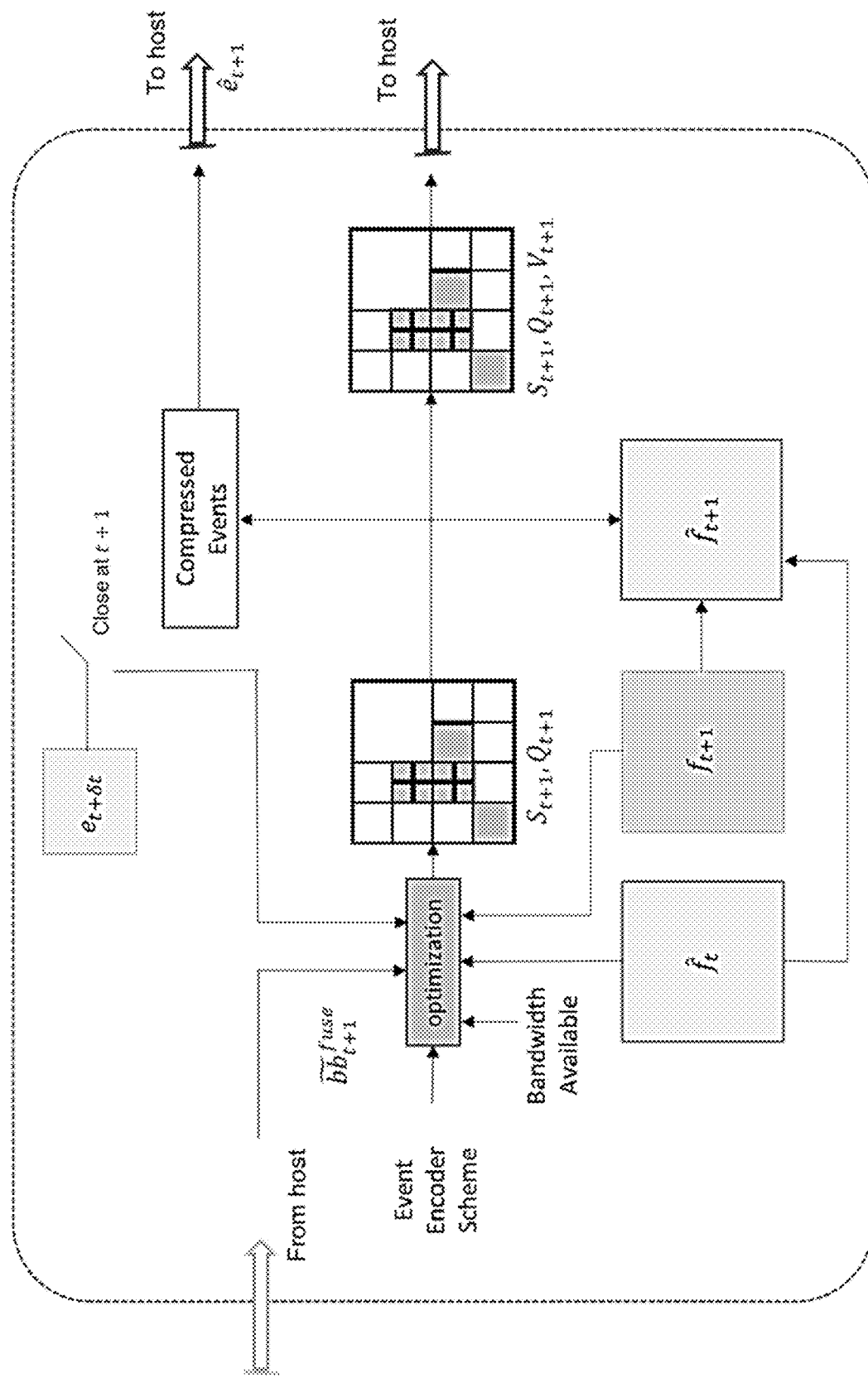
FIG. 2 shows a chip architecture in accordance with an illustrative embodiment.

FIG. 2 shows a chip architecture in accordance with an illustrative embodiment. The undistorted grayscale frame at t+1, $f_{t+1}$ and events between time t and t+1, $e_{t+1}$ captured by the chip occupy high communication bandwidth. Hence, the data can be compressed before transmitting them from the chip to the host. A QT based compression of the intensity frame and events can be used for compression. Alternatively, a different compression technique may be used. The optimal QT structure, $S_{t+1}$, is obtained by jointly solving the rate-distortion equation for both intensity and events by taking into account the priority regions $bb_{t+1}^{fuse}$ as well. The priority regions $bb_{t+1}^{fuse}$ is computed on the host based on the intensity and event data sent from the chip. The host computed $bb_{t+1}^{fuse}$ is sent to the chip before every time instance t+1. The rate-distortion optimization is solved using dynamic programming based Viterbi optimization. For the intensity modality, the Viterbi optimization also generates skip-acquire modes $Q_{t+1}$, corresponding to the QT leaves. For the acquire mode in the QT, the superpixel values $V_{t+1}$ for the leaves of QT are obtained from $f_{t+1}$. The events are sampled and compressed based on the QT using Huffman and run length encoding, generating compressed coded events $e_{t+1}$. $S_{t+1}$, $Q_{t+1}$, $V_{t+1}$ along with $\hat{e}_{t+1}$ are sent from the chip to the host. The distorted frame $\hat{f}_t$ at time t stored in the chip, is used for computation at time t+1.

The communication bandwidth between chip and host limits the amount of data to be transferred between them. Moreover, due to the presence of image and events modalities, the optimal allocation of bits among these two modalities is critical. The inventors have previously performed dynamic programming based Viterbi optimization for controlling the trade-off between the frame distortion and bit rate for the intensity modality only. This Viterbi optimization framework is extended for performing rate-distortion optimization on both intensity and event modalities. Additionally, the algorithm determines the optimal bit rate allocation between intensity and events in order to minimize the total distortion. The number of bits allocated to intensity and events depends on the compression strategies applied to them. For a pixel intensity value corresponding to the acquire mode, 8 bits are used to represent it. On the other hand, the events are first sampled using the Poisson disk sampling method in the QT along with Huffman and run length encoding. As discussed, in the proposed system, the QT has been obtained by joint rate-distortion optimization on both intensity and event modalities considering the event compression strategy in each QT block.

The event timestamps are truncated to place the events spatially into N temporal bins, (N chosen to be equal to 4 in the experiments, but other values may be used). One event volume with N temporal bins is considered in the QT blocks with the Poisson disk sampling technique having Poisson Disk Radius (PDR), r, to sample events in the QT blocks. In this compression scheme, smaller r is chosen for smaller blocks and larger r for larger blocks, and as the system prioritizes smaller blocks over larger blocks, more events are sampled relatively from smaller blocks. PDR was applied for QT blocks of size ≥4. For QT blocks of size smaller than 4, one can consider all events as important and sample them all.

In general, it is possible to choose different r candidate values for each QT block and then optimize over the entire QT and r. However, the larger the number of candidate r values, the larger the required number of computations. In general, one can have $M_\tau$ values for the PDR, r, r, ..., r to be optimized in addition to $N_\tau$ leaves of the QT, where $M_\tau \leq N_\tau$. The total distortion (D) is the sum of the intensity frame distortion ($D_i$) and event distortion ($D_e$), over each leaf x of the QT and PDR value r, $$D(x,r)=D_i(x)+D_e(x,r), \quad (1)$$

where $x \in \{x_0, x_1, \ldots x_{N_\tau-1}\}$ and $r \in \{r_0, r_1, \ldots, r_{N_\tau-1}\}$.

Similarly, the total rate (Ra) is the sum of the intensity frame rate ($R_i$) and event rate ($R_e$), over each leaf x of the QT and PDR value r, that is, $$R_a(x,r)=R_i(x)+R_e(x,r) \quad (2)$$

Thus given a maximum bit rate $R_{max}$, one can formulate the following rate-distortion optimization problem $$\underset{x,r}{\operatorname{argmin}} D_i(x) + D_e(x, r), \text{ s.t. } R_i(x) + R_e(x, r) \leq R_{max} \quad (3)$$

The constrained discrete optimization problem of Eqn. 3 is solved using Lagrangian relaxation, leading to solutions in the convex hull of the rate-distortion curve for single modality. For dual modality, the Lagrangian cost function is, $$J_\lambda(x,r)=D_i(x)+D_e(x,r)+\lambda\{R_i(x)+R_e(x,r)\}, \text{ where } \lambda \geq 0 \quad (4)$$

where $\lambda \geq 0$ is a Lagrangian multiplier. Equation 4 can be rewritten as, $$J_\lambda(x_0, \ldots, x_{N_\tau-1}, r_0, \ldots, r_{M_\tau-1}) = D_i(x_0, \ldots, x_{N_\tau-1}) + D_e(x_0, \ldots, x_{N_\tau-1}, r_0, \ldots, r_{M_\tau-1}) + \lambda\{R_i(x_0, \ldots, x_{N_\tau-1}) + R_e(x_0, \ldots, x_{N_\tau-1}, r_0, \ldots, r_{M_\tau-1})\} \quad (5)$$

which can be written as the following minimization problem, $$\arg\min_{(x_0, \ldots, x_{N_\tau-1}, r_0, \ldots, r_{M_\tau-1})} G(x_0, \ldots, x_{N_\tau-1}, r_0, \ldots, r_{M_\tau-1}) \quad (6)$$

The goal is to solve Eqn. 6 using Dynamic Programming (DP) to find the optimal state sequence $x_0^*, x_1^*, \ldots, x_{N_{\tau-1}}^*$ over leaves of QT and $r_0^*, r_1^*, \ldots, r_{N_{\tau-1}}^*$, over PDR at each leaf. The PDR is optimized over $M_\tau$ leaves out of $N_\tau$ in the QT, where $M_\tau \leq N_\tau$. Considering $g_k^*(x_k, r_k)$ as the minimum cost up to epoch k, with $n_0$ is the root of the QT, and, $4^{N-n_0}-1 \geq k \geq 0$, one can write $$g_k^*(x_k, r_k) = \min_{(x_0, \ldots, x_k, r_0, \ldots, r_k)} \sum_{j=0}^{k} g(x_j, r_j) \quad (7)$$

where $$g(x_j, r_j) = j_\lambda(x_j, r_j) = d(x_j, r_j) + (\lambda \times r_a(x_j, r_j)) \quad (8)$$

is the Lagrangian cost function for the j th block with $d(x_j, r_j)$ and $r_a(x_j, r_j)$ being the distortion and rate respectively. Now, $$g_{k+1}^*(x_{k+1}, r_{k+1}) = \min_{(x_0, \ldots, x_{k+1}, r_0, \ldots, r_{k+1})} \sum_{j=0}^{k+1} g(x_j, r_j) = \min_{x_{k+1}, r_{k+1}} \left\{ \min_{(x_0, \ldots, x_k, r_0, \ldots, r_k)} \left[\sum_{j=0}^{k} g(x_k, r_k)\right] + g(x_{k+1}, r_{k+1}) \right\} \quad (9)$$

which results in the DP recursion formula shown in Eqn. 10 with $g_{k+1}^*(x_{k+1}, r_{k+1})$, the minimum cost up to epoch k+1, $$g_{k+1}^*(x_{k+1}, r_{k+1}) = \min_{x_{k+1}, r_{k+1}} \{g_k^*(x_k, r_k) + g(x_{k+1}, r_{k+1})\} = g_k^*(x_k, r_k) + \min_{x_{k+1}, r_{k+1}} g(x_{k+1}, r_{k+1}) \quad (10)$$

The DP forward recursion algorithm can be used to find the optimal state sequence. In every epoch (out of $4^{(N-n0)}$) in the Viterbi algorithm, the shortest path is found over the set of all admissible nodes of the previous epoch k−1 to every node in the set of admissible nodes in the current epoch k which are referred as "from" set $F_{l,i}$ "to" set $T_{l,i}$, where l and i are level and block of the QT. In each block there are p values of PDRs to choose from in order to optimize over r. The sequence of initialization, recursion, termination and backtracking for the forward DP algorithm has been followed in order to obtain the optimal state sequence $x_0^*$, $x_1^*, \ldots, x_{N_{\tau-1}}^*, r_0^*, r_1^*, \ldots, r_{N_{\tau-1}}^*$, For a given $\lambda$, $g(x_{k+1}, r_{k+1})$ in Eqn. 10 can be defined as:

$$g(x_{k+1}, r_{k+1}) = d_i(x_{k+1}) + d_e(x_{k+1}, r_{k+1}) + \lambda\{r_i(x_{k+1}) + r_e(x_{k+1}, r_{k+1})\} \quad (11)$$

Figure 3:
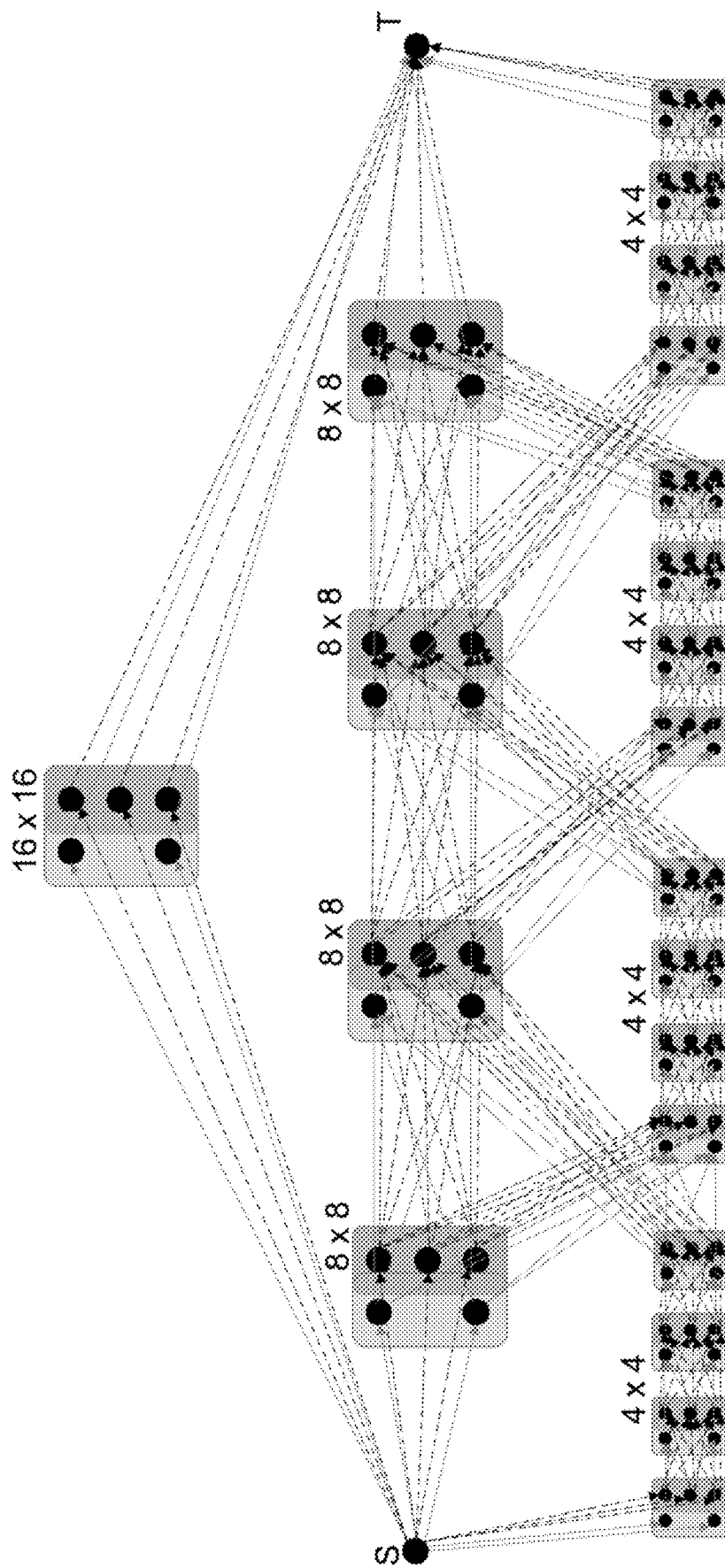
FIG. 3 represents a multi-level trellis for a 16×16 block of image (event) frame (N=4), with a QT segmentation developed down to level 2 ($n_0$=4×4) in accordance with an illustrative embodiment.

FIG. 3 represents a multi-level trellis for a 16×16 block of image (event) frame (N=4), with a QT segmentation developed down to level 2 ($n_0$=4×4) in accordance with an illustrative embodiment. In actual implementation, for a 512×512 frame, N=9 and $n_0$=0. Each QT node has intensity QT nodes and event QT nodes, denoted by left shaded portion and right shaded portion of the rectangles in FIG. 3, respectively. The transitions between the intensity QT nodes are shown in solid arrows while transition between the event QT nodes are shown in black dashed arrows. The number of nodes in the QT denotes the number of admissible states in the QT. Although there can be several nodes in the intensity QT and event QT nodes, for simplicity only 2 nodes are shown for the intensity QT (denoting skip/acquire modes) and 3 nodes in the event QT (denoting 3 candidate PDR values) at each node. The intensity rate $r_i(x_{k+1})$ for node $x_{k+1}$ is further sub-divided as the sum of $r_{seg}(x_{k+1})$, $r_{mode}(x_{k+1})$ and $r_v(x_{k+1})$ which are the bit rate allocated for the segmentation, skip/acquire modes and values for the intensity pixels in the acquire mode, respectively.

The distortion as described in Eqn. 1 can be described as the weighted average of the distortions at each leaf due to the intensity and event. The proposed system can add the weighted distortion on the events (with the weight parameter $w_e$) to the intensity distortion, that is, $$D_{Tot} = \sum_{i \in \Omega} \frac{w_i D_i(x_i)}{A_i} + w_e D_e(x_i, r_i) \quad (12)$$

where, $\Omega$ is the set of differently weighted regions. The distortion for the intensity differs for the skip/acquire modalities in each leaf node. The distortion for the events in each leaf node is described by Eqn. 13. $E_{org}(i, j)$ and $E_{dist}(i, j)$ are the aggregated event counts in pixel (i, j) along the temporal axis for the original (undistorted) and distorted events, respectively. $N_{bl,events}$ are the QT blocks containing events. The aggregation step is done without accounting for the polarity of the events. Thus, event count takes into account both positive and negative events.

$$D_e(x_i) = \sum_{(i,j) \in N_{bl,events}} (E_{org}(i,j) - E_{dist}(i,j)) \quad (13)$$

In order to operate the system at fixed bit rate (within certain tolerance), the $\lambda$ value in Eqn. 4 is adjusted in each frame. The optimal $\lambda^*$ is computed by a convex search in the Bezier curve, which accelerates convergence.

Figure 4:
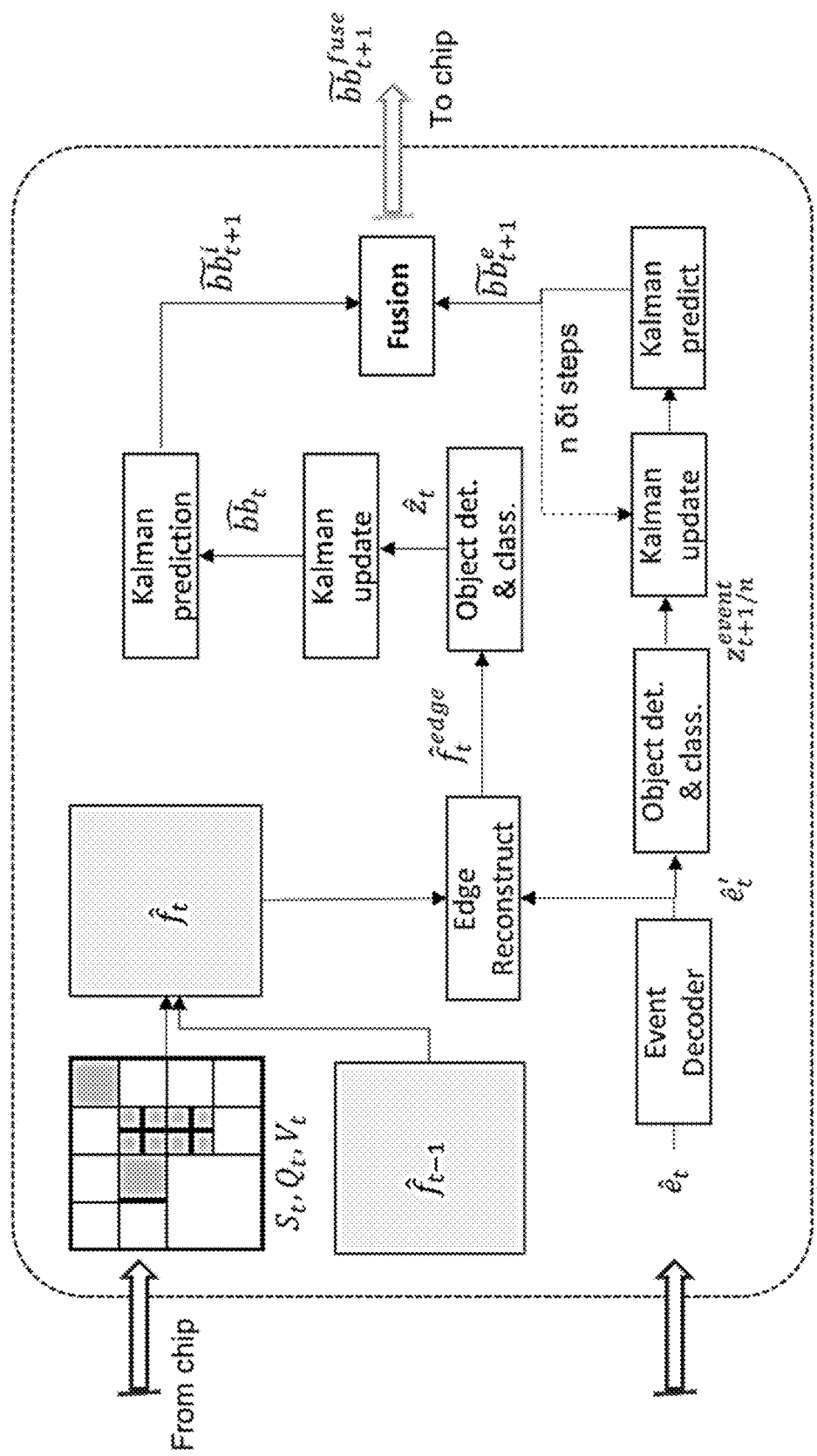
FIG. 4 shows computation on the host in accordance with an illustrative embodiment.

FIG. 4 shows computation on the host in accordance with an illustrative embodiment. The host receives from the chip QT, skip/acquire modes and values corresponding to the acquire modes at time t, denoted as $S_t$, $Q_t$ and $V_t$, respectively, along with compressed events $\hat{e}_t$. The reconstructed frame $\hat{f}_t$ is generated from $S_t$, $Q_t$, $V_t$ and the reconstructed frame $\hat{f}_{t-1}$ at t−1. The coded events $\hat{e}_t$ are decoded as $e_t^I$ which is an event-frame representation, before further processing. The values $e_t^I$ and $\hat{f}_t$ are used for refining the edges in the reconstructed frame $\hat{f}_t$ to create the enhanced frame $\hat{f}_t^{edge}$, which is then used for object detection and classification generating bounding boxes which are fed to a Kalman filter based tracker. The events $e_t^I$ are additionally used to perform object detection and classification n times between times t and t+1 before feeding them as observations to the Kalman filter-based tracker for generating bounding boxes every n timesteps between t and t+1. At time t+1, the predicted bounding boxes generated from the event based detections are fused with those from the intensity based detections to generate fused bounding boxes $\hat{f}_t^{edge}$, which are sent to the chip as priority regions for the Viterbi optimization. These operations are shown in FIG. 4.

Figure 5:
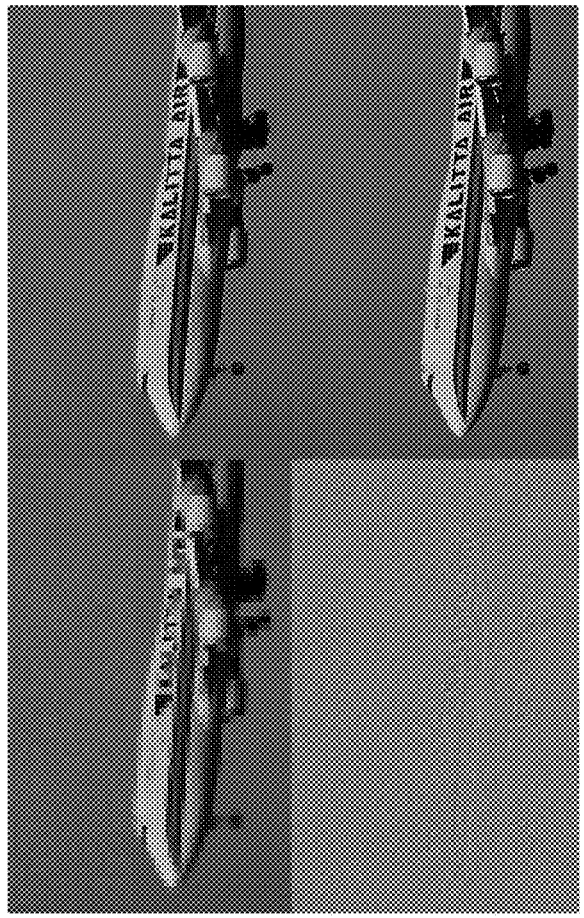
FIG. 5 shows block-like artifacts of a decomposed frame in accordance with an illustrative embodiment.

The values $S_t$, $Q_t$ and $V_t$ are sent from the chip to the host at time t. The reconstructed frame $\hat{f}_{t-1}$ at t−1 is used along with $S_t$, $Q_t$ and $V_t$ to reconstruct frame $\hat{f}_t$. Since the frame $\hat{f}_t$ is decomposed as QT blocks, it has block-like artifacts, clearly identifiable near the edges of the objects in the scene, especially at low bit rates. FIG. 5 shows block-like artifacts of a decomposed frame in accordance with an illustrative embodiment. In order to enhance the quality of the edges in $\hat{f}_t$, one can use an event-based edge enhancement algorithm. Referring still to FIG. 5, the top left depicts a distorted frame, the bottom left depicts an event frame, the bottom right shows the actual frame, and the top right shows an edge enhanced reconstructed frame.

In an illustrative embodiment, the events are used to enhance the edges in intensity frames using a deep neural network model. The last and current reconstructed frames $\hat{f}_{t-1}$ and $\vec{f}_t$ along with the event frames between t−1 and t are fed as input to the model. In this work, 4 event frames are fed to the model, which has residual blocks along with convolutional layers. In alternative embodiments, a different number of event frames may be used, such as 5, 6, 8, etc. The resulting enhanced frame $\hat{f}_t^{edge}$ at time t has edges which closely resemble the actual ones. As discussed above, FIG. 5 shows an example of the edge enhancement for a highly distorted frame. The distorted frame $\hat{f}_{82}$ has significant distortion (generated with $\lambda$=650), with the letters clearly not distinctly seen on the side of the airplane. With events, the resultant enhanced frame has edges which are quite distinct. The letters written on the body of the airplane are also clearly readable, with the block-like artifacts significantly reduced. By looking carefully at the edge enhanced frame $\hat{f}_t^{edge}$, it can be seen that the edges are preferentially enhanced especially on part of the image at which the events are concentrated.

The regions of interest in the edge enhanced intensity frame $\hat{f}_t^{edge}$ can be detected by using an object detector on the host. In this architecture the object detector can be a modular sub-system. It can be updated/replaced/augmented as per the requirements of the end application. In one embodiment, faster R-CNN is used as the object detector, with the detector trained with a 2-step methodology. The object detector generates bounding boxes with class labels, which are fed as input to an object tracker. The modular design approach allows upgrading the object tracker as well. In one embodiment, the system can use a Kalman filter-based multiple object tracker, with online and real-time tracking for its popularity and easy implementation. In the proposed implementation, the tracker appends the class information of the objects, which is critical for fusing the regions of interest. For every time t, the bounding boxes from the object detector are used as the observations for updating the state predicted by the Kalman tracker.

In an illustrative embodiment, the compressed events can be sent from the chip to the host for further processing. On chip, the events are sampled and temporally quantized to generate event frames. The events are received by the host as data packets, which are then decoded by inverting the coding processes of run length and Huffman encoding. For the intensity frames at $F_i$ frames per second (fps), the events are aggregated into event frames at $F_e$ fps. Thus, the events during $1/F_e$ seconds are aggregated together into event frames. Conversion of the events from asynchronous to synchronous event frames enables their frame-based processing.

On host, the events can be used to perform any task specific processing. In the proposed system, object tracking is the end task to be performed. Hence, the events are used to improve object tracking performance. For fast moving objects, tracking of objects using intensity frames only can lead to misdetection of objects owing to blur. Also, fewer frames are able to capture the object moving across the field of view. The event frames are used to circumvent such situations, and accurately detect and identify objects using an event based object detector. The event based object detector helps in not only locating and identifying the fast moving objects which move significantly during $1/F_i$ seconds but also objects which disappear from the frame within $1/F_i$ seconds. This improves the tracking accuracy of the objects over the sequence of frames. It is noted that any event based object detector can be used in the proposed modular architecture for identifying objects from events.

Figure 6:
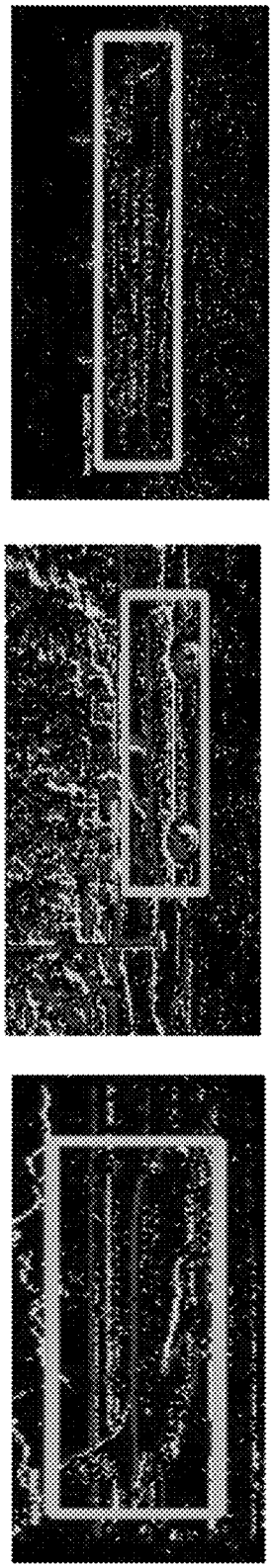
FIG. 6 show examples of airplane (left), car side (middle), and ferry (right) detections on using this event object detector in accordance with an illustrative embodiment.

In one embodiment, a Tiny Yolo can be used as the object detector on the aggregated event frames due to its light-weight architecture owing to fewer convolutional layers in the object detection network. It is noted that typically $F_e > F_i$. For instance, for 30 fps intensity frame rate, the aggregated event frame rate could be 120 fps (or higher) and hence the event based object detector needs to process many more event frames over the same duration. The requirement of having a light-weight event object detector architecture is hence important. FIG. 6 show examples of airplane (left), car side (middle), and ferry (right) detections on using this event object detector in accordance with an illustrative embodiment. It can be seen that the event detector is able to identify, detect, and classify objects in both dense event frames (middle) as well as from relatively sparse event frames (left/right).

In an illustrative embodiment, the event object detector generates bounding boxes with class labels, which are used as inputs to the event object tracker. The class labels are appended for each of the bounding boxes tracked by the event tracker. The system can maintain a separate tracker for the objects detected from the event frames. This is due to the fact that the objects detected from intensity frames might be different from the objects detected from the event frames. Moreover, the aggregated event frames are at a higher frame rate than the intensity frame rate. Thus, the detection of objects from the event frames will be at a higher frame rate than intensity based detections. This will inherently introduce a mismatch in the rate of information received from each of the modalities to track objects in a scene.

Figure 7:
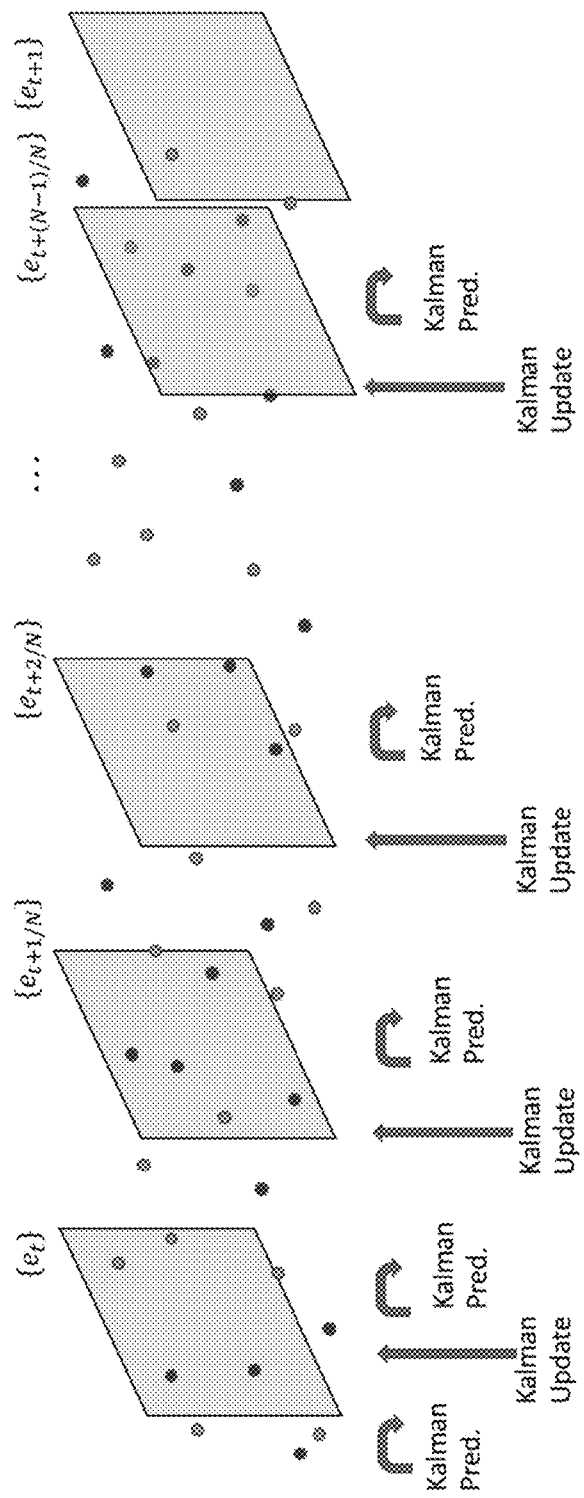
FIG. 7 shows predict/update operations performed by an object tracker to predict bounding boxes in accordance with an illustrative embodiment.

The event based object tracker is a modular component of the whole architecture which can be replaced/updated based on user preference. In one embodiment, an adapted Kalman filter-based multiple object tracker, for object tracking similar to the implementation in intensity based object tracker can be used. The event tracker uses a linear motion model to predict the bounding box location in the event frame $e_t^l$ based on the state at time $t-1+(N-1)/N$. The observations are the bounding boxes detected by the event object detector at time t with the association of the observed and predicted bounding boxes done as described herein. The Kalman filter predicts the location of the bounding boxes, $\widetilde{bb}_{t+1}^e$ at time $t+1/N$. At time $t+1/N$, the observations (bounding boxes) are available from the event object detector to update the state of the event tracker. This operation of predict and update is repeated for $N-1$ times in between time t and $t+1$ before finally predicting the bounding boxes $\widetilde{bb}_{t+1}^e$ at time $t+1$. FIG. 7 shows predict/update operations performed by an object tracker to predict bounding boxes in accordance with an illustrative embodiment.

The fusion of the predicted intensity and event modality bounding boxes (regions of interest) at time $t+1$, $\widetilde{bb}_{t+1}^t$ and $\widetilde{bb}_{t+1}^e$, respectively, are critical for determining the resulting predicted bounding boxes before sending them to the chip. This is important for the information being sent to the chip for prioritization of bits in the RoIs at time $t+1$, in the Viterbi optimization algorithm.

The fusion model can include two parts, a bounding box filter module and a bounding box fusion module. In the bounding box filter module, the features are first extracted for each bounding box predictions. Next, a fully connected neural network is constructed to predict the confidence score for each bounding box prediction based on these extracted features, which measures the probability of each bounding box predictions belonging to a ground truth bounding box, and removes the bounding box predictions with low confidence score. The bounding box fusion module utilizes a designed fusion mechanism to fuse the remaining bounding box predictions.

The bounding box filter module takes as input the bounding box predictions, $\widetilde{bb}_{t+1}^e$. The inputs are at the bounding box level, where the system only knows information of the bounding box and a source of the bounding box (e.g., intensity based Kalman filter prediction or event based Kalman filter prediction). First, the bounding box filter extracts key features of each bounding box predictions. The various key features of each bounding box prediction can include bounding box class, which refers generally to the class of each input bounding box prediction, for example airplane, cars, etc. Another feature is bounding box source, which represents where the bounding box prediction comes from. The values 0 and 1 represent the bounding box prediction from the intensity Kalman filter and from the event Kalman filter, respectively. Alternatively, different values may be used to represent bounding box source. The features also include bounding box size, or the size of each input bounding box prediction, which can be the area of each bounding box. Another feature is aspect ratio (AR). The AR of each class (e.g., Airplane) usually differs from one another. AR, which can be defined as ratio of height to width, can be used to represent this difference. Another feature includes overlap ratio (OR), which can be defined as the maximum Intersection over Union (IoU) between the target bounding box prediction and other bounding box predictions from the same source (intensity or events), as shown in Eqn. 14. High OR indicates that the probability of those two bounding box predictions containing the same object is high.

$$\text{Overlap Ratio} = \max_{j \neq i} IoU(BBP(i), BBP(j)) \quad (14)$$

Another feature is the crowdedness ratio (CR), which measures the crowdedness of each bounding box predictions from the same source. This value can be thought of as the number of the other bounding box prediction centers from the same source in the target bounding box regions. Another feature is the support value (SV). For a given bounding box from a particular source, if there exists a bounding box prediction from the other source and its IoU with the target bounding box prediction is greater or equal to a threshold (e.g., 0.7), the SV for the target bounding box prediction is 1. Otherwise, there is no bounding box prediction from the other source, and the SV is 0. If SV is greater than 0, one can find a correlated bounding box prediction from the other source, which means the intensity Kalman filter and event Kalman filter predictions detect the same object, and the probability of such bounding box prediction is relatively high. In alternative embodiments, fewer, additional, and/or different features may be used by the system.

After obtaining the feature vector for each predicted bounding box using the feature extractor, a neural network with three fully connected layers was used to predict the confidence score of each bounding box predictions, which measures the probability of each bounding box predictions belonging to a ground truth. A predefined threshold (of 0.7) was to filter out the bounding box predictions with low confidence score. In alternative embodiments, a different threshold value may be used, such as 0.65, 0.75, 0.80, etc.

Figure 8:
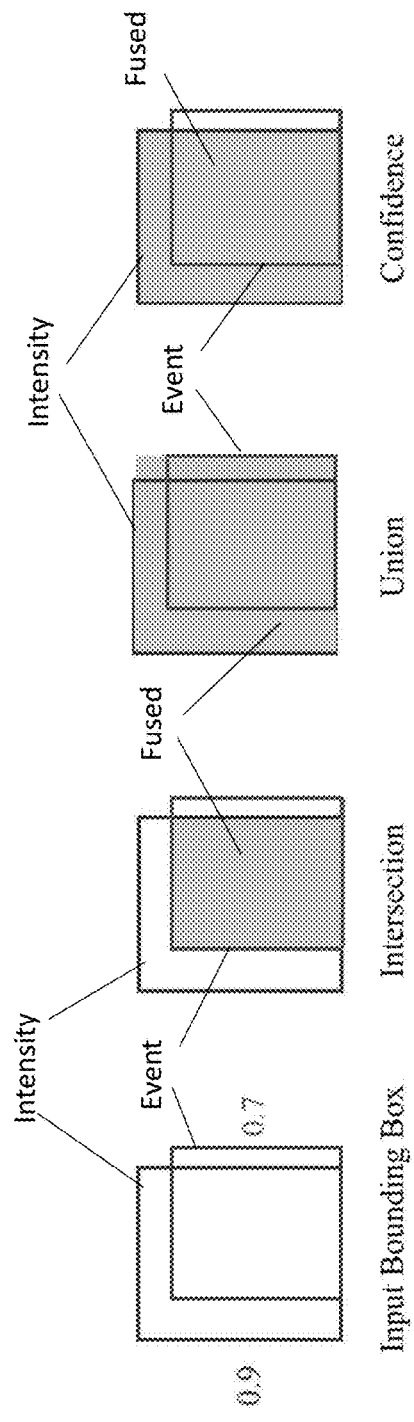
FIG. 8 depicts the various fusion strategy techniques in accordance with an illustrative embodiment.

In an illustrative embodiment, the filtered bounding box predictions is aligned with the non-filtered intensity Kalman filter and event Kalman filter predictions, and the maximum IoU value is computed. If the maximum IoU is greater than or equal to a threshold of for example, 0.5, both Kalman filter predictions are considered to detect this filtered bounding box object, and a fusion strategy can be used to fuse the bounding box predictions together. In alternative embodiments, a different threshold value may be used. The various fusion strategies include: Intersection (bounding box as the intersection region), Union (bounding box as the union region), and, Confidence (bounding box as the one with highest confidence). Otherwise, if the maximum IoU value is less than 0.5, the filtered bounding box prediction is retained. Thus, one can obtain the fused Bounding Box predictions. FIG. 8 depicts the various fusion strategy techniques in accordance with an illustrative embodiment.

Figure 9:
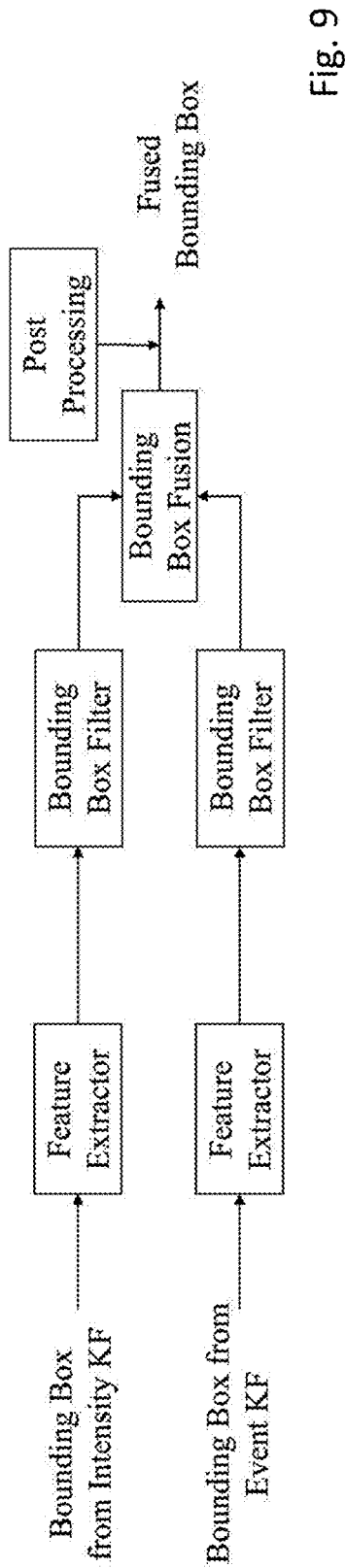
FIG. 9 depicts a workflow of the whole fusion model in accordance with an illustrative embodiment.

In order to exploit additional temporal information, the system includes a post processing algorithm to filter out the false positive predictions. It is assumed that the object movements during the successive frames are relatively small, so the fused bounding box predictions in frame t is assumed to be correlated with the fused bounding box predictions in the previous frame t−1. The system can compare the IoU value with all the fused Bounding Box predictions at frame t with those at frame t−1. If the IoU is 0.5, the fused Bounding Box prediction at frame t follows the temporal correlation and the system uses this Bounding Box prediction as the output. Otherwise, the fused bounding box predictions are a false positives, and are filtered out. FIG. 9 depicts a workflow of the whole fusion model in accordance with an illustrative embodiment.

Figure 10:
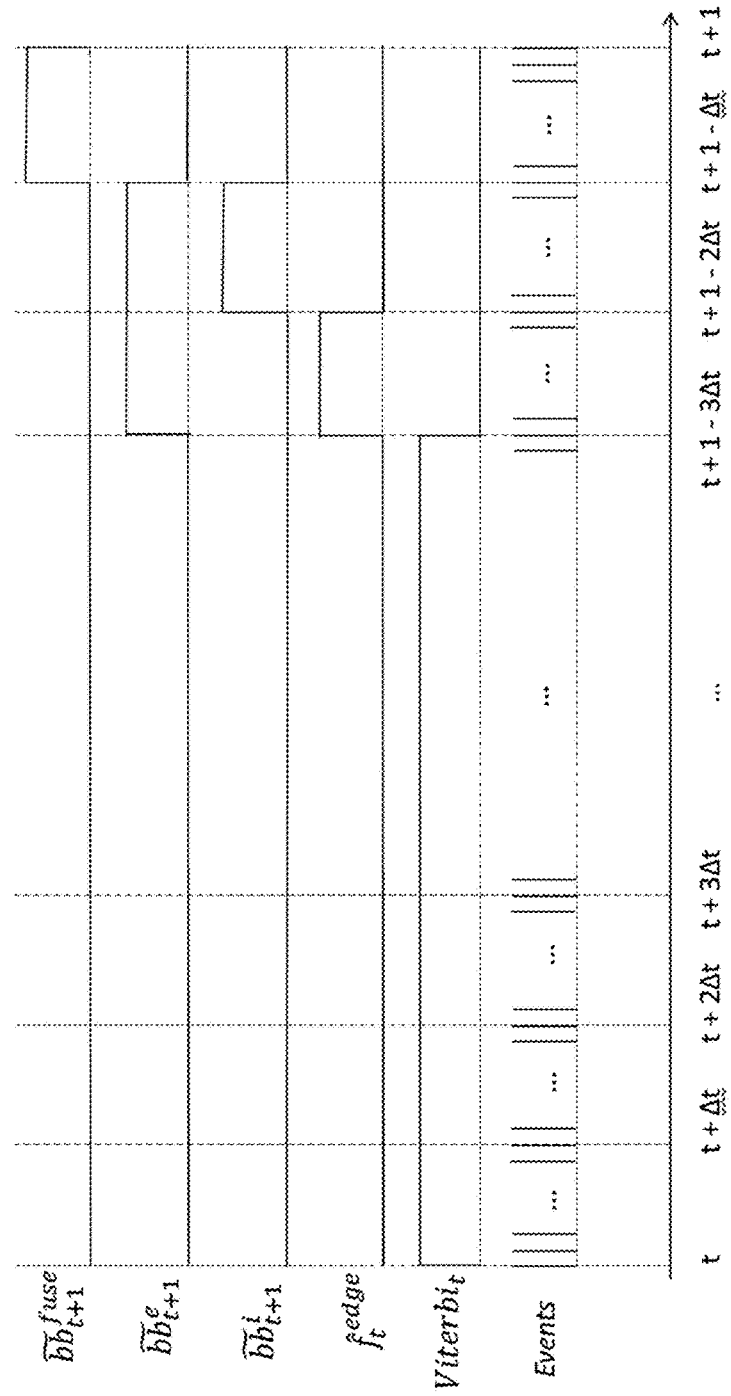
FIG. 10 depicts a timing diagram for the system in accordance with an illustrative embodiment.

In this proposed system, the time synchronization of the different sub-processes should be completed sequentially before the subsequent process begins. FIG. 10 depicts a timing diagram for the system in accordance with an illustrative embodiment. For every intensity frame at times t and t+1, the events are acquired on the chip asynchronously. However, the Viterbi optimization algorithm starting at time t should be synchronized in such a way that the optimization can be performed on the frame acquired at time t, along with the events acquired on the chip between time t−1 and t. The Viterbi optimization ends at time t+1 3Δt, and data is transferred from chip to host. The edge reconstruction computation on the host starts once the host receives the compressed intensity and event data, and results in generation of an enhanced frame $\hat{f}_t^{edge}$, at time t+1−2Δt. The intensity based object detector operates on the enhanced intensity images and passes the bounding boxes to the intensity based Kalman Filter tracker as its observations. The intensity based Kalman Filter generates predicted bounding boxes for time t+1, $\widehat{bb}_{t+1}^{i}$ time t+1 Δt. On the other hand, the event based object detector computes the bounding boxes and updates the event based Kalman filter tracker $F_e/F_i$ times. This computation is completed before time t+1−Δt such that the fusion model can take the predicted intensity and event bounding boxes at time t+1−Δt, and finish computation at t+1 such that the predicted bounding box $\widehat{bb}_{t+1}^{fuse}$ is available for the Viterbi optimization at t+1 on the chip. It is noted that for illustration purposes, the time required for transmission of data between the chip to the host and vice-versa is not considered. In practice, depending on the network congestion, some delay may be introduced which can lead to minor changes in the timing diagram of FIG. 10.

The performance of the complete host-chip tracking system on resource-constrained chip device has been evaluated in terms of the Multiple Object Tracking Accuracy (MOTA) evaluation metric. The MOTA metric is defined as $$MOTA = 1 - \sum_t \frac{m_t + fp_t + mme_t}{g_t} \quad (15)$$

where $m_t$ represents the number of missed detections, $fp_t$ the number of false positives, $mme_t$ the number of mismatch (track switching) errors, and, $g_t$ the number of ground truth objects, all at time t. A high MOTA score implies a high tracking accuracy of the objects and vice-versa.

As discussed, the proposed host-chip system utilizes intensity frames and asynchronous events from the same scene during evaluation. In order to do so, the framework uses intensity frames and events from the same dataset for training, validation, and testing various parts of the system. The lack of large dataset for intensity and events is a key issue in literature, and the inventors used abundantly available intensity datasets to generate events. Event data was generated using a Super SloMo algorithm and ESIM. The proposed algorithm can work with any object detection and tracking video datasets with one or multiple classes of tracking objects. However, in this work, for illustration purposes, the inventors used the Airplane, Watercraft, and Car classes from the ImageNet (ILSVRC) VID dataset to demonstrate results of the algorithm.

A two-step approach is followed to test the system. First, the intensity was interpolated to 240 fps using the Super SloMo algorithm. The Super SloMo algorithm allows for intensity frame interpolation to any arbitrary frame rate. An up-sampling factor of around 8× was selected as not being too high or too low. Too high of a factor may be a computational burden while too low of a factor might cause aliasing of the intensity signal. Additionally, the bounding box annotations along with the class labels were interpolated to 240 fps from the bounding boxes at the frame rate in the dataset (typically 25/30 fps). Second, event simulation (ESIM) was used to generate events from the interpolated intensity frames, keeping positive and negative thresholds at 0.15. In this two-step process, interpolating of intensity frames is important, as the event frames generated without interpolated frames tend to be quite thick, and appear visually as artificial edges. Alternatively, the event frames generated with frame interpolation are quite thin, and appear visually to be close to the actual edges.

Figure 11:
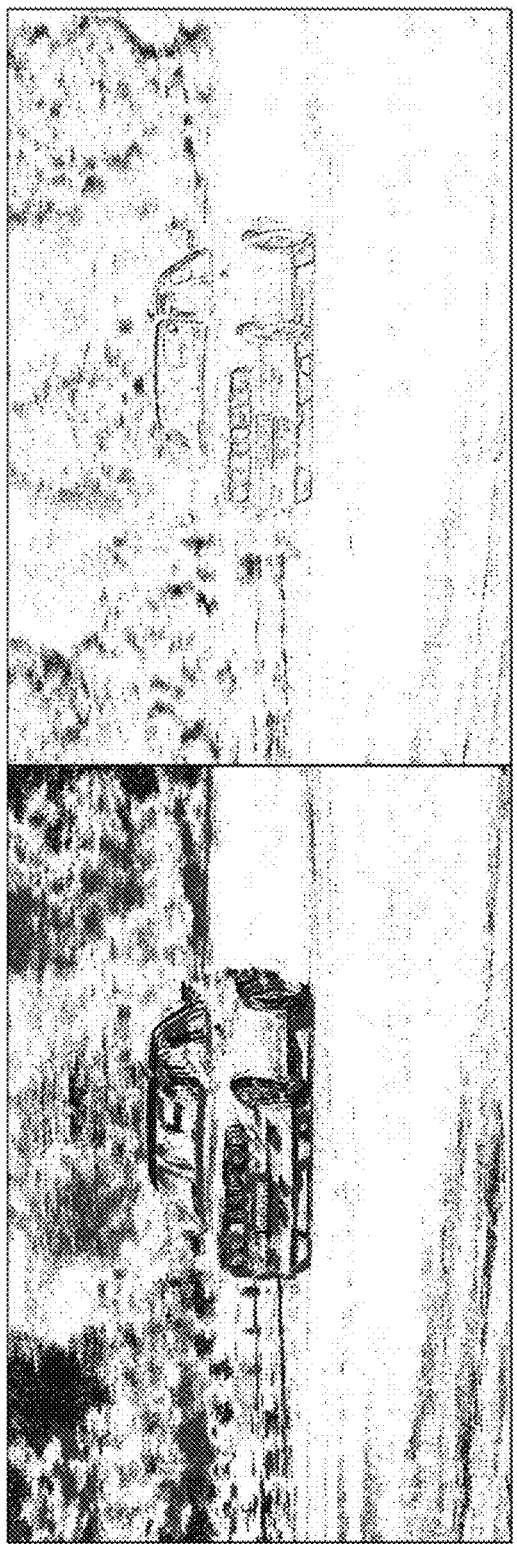
FIG. 11 depicts an event frame without (left) and with (right) frame interpolation in accordance with an illustrative embodiment.

FIG. 11 depicts an event frame without (left) and with (right) frame interpolation in accordance with an illustrative embodiment. The performance of the system was analyzed by testing the model on the following ILSVRC VID sequences: (i) a video of airplanes, ILSVRC2015 val 00007010.mp4; (ii) a video of watercraft, ILSVRC2015 val 00020006.mp4; and, (iii) a video of cars, ILSVRC2015 val 00144000.mp4, which are referred to herein as Airplane, Boat and Car sequences, respectively. The uncompressed bit rate considering the intensity frames only is 62.91 Mbps. The system performance was demonstrated by performing experiments at 1 Mbps and 1.5 Mbps, which results in compression ratios of 62.91 and 41.94, respectively.

Figure 12:
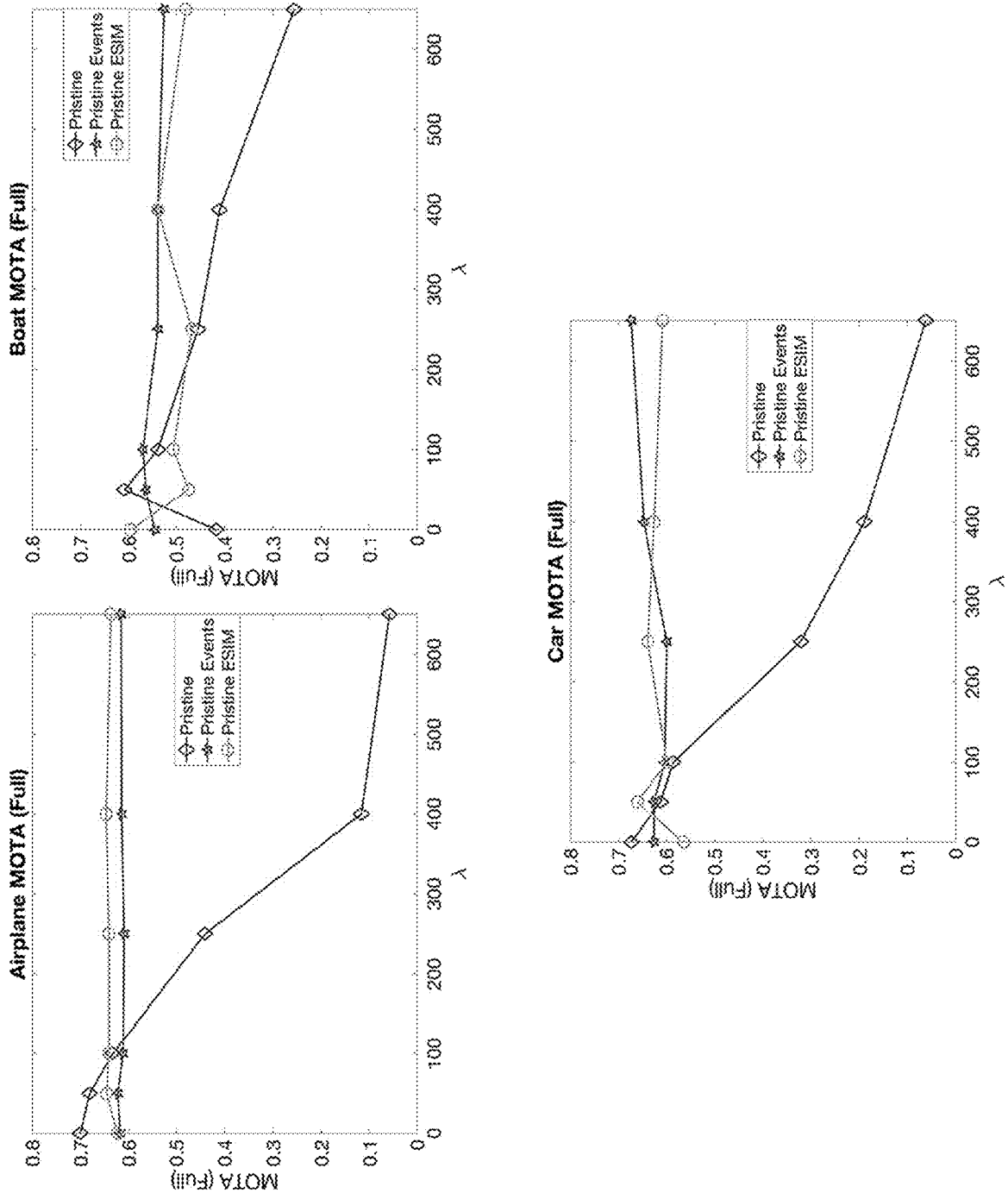
FIG. 12 depicts the system performance metric (MOTA) in accordance with an illustrative embodiment.

In order to evaluate the contribution of the edge enhancement network in the overall system performance, the host-chip system was used with only edge enhancement and without the use of events for object detection and tracking. The system performance was compared without edge enhancement. Original events have been used in these experiments with no distortion. FIG. 12 depicts the system performance metric (MOTA) in accordance with an illustrative embodiment. The pristine object detector trained with undistorted frames of ILSVRC VID dataset, is used as the base detector and edge enhanced intensity frames are detected using this pristine detector.

FIG. 12 shows the system performance MOTA as a function of $\lambda$. A higher value of $\lambda$ in Equation 4 implies higher distortion and lower bit rate. It is seen that for the pristine object detector with no edge enhancement, MOTA reduces as $\lambda$ increases. The edge enhancement results were compared with the edge enhancement network trained by slightly two different event data: (a) event frames generated with simple intensity frame difference, and, (b) an edge enhancement network trained on event frames generated using frame interpolation and ESIM successively as described herein (i.e., referred to as Pristine Events and Pristine ESIM, respectively, in FIG. 12). The system is tested with actual events, and it is apparent that the edge enhancement improves system performance. Additionally, it is seen that the performance of the system with Pristine ESIM is better than Pristine Events for the airplane and car sequences than with the boat sequence. However, the MOTA metrics using Pristine Events and PristineESIM are comparable, with Pristine ESIM performing at least or as good as Pristine Events for 61% of the cases in the airplane, boat, and car sequences. In the subsequent experiments, unless mentioned otherwise, the ESIM version of edge reconstruction network is used due to its better performance, in addition to the fact that the training and testing with event data are identical for ESIM edge reconstruction network.

Figure 13:
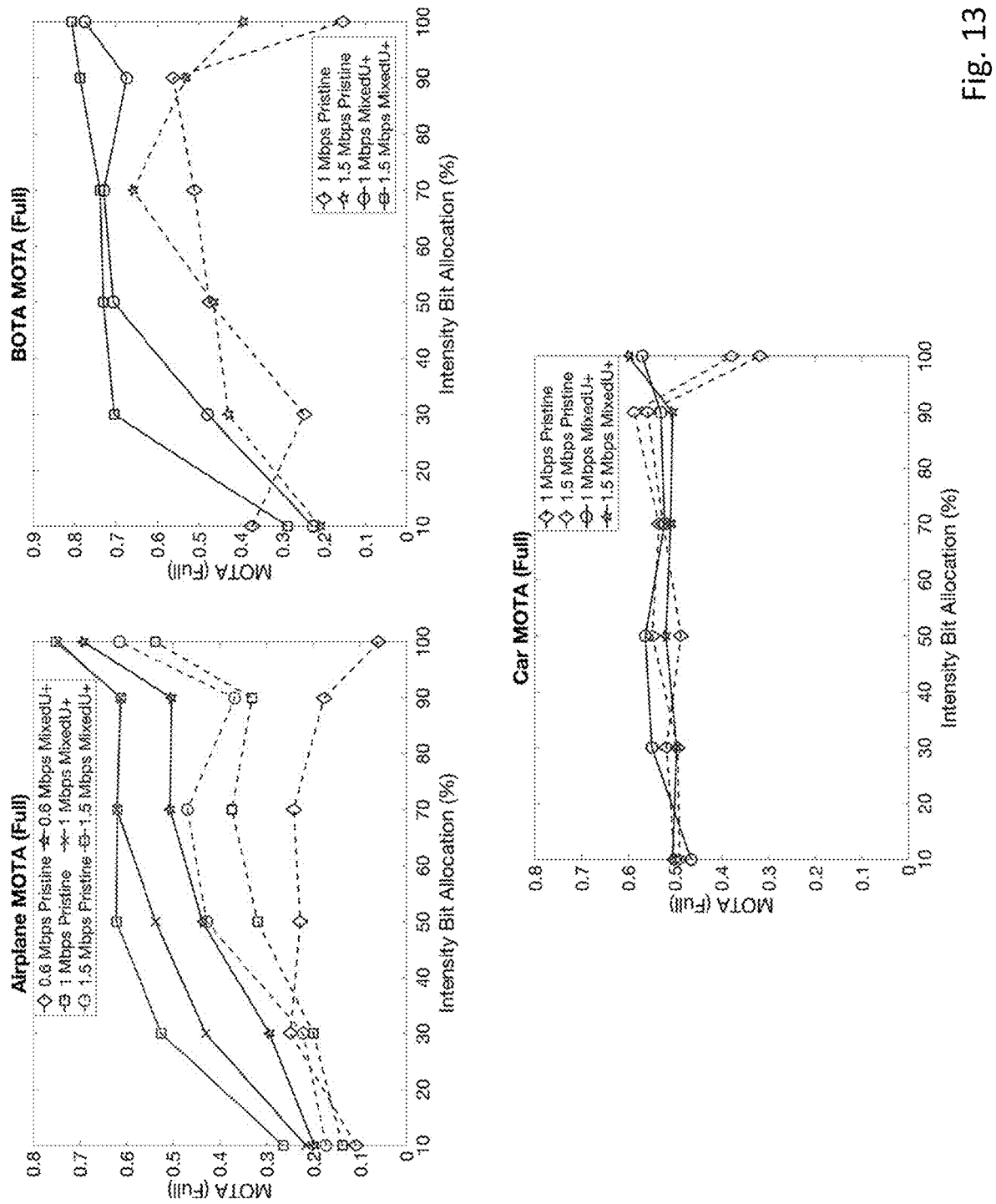
FIG. 13 depicts a comparison of the MOTA metric for different bit rates in accordance with an illustrative embodiment.

As discussed, it is apparent that edge enhancement improves the performance of the system especially for higher distortions. The performance of the system was also considered at different bit rates, with Pristine and MixedU+ object detectors, which are trained with no distortion and using system generated distortions in a 2-step method respectively. In this analysis, the inventors used the events only for edge reconstruction without object detection on the events and fusion network. FIG. 13 depicts a comparison of the MOTA metric for different bit rates in accordance with an illustrative embodiment. The % bit rate allocation of the intensity modality out of the total bit rate is varied from 10% to 100%, with the rest of the bit rate allocated for the events. The MOTA metric improves with the % bit rate being allocated to the intensity modality, thereby implying better performance of the system towards higher intensity bit rates. Additionally, the system performance is better with MixedU+ detector compared to the Pristine detector for almostall experimental test cases. Moreover, with increasing bit rate to 1.5 Mbps, system performance improves, especially at lower % allocated bit rates to the intensity modality, implying better system performance with more bits. For the airplane sequence, additional experiments have been carried out with 0.6 Mbps which confirm the trend. In the subsequent sections, the experiments are done with the MixedU+ object detector.

Figure 14:
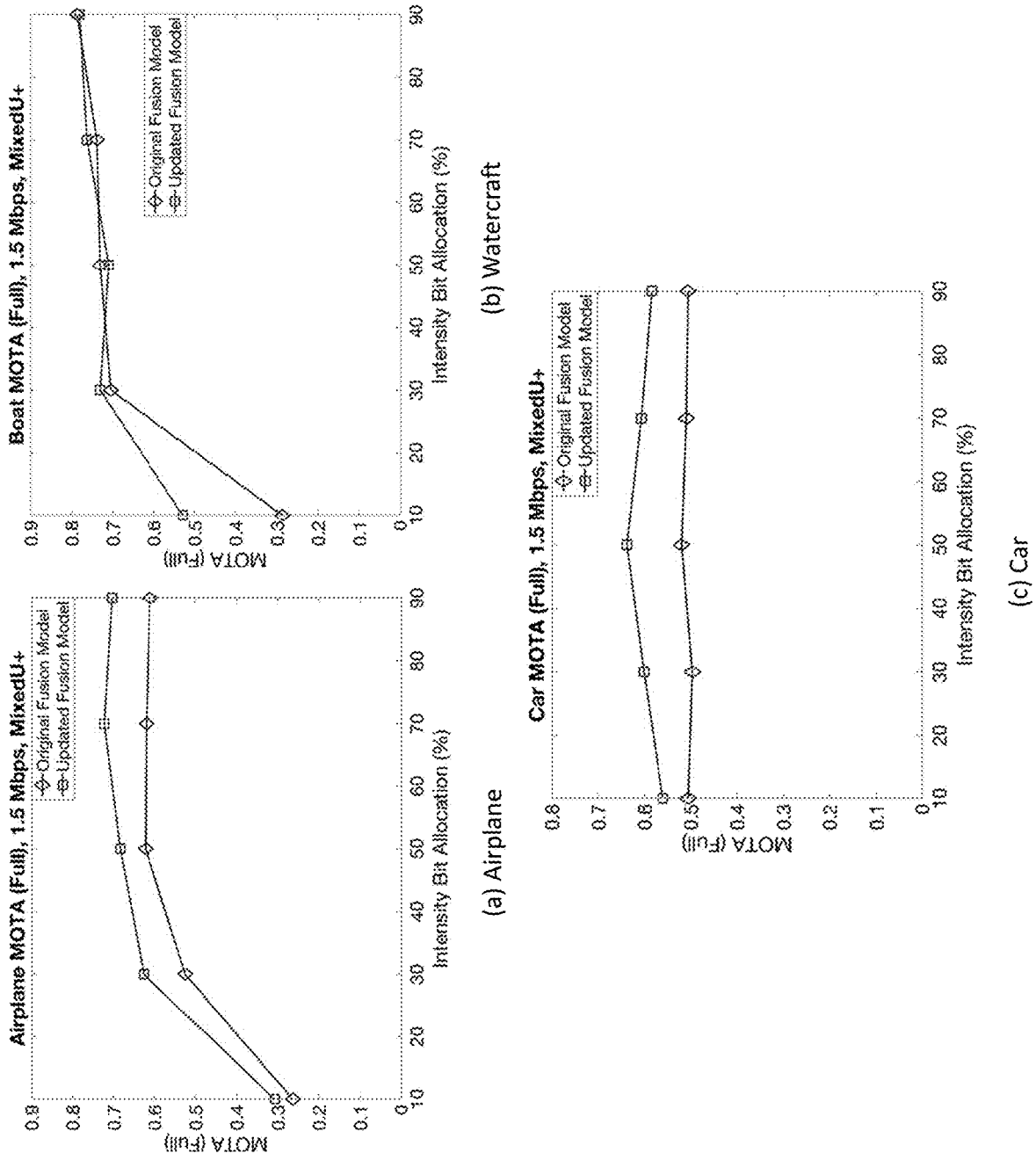
FIG. 14 shows $MOTA_{full}$ of sequences with and without a fusion network in accordance with an illustrative embodiment.

The system performance of the events in object detection and tracking along with the fusion network in the system was also evaluated. The events are used to not only perform edge reconstruction, but also to detect and track objects from the event frames and fuse the information from the event and intensity modalities. FIG. 14 shows MOTA$_{full}$ of sequences with and without a fusion network in accordance with an illustrative embodiment. The Original Fusion Model and Updated Fusion Model refers to the system with and without event object detector, tracker, and fusion network, respectively. It is observed in FIG. 14 that the updated fusion network helps in improving the MOTA tracking performance of the system for all the allocated intensity bit rates as a fraction of the total bit rate of 1.5 Mbps. A MixedU+ object detector has been used in these experiments, and it is shown that the events in the system help in improving the MOTA performance metric.

Figure 15:
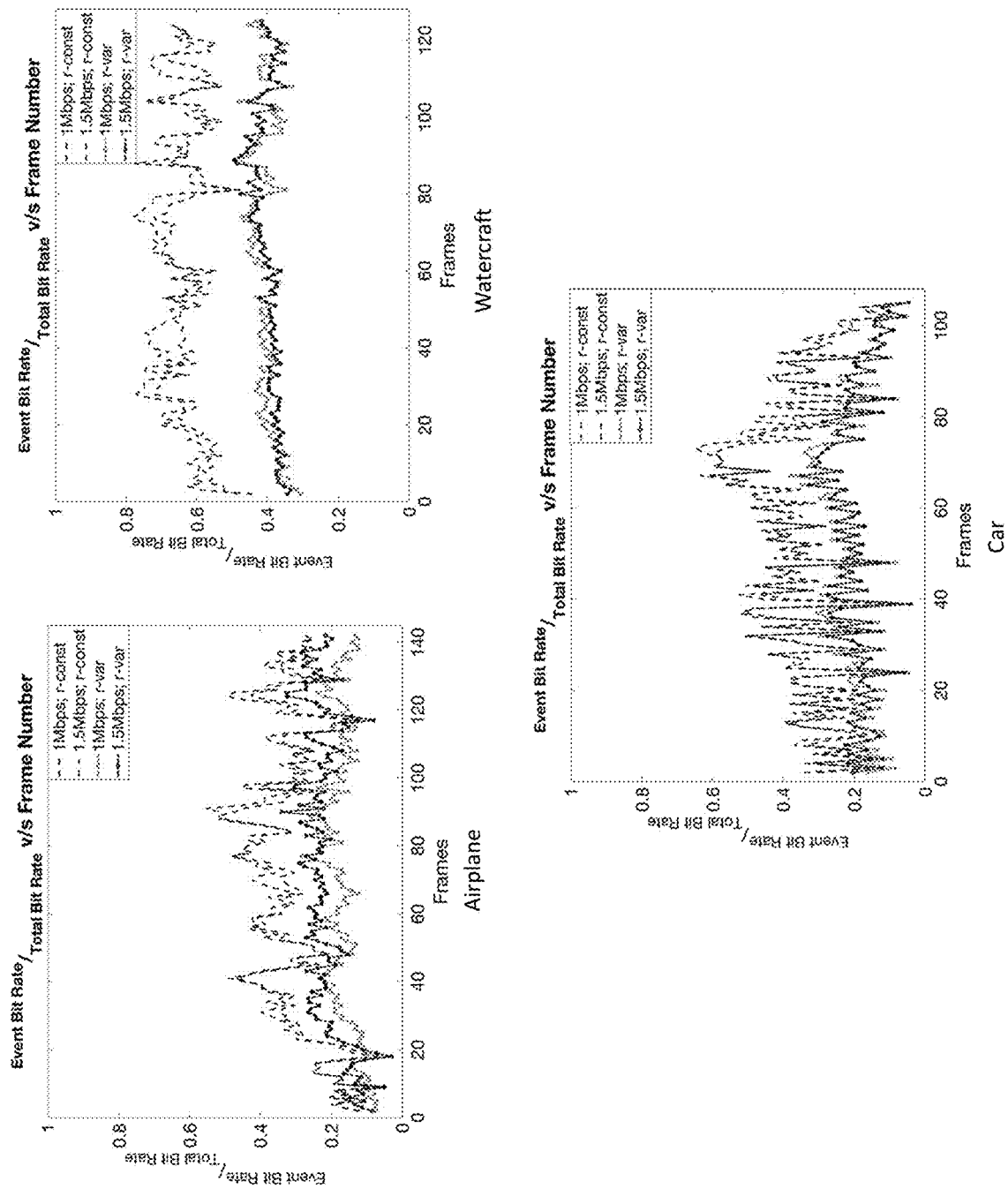
FIG. 15 depicts the variation of the fraction of the allocated bit rate for events out of the total bit rate over the frames in accordance with an illustrative embodiment.

Performance of the system with prefixed bit allocation for a particular bit rate and the joint optimal allocation of the bits for intensity and event modalities were also compared. FIG. 15 depicts the variation of the fraction of the allocated bit rate for events out of the total bit rate over the frames in accordance with an illustrative embodiment. The allocated fraction of bits for the events were compared for two cases: (a) constant r, and, (b) variable r in Eqn. 4. For the constant r case, $r_4=1$, while for the variable r case, $r_4 \in \{1, 2, 3\}$. For both the constant and variable r cases, $r_8=2r_4$, $r_{16}=4r_4$, $r_{32}=4r_4$, and so on for higher sized QT blocks. It is seen that the fraction of the bits allocated to the events is lower for the variable r case than the constant r case (shown as r=var and r=const in FIG. 15). This is primarily due to the fact that for the variable r case, the dynamic optimization can optimize over different r, hence providing better optimized bit rates.

Performance of the system in terms of MOTA was computed for pre-fixed allocated fraction of bit rate for the intensity out of the total bit rate, and compared with the MOTA for the system jointly optimized for the various bit rates using Eqn. 4. Both a constant and variable r are used in the joint optimization of the Intensity-Event modalities.

Figure 16:
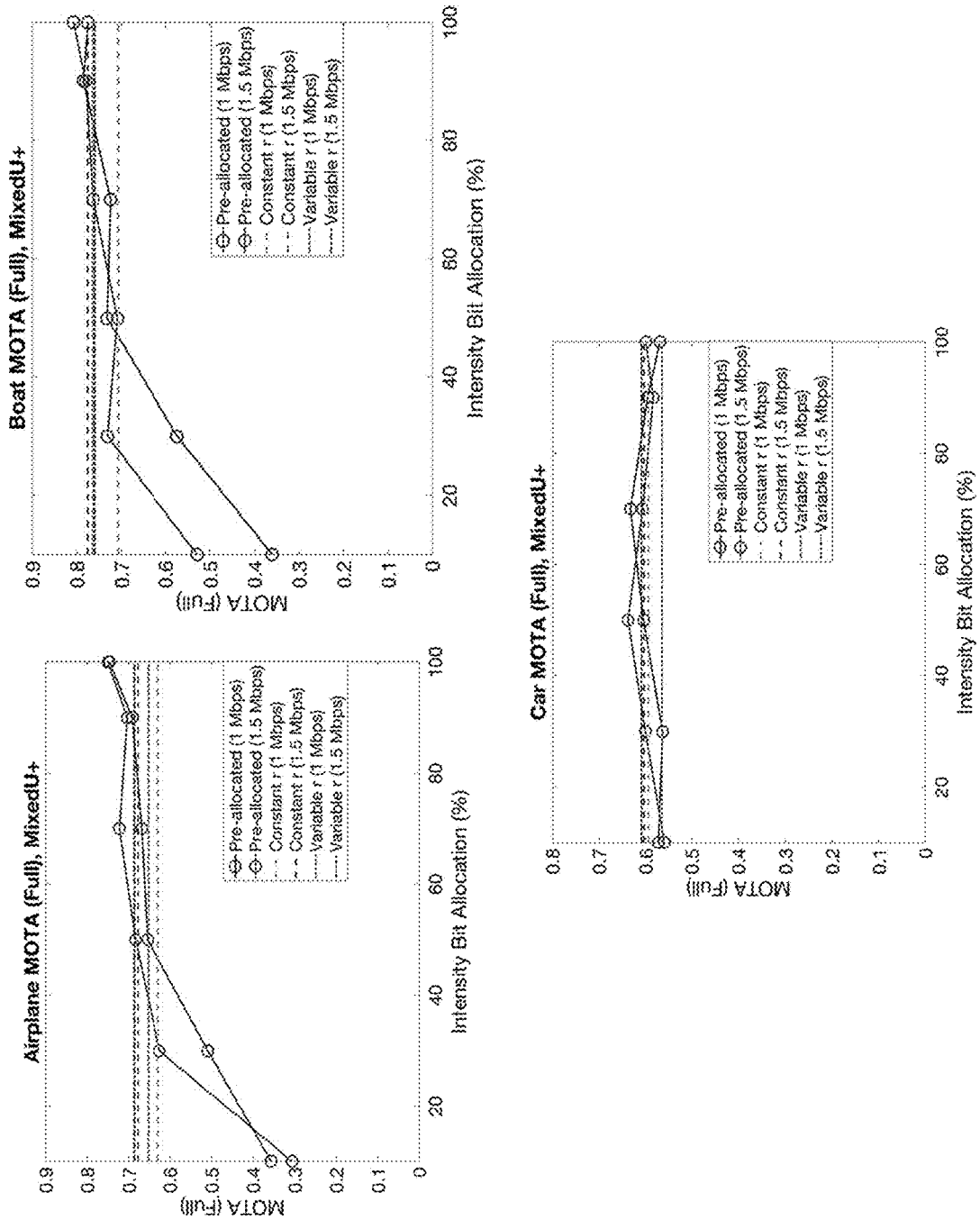
FIG. 16 depicts results of system performance with varying bit rates in accordance with an illustrative embodiment.

FIG. 16 depicts results of system performance with varying bit rates in accordance with an illustrative embodiment. Results of the jointly optimized system are shown as dashed lines, while the MOTA for the pre-fixed allocated bit rate is shown as solid lines.

Pre-fixed allocation of the bits between the intensity and event modalities are able to achieve slightly better MOTA than jointly optimized intensity and event bit rates. For the airplane sequence, the best MOTA is achieved for intensity: event bit rate ratio of 100:0, while for the car and boat sequences, the best MOTA is achieved for some other intensity:event bit rate ratio. The MOTA plots for the jointly optimized intensity-event modalities indicate that the system performance can reach close to the highest MOTA value (corresponding to the pre-fixed bit allocation). Moreover, the MOTA for the variable r cases has marginally higher values than for the fixed r cases for most of the experimental results. This is primarily due to the fact that the variable r has better optimized intensity-event split owing to relaxation in the optimization parameter space. Additionally, one can clearly see the trade-off between computational requirements and MOTA from the plots in FIG. 16. While the pre-fixed allocation of bits for the best MOTA has to be obtained by computing different intensity:events allocation ratios, for instance 50:50, 70:30, 90:10, 30:70, 10:90, in the joint optimization algorithm, the computation for allocating the bits is performed only once. Still, the jointly optimized intensity-events provide a MOTA which is close to the best possible MOTA.

Figure 17:
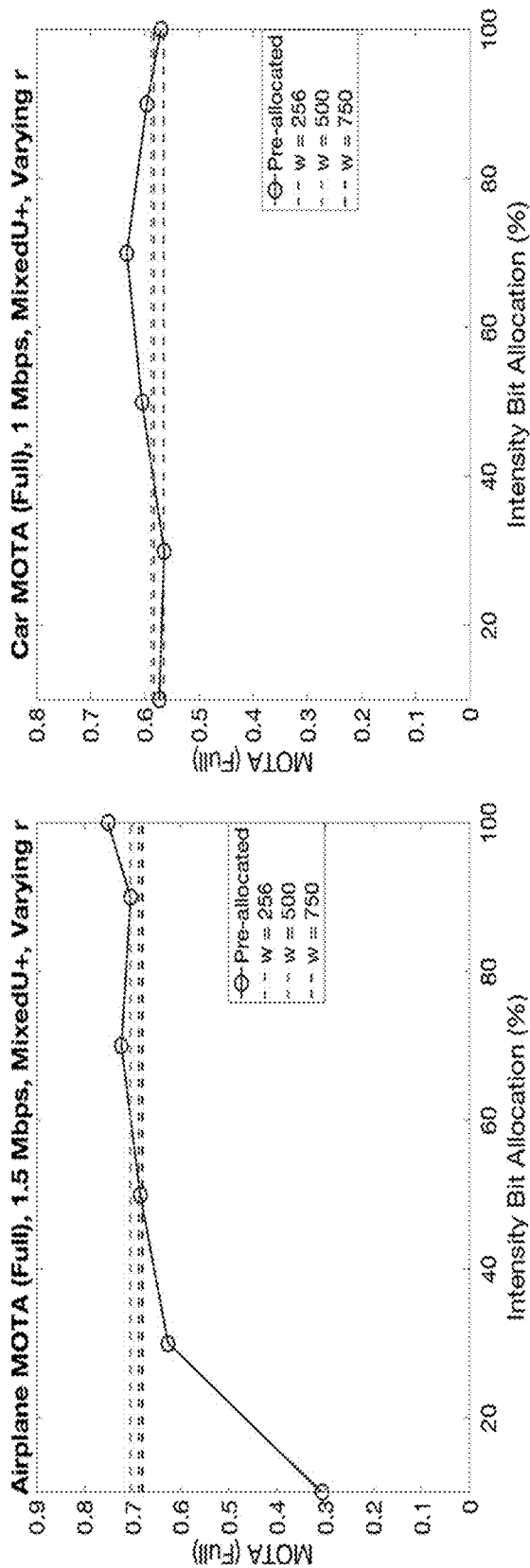
FIG. 17 shows the MOTA performance for the airplane sequence at 1.5 Mbps, and car sequence at 1 Mbps, respectively, in accordance with an illustrative embodiment.

A performance comparison with varying weights for event distortion was also conducted. Specifically, experiments were conducted in which the weight of the distortion, $w_e$ in Eqn. 12, is varied for $w_e=256, 500, 750$ for variable r (r=var) as described in Section IV-E2. FIG. 17 shows the MOTA performance for the airplane sequence at 1.5 Mbps, and car sequence at 1 Mbps, respectively, in accordance with an illustrative embodiment. For $w_e=500$, the MOTA performance metric of the system is marginally better than for other $w_e$ values for most of the cases, as shown in FIG. 17. Similar improvement in MOTA is seen for these sequences at other bit rates as well. However, the MOTA improvement is not significant as it basically implies one or two fewer false positives. For instance, in the car sequence at 1 Mbps, the MOTA is 0.5883 at $w_e=500$, implying 2 fewer positives compared to $w_e=750$ for the same sequence with 107 frames. For this sequence each false positive increases or decreases the MOTA by 0.0025.

Figure 18:
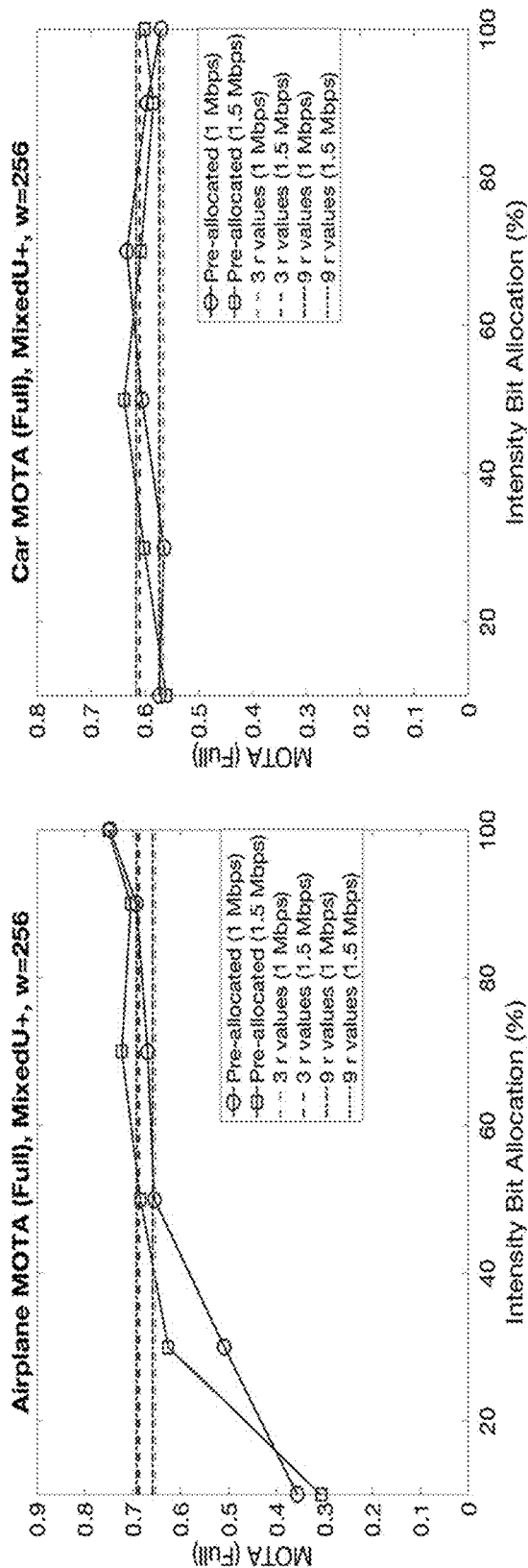
FIG. 18 depicts MOTA versus intensity bit rate allocation for variable r. $w_e$=256 in accordance with an illustrative embodiment.

Experiments were also performed by varying the search space of the parameter r, which is the PDR for event encoding in the joint intensity-event optimization algorithm. The system performance was compared by keeping r constant, and additionally varying r over 3 and 9 values in order to find out the optimal choice of r for maximizing MOTA. FIG. 18 depicts MOTA versus intensity bit rate allocation for variable r. $w_e=256$ in accordance with an illustrative embodiment. From FIG. 18, it is evident that the improvements in MOTA by increasing r from 3 to 9 is marginal for both the airplane and car sequences at 1 and 1.5 Mbps. Although, the PDR r values were increased such that a higher r would remove more events near the vicinity of each event, the PDR was constrained from removing events in the adjacent blocks of the QT.

Figure 19:
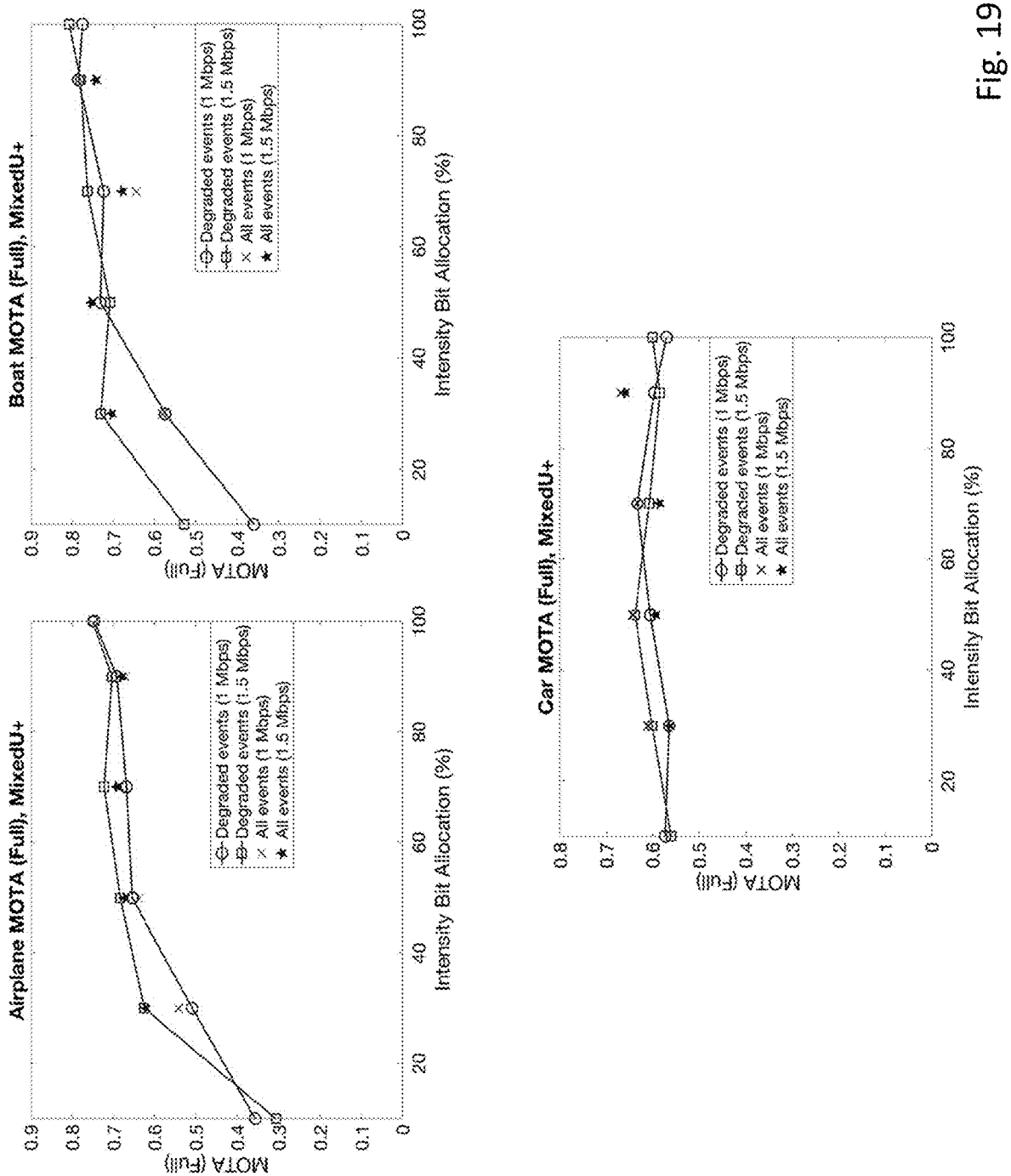
FIG. 19 depicts MOTA versus intensity bit rate allocation for original and distorted events in accordance with an illustrative embodiment.

The system performance was also tested with original and compressed events. FIG. 19 depicts MOTA versus intensity bit rate allocation for original and distorted events in accordance with an illustrative embodiment. The intensity bit rate is varied as a fraction of the total bit rate with the events used as original and compressed as shown in FIG. 19. For the compressed events, the bit rate is the remaining % of the bit rate after allocating the desired bit rate for intensity. For instance, when 70% bit rate is allocated to intensity, the compressed event bit rate is 30%. For a majority of cases, the MOTA performance of the system for compressed events is better or the same as that of the performance with original undistorted events. It is noted that the event based processing networks: the edge enhancement network and the event object detector were trained on original events only. However, the results, indicate that training these networks with compressed events is not essential from the system performance point of view. This behavior is due to the fact that the interpolated ILSVRC VID frames have both small and large motion of the objects and scene, which results in generation of dense and sparse events using ESIM. The compression can be considered a sparsifying operation, which results in sparse events with similar characteristics to the events generated from the interpolated ILSVRC VID dataset.

Figure 20:
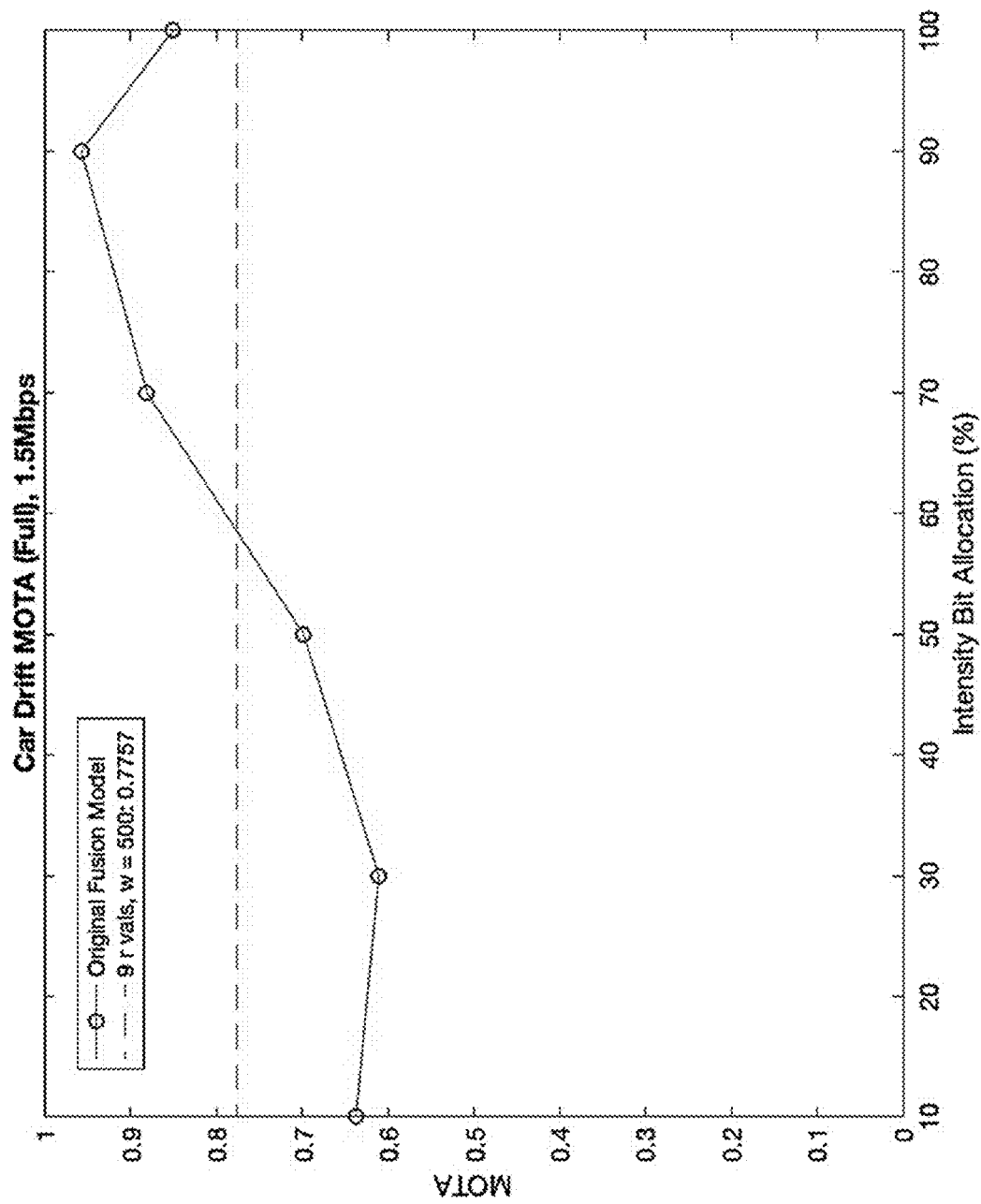
FIG. 20 depicts that the maximum MOTA for the system is at intensity: event bit rate allocation of 90:10 of the bit rate at 1.5 Mbps, in accordance with an illustrative embodiment.

Experiments were also performed with blurred sequences using the car drifting sequence from publicly available Need for Speed (NFS) dataset, which contains frames at 240 fps and motion blurred frames at 30 fps. In order to generate events, frames were interpolated to 960 fps using Super SloMo, while events from these frames were generated using ESIM. The blurred frames and events were used for testing. FIG. 20 depicts that the maximum MOTA for the system is at intensity: event bit rate allocation of 90:10 of the bit rate at 1.5 Mbps, in accordance with an illustrative embodiment. The jointly optimized intensity-event modality was done with variable r over 9 possible candidate values with event distortion weight $w_e=500$. The MOTA for the jointly optimized intensity-event is approximately 80% of the maximum MOTA achieved with pre-fixed allocated bit rate.

As discussed, the MOTA metric primarily indicates the tracking performance of this system. System performance has been analyzed in terms of MOTA with and without events. The improvement of MOTA is dependent on the sequence and the operating bit rate. For instance, at low bit rates the events contribute more towards improving the MOTA score. For blurry sequences, the events contribute in improving the MOTA score. Additionally, it is observed that with pre-fixed allocated intensity and event bit rates, the MOTA performance of the system reaches its maximum value. In the experiments, the joint allocation of bits based on distortion between the intensity and event modalities provide a MOTA score which is close to the maximum value but still does not provide the highest possible MOTA value. This is due to the fact that the system jointly optimize for the rate-distortion trade-off between the intensity and event modalities and not directly between the rate and MOTA trade-off.

Also described herein is an adaptive host-chip modular architecture for video acquisition to optimize an overall objective task constrained under a given bit rate. The chip (or imaging system) is a high resolution imaging sensor such as gigapixel focal plane array (FPA) with low computational power deployed on the field remotely, while the host is a server with high computational power. The communication channel data bandwidth between the chip and host is constrained to accommodate transfer of all captured data from the chip. The host performs objective task specific computations and also intelligently guides the chip to optimize (compress) the data sent to host. This proposed system is modular and highly versatile in terms of flexibility in re-orienting the objective task.

While the proposed architecture supports any form of compression/distortion, quadtree (QT)-segmented video frames were used. The Viterbi (Dynamic Programming) algorithm was used to minimize the area normalized weighted rate-distortion allocation of resources. The host receives only these degraded frames for analysis. An object detector is used to detect objects, and a Kalman Filter based tracker is used to track those objects. Evaluation of system performance is done in terms of Multiple Object Tracking Accuracy (MOTA) metric. In this proposed architecture, performance gains in MOTA is obtained by twice training the object detector with different system generated distortions as a 2-step process. Additionally, the object detector is assisted by a tracker to up score the region proposals in the detector to further improve the performance.

Wide area surveillance and monitoring systems are popularly deployed in places such as in airports, sporting events, harbors, or by militaries around the world, to monitor activities, behavior, or gather information to help protect life and commodities. Often the video gathered by these wide-area surveillance imaging systems are at high resolution, thereby generating huge volume of data over time. The proposed system focuses on the problem of optimal information extraction in wide-area surveillance using high resolution sensors with low computational power for imaging applications. The imaging instrument (i.e., the chip) can be of a high resolution Focal Plane Array (FPA) (e.g., >250 MPixels), providing imagery over a desired field of view, but with low computational power. Imagers of such high resolution capture data at a large bit rate, but do not process them fast enough.

Limited computational power in FPAs and other imaging devices is a key practical constraint in the devices currently available in the market. Moreover, the FPA contains Readout Integrated Circuit (ROIC) electronics, and the primary challenge is that the data bandwidth of the ROIC limits the maximum amount of data (in bits/s) that can be delivered by the sensor (chip). For such a sensor with low computational power capturing data at a high rate, the data can be analyzed remotely on a server with high computational power, termed as host, in order to perform computationally heavy tasks such as object detection, tracking, anomaly detection.

For a case of a very high bandwidth and high readout rate from the chip, the chip can send all its captured high resolution video frames to the host for data analysis, and the analysis of the data on the host can be straight-forward with state-of-art algorithms. However, in practice, having a very high data bandwidth is impractical due to various factors: ROIC electronics, commercial aspects to using large data bandwidth, lossy transmission media, etc. Thus, the chip can only send limited data to the host. In such a scenario, the chip is selective in sending a subset or a compressed representation of the captured high resolution video frames. Optimally selecting the compressed video frames is a challenging task for the chip. Moreover, the host has access to only the compressed frames, and task specific computations (such as object detection, tracking) are more difficult to be performed on compressed frames, as compared to high quality frames.

Commercial FPAs have different controls over spatio-temporal sampling. Pixel-binning and sub-sampling modes allow a dynamic trade-off between spatial and temporal resolution. For instance, high frame rates (e.g., >1 kfps) may be achieved at low resolution (e.g., <VGA), while maximum frame rates that can be achieved for high resolution FPAs (e.g., >10 MPixels) are typically low (<60 Hz). The pixel binning and sub-sampling modes provide a way to optimize sampling with constraints on the bandwidth of ROIC electronics.

Described below is an architecture which performs not only the objective task (such as object detection and tracking) but also an intelligent system which can adapt its acquisition based on the scene. In order to do so, object detection and tracking algorithms are used on the host which has high computational power to perform such tasks at low computational time.

More specifically, described herein is an algorithm for adaptive sampling of high bit rate data (such as from a high resolution FPA) that is optimized together with a reconstruction algorithm for object detection and tracking purposes. The architecture was developed based on an assumption that the imaging device (chip) has limited computational power and the host has high computational power. The communication channel between the chip and the host has limited bandwidth and hence, it is not possible to transfer all the captured data from the chip to host. The system thus uses a bandwidth limited resource constrained optimized solution for object tracking. The detection and tracking of multiple objects in a compressed image domain is a unique approach in the system. Since the framework is aimed at object tracking, the final evaluation metric for the performance of this algorithm is not the traditional reconstructed image quality measured, for example, by PSNR or SSIM, but rather a surrogate tracking performance metric, Multiple Object Tracking Accuracy, (MOTA) for tracking the objects of interest. Peak Signal to Noise Ratio (PSNR) is the ratio of the maximum power of the signal (image) and the power of distorting noise that affects the quality of the signal (image). Due to its wide dynamic range, PSNR is expressed in logarithmic decibel scale. On the other hand Structural Similarity Index (SSIM) is a perceptual metric which quantifies image quality degradation due to data compression or transmission losses.

The proposed host-chip architecture allows dynamic, modular, re-configurable and content-adaptive acquisition of data from an imager (chip) with low computational power, with an optimal bandwidth utilization. The optimization problem is posed as a resource allocation problem: given the constrained allowable data bandwidth between the host computer and chip, with low computational power on the chip, the system estimates the best tessellation per frame based on the Regions of Interest (RoIs). A frame thus has a reduced number of bits for its representation. In an illustrative embodiment, the host and chip mutually transmit only the most important information.

The proposed system is based on a computational imaging approach using a prediction-correction feedback paradigm. The goal of the host computer is to predict the location of the regions of interests (RoIs) for a particular frame and to be able to correct that prediction. The predicted RoIs for the chip, including the FPA and ROIC, help guide the chip to capture optimal information for the host to optimally perform object detection and tracking. The methodology has been developed with consideration of limited computational power on the chip which forces it to transfer data to the host to perform heavy computations.

The adaptive segmentation is data-driven based on a decomposition of the image into regions or blocks. While the architecture supports different distortion/compression introduced by these regions/blocks, in this work a focus is on adaptive segmentation of video frame based on a quadtree (QT) structure. The QT structure is used in part because it fits into the H.264, H.265/High Efficiency Video Coding (HEVC) and the latest H.266/Variable Video Coding (VVC) standards which partitions image frame into QT blocks. Thus, the architecture can be applied directly into the existing electronic hardware systems which utilizes latest HEVC or VVC standards and earlier H.264 standards as well.

The host-chip system has been developed as a prediction-correction feedback system as shown in FIG. 1. The host predicts the RoIs in a frame and updates its prediction based on the data received from the chip. This feedback mechanism is critical for the system as it prevents error propagation. The chip generates an optimized QT structure that subdivides the current frame into superpixels before transmitting them to the host. The bigger superpixels have high distortion which may be mitigated by subdividing them if sufficient bandwidth is available. Further QT subdivision, depending on available bandwidth, captures finer details in a frame. QTs for newly acquired frame on the chip contains information about the superpixels the host should update or skip in its frame of the previous time step. The intensities for the update regions are sent from the chip to the host. Skipped superpixels assume the value of the previous frame. The QT is optimized based on: (i) the distortion between the current and previously reconstructed frame, (ii) the predicted locations of the RoIs for the current frame, and (iii) the available bandwidth. A fast and effective recursive encoding of the QT structure in is used.

In an illustrative embodiment, the Chip for a particular frame sends QT, mode of leaves (skip or acquire), and pixel values corresponding to the acquire mode to the Host. The Host, based on this information, computes the RoIs for the next frame and sends the computed RoIs back to the chip. This iterative loop is repeated once for each frame the chip captures. It is noted that the host has access to only distorted frames which are compressed by the QT. The object detector on the host classifies and returns bounding boxes based on these distorted frames, which is more challenging compared to the undistorted, higher quality frames. The performance of the object detector deteriorates due to the QT compression, and hence it is desirable to boost its performance under low bandwidth conditions. This is of utmost importance for the host-chip architecture which should be robust to both bandwidth fluctuations and different operating conditions. Additionally, the object detector uses spatial information per frame to generate bounding boxes. In order to maintain a temporal continuity among the bounding boxes, the RoIs predicted by the object tracker are taken into account.

The system architecture including the host-chip framework is developed from the methodology of guiding a sensor (chip) through real-time tuning of its optimization parameters to collect data with highest content of useful information for object tracking. The architecture is based on the consideration of limited bandwidth channel capacity, B, between the host computer and chip with limited (low) computational power on the chip. The host-chip modular architecture has been developed keeping in mind the predictive-correction feedback system. The chip has low computational power while the host has high computational power. The disparity between the computational power of the chip and host drives the design of the host and chip models.

Figure 21:
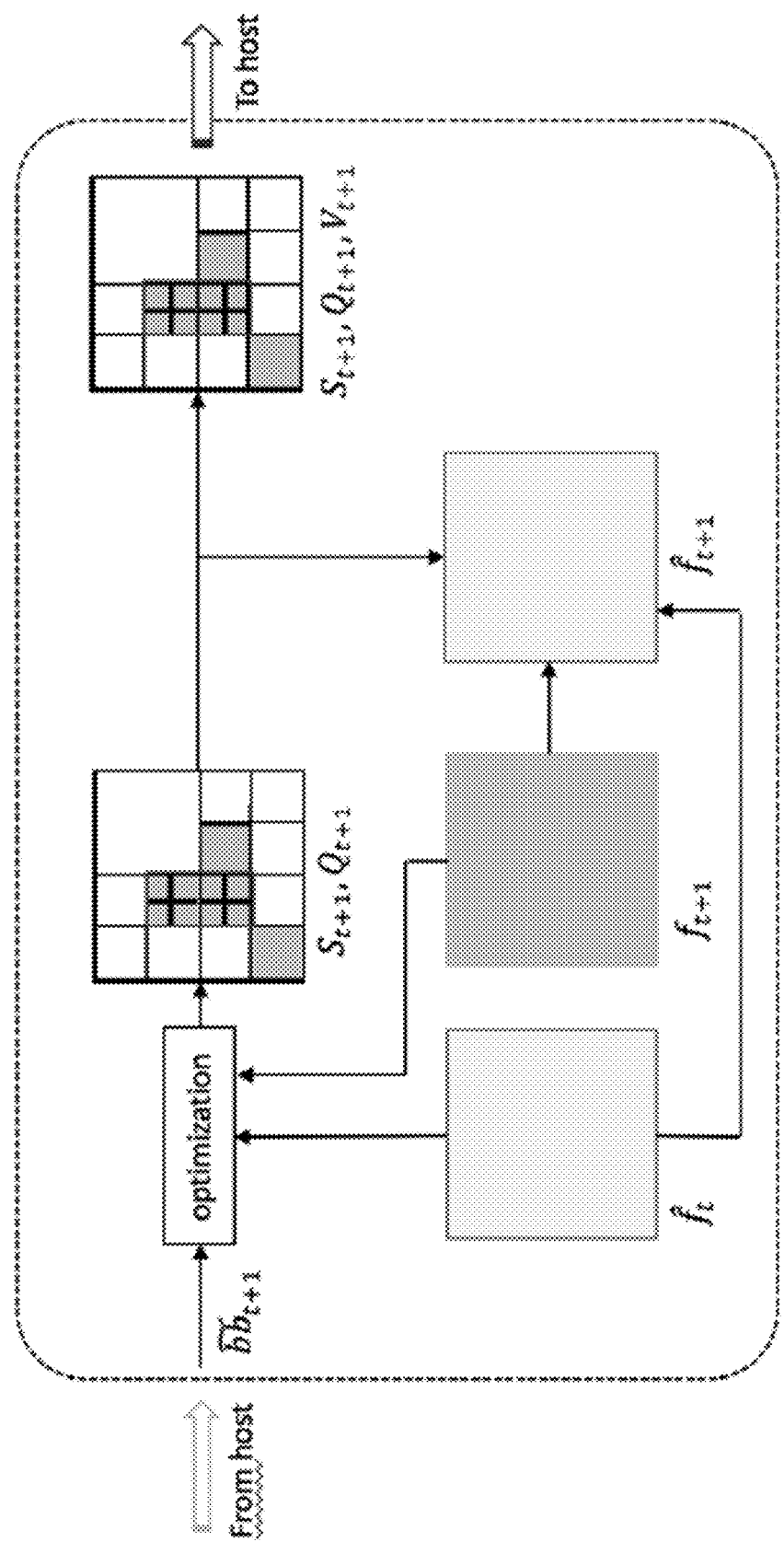
FIG. 21 shows the computation on the chip in accordance with an illustrative embodiment.

FIG. 21 shows the computation on the chip in accordance with an illustrative embodiment. The compression of video frame is based on a QT structure. The host computes the predicted bounding boxes $bb_{t+1}$, with $bb_{t+1} \in R^{4 \times P}$ (P is the number of bounding boxes detected), and sends it to the chip for time t+1. The chip has a copy of $f_t$, which is the distorted frame for time t. The full resolution undistorted frame at t+1, $\hat{f}_{t+1}$ is acquired at time t+1 by the FPA on the chip. These are inputs to the Viterbi Optimization Algorithm, which provides as output the optimal QT structure $S_{t+1}{}^t$ and optimal skip-acquire modes $Q_{t+1}{}^t$ subject to the communication channel bandwidth constraint B for time t+1. The skip (S) and acquire (A) modes in $S_{t+1}{}^t$ identify the QT leaves (blocks) where new data are to be acquired at time t+1 and the remaining leaves (QT blocks) where data will be copied from frame $f_t$.

The S and A modes are included in the framework, as this allows only a reduced set of data to be sent from the chip to the host, thereby aiding in data compression significantly. Now $\{f_t, f_{t+1}\} \in R^{N_1 \times N_2}$ where $N_1$, $N_2$=512 (for instance) is the resolution of the frame, $S_{t+1}{}^t \in R^{4 \times N}$ and $Q_{t+1}{}^t \in R^{2 \times N}$ with N as the maximum depth of the QT (N=9, for $N_1=N_2=512$). The bounding box information $bb_{t+1}$, is used to prioritize the distortion in the RoIs relative to other regions. The higher distortion in RoI regions forces the optimization algorithm to allocate more bits while performing the rate-distortion optimization. On the chip $S_{t+1}{}^t$, $Q_{t+1}{}^t$ provides the QT structure along with the skip/acquire modes. Corresponding to the acquire modes in $Q_{t+1}{}^t$ and acquired frame at t+1, $f_{t+1}$, the system can generate the pixel values for the leaves (QT blocks), $V_{t+1}$ for the acquire modes. Here, $V_{t+1} \in R^{N_a}$, with $N_a$ as the number of acquire modes in $Q_{t+1}{}^t$. The chip sends $S_{t+1}{}^t$, $Q_{t+1}{}^t$ and $V_{t+1}$ to the host in order to reconstruct the frame $f_{t+1}$. The differential information is sent from the chip to the host, instead of the whole frame. This helps in reducing the bandwidth required for transferring the relevant information to the host for performing the tasks of object detection and tracking.

The system uses Viterbi optimization to provide a trade-off between the frame distortion D and frame bit rate R. This is done by minimizing by frame distortion D over the leaves of the QT x subject to a given maximum frame bit rate $R_{max}$. Here, $\{D, R\} \in R^{4 \times N} \times R^{4 \times N}$ and $R_{max} \in R$, where N is the maximum depth of the QT. Unless previous works, the proposed system uses Viterbi optimization on the reconstructed frame $\hat{f}$ and the actual frame $f_{t+1}$ acquired by the chip to compute the distortion.

In an illustrative embodiment, the optimization is formulated as follows:

$$\arg\min_x D(x), \text{ s.t. } R(x) \leq R_{max} \quad (16)$$

The distortion for each node of the QT is based on the acquisition mode $Q_{t+1}{}^t$ of that node. If a particular node $\hat{x}_t$ of a reconstructed frame at time t is skipped, the distortion with respect to the new node at time t+1, $x_{t+1}$, is given by $$D_s = |x_{t+1} - \hat{x}_t| \quad (17)$$

On the contrary, if the node is an acquire, the distortion is proportional to the standard deviation σ. This is shown in Eq. 18, where N is the maximum depth of the QT and n is the level of the QT where distortion is computed. The root is defined to be on level 0, and the most subdivided level as N:

$$D_a = \sigma \times 4^{N-n} \quad (18)$$

It is noted that the distortion D is computed per block the QT and thus Ds, Da ∈ R. The total distortion is therefore defined as $$D = D_s + D_a \quad (19)$$

Figure 22:
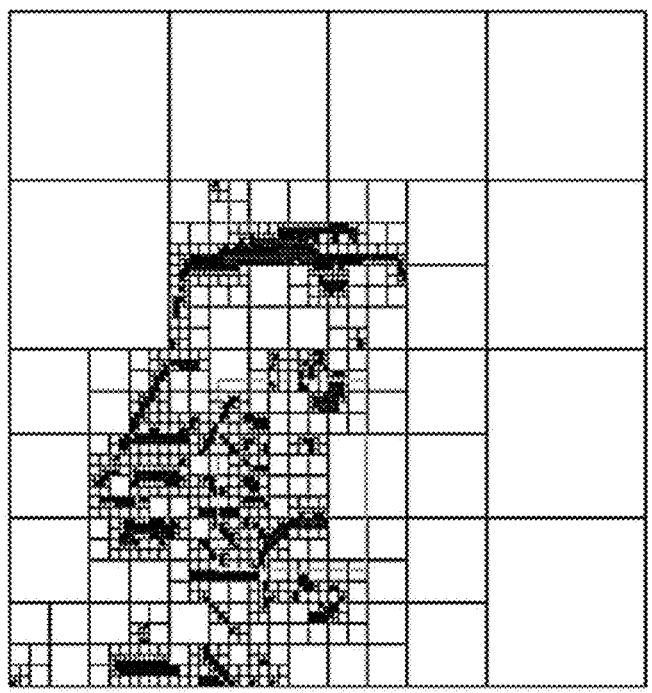
FIG. 22 depicts a sample frame with its QT decomposition containing the skip and acquire modes for λ=2.5, which corresponds to regime of low distortion in accordance with an illustrative embodiment.
Figure 22:
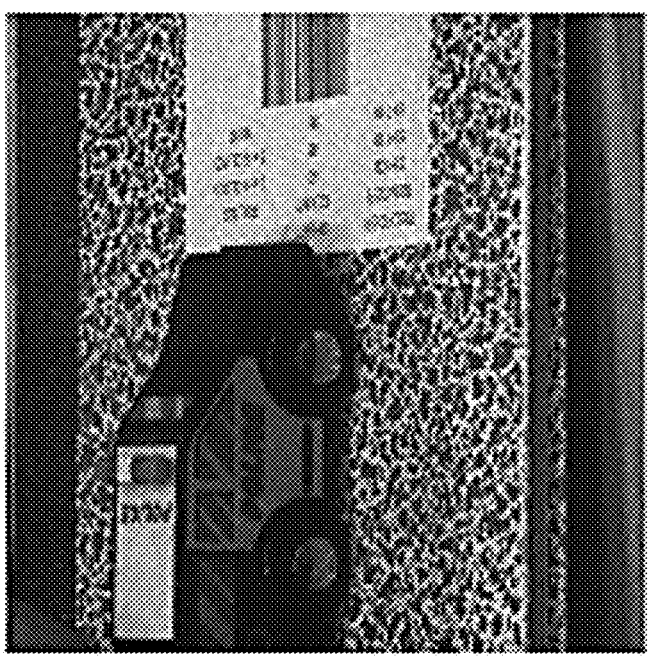

The constrained discrete optimization of Eq. 16 can be solved using Lagrangian relaxation, leading to solutions in the convex hull of the rate-distortion curve. The Lagrangian cost function is of the form $$J_\lambda(x) = D(x) + \lambda R(x), \quad (20)$$

where $\lambda \geq (\lambda \in R)$ is a Lagrangian multiplier. Here, $J_\lambda(x) \in R^{4 \times N}$ over all the leaves of the QT. It has been shown that if there is a $\lambda^*$ such that $$x^* = \arg \min_x J_\lambda *(x) \quad (21)$$

which leads to $R(x^*) = R_{max}$, then $x^*$ is the optimal solution to Eq. 16. This is solved using the Viterbi algorithm. FIG. 22 depicts a sample frame with its QT decomposition containing the skip and acquire modes for $\lambda = 2.5$, which corresponds to regime of low distortion in accordance with an illustrative embodiment.

In the distortion term, the system prioritizes the regions based on the bounding boxes, which are the RoIs of region i. This is introduced by the weight factors w in each region i. However, in case where a region i occupies a large area within the frame, the amount of distortion may heavily outweigh other smaller regions. It is thus desirable to have a weighted distortion that is independent of the area of RoIs i. This is done by dividing the weighted distortion by the area of the RoIs of region i, thus modifying Eq. 20 as $$J_\lambda(x) = \sum_{i \in \Omega} \frac{w_i D_i(x_i)}{A_i} + \lambda R(x) \quad (22)$$

where, $\Omega$ is the set of differently weighted regions, $D_i$ the distortion of region i ($D_i \in R$), $w_i$ the weight of region i ($w_i \in R$), $A_i$ the area of region i ($A_i \in R$), and the leaves in the QT of region i.

The system can also be operated in a fixed bit rate within a certain tolerance. In such an embodiment, the $\lambda$ value in the Lagrangian multiplier is adjusted at each frame for achieving the desired bit rate. The optimal $\lambda^*$ is computed by a convex search in the Bezier curve. The Bezier curve accelerates convergence in fewer iterations.

Figure 23:
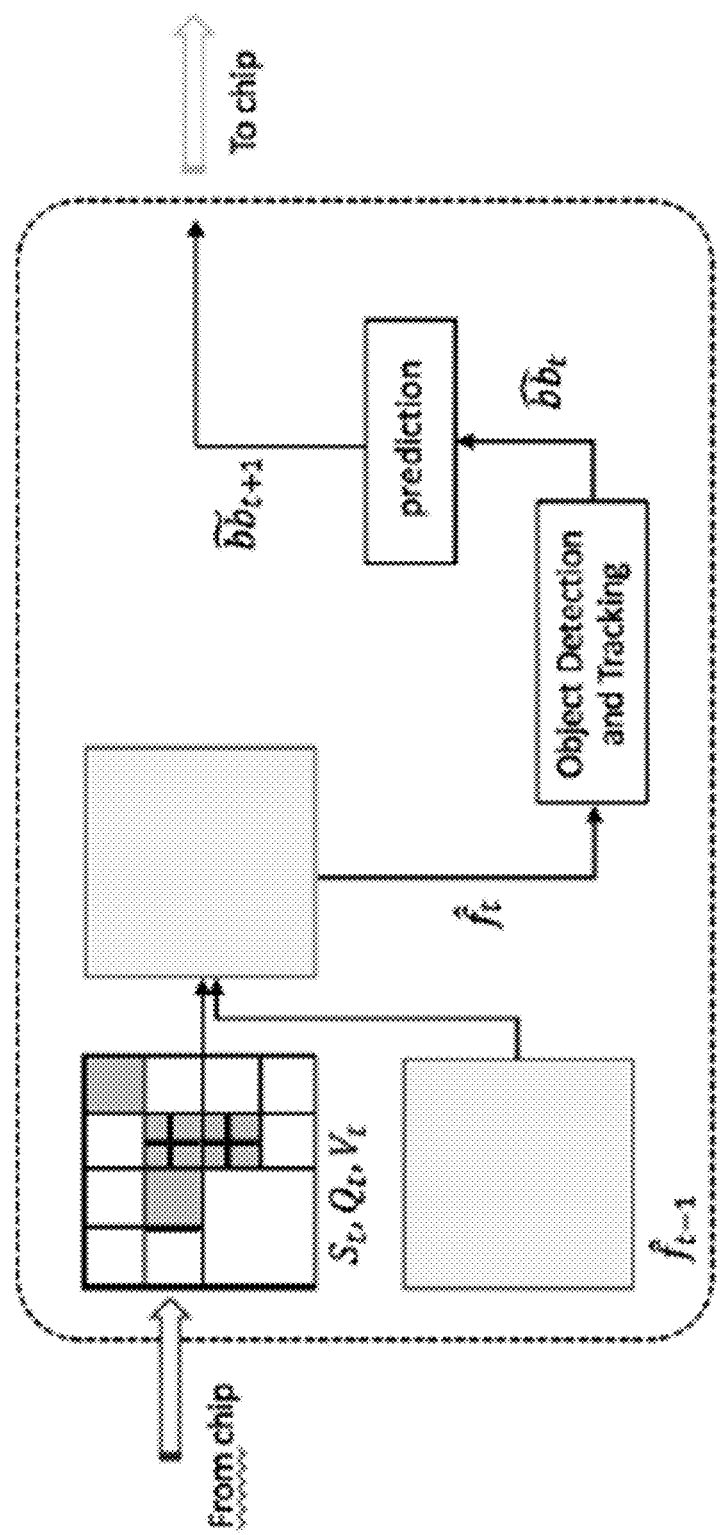
FIG. 23 shows the computation on the host in accordance with an illustrative embodiment.

FIG. 23 shows the computation on the host in accordance with an illustrative embodiment. For a undistorted frame $f_t$ acquired at time t on the chip, there is QT acquisition, skip or acquire modes for the leaves, and values for the leaves of acquire modes, denoted by $S_{t+1}{}^t$, $Q_{t+1}{}^t$ and $V_{t+1}$, respectively. These values are sent from the chip to the host in order to reconstruct frame $\hat{f}_{t+1}$. The previously reconstructed frame $\hat{f}_{t+1}$ for time t+1 saved on the host is used to copy the values in the skip leaves of $\hat{f}_t$. Here $\{f_t, \hat{f}_t, f_{t-1}\} \in R^{N_1 \times N_2}$ where $N_2 = 512$ (for example) is the resolution of the frame, $S_{t+1}{}^t \in R^{4 \times N}$ and $Q_{t+1}{}^t \in R^{2 \times N}$ with N as the maximum depth of the QT (N=9, for $N_1 = N_2 = 512$). An object detector on the host can determine the RoIs of the reconstructed image $\widetilde{bb}_t$. The RoIs are fed into a Kalman Filter-based object tracker as an observation, which updates the state of the filter. The Kalman Filter then predicts the locations of the next RoIs for the next frame at time t+1, based on a linear motion model, denoted as $bb_{t+1}$. Here, $\{\widetilde{bb}_t, bb_{t+1}\} \in ^{4 \times P}$ (P is the number of bounding boxes detected). These predicted RoIs for frame at t+1 are sent back to the chip. A copy of the distorted reconstructed frame $\hat{f}_t$ is kept in the host for creating the reconstructed frame $f_{t+1}$ at time t+1.

The regions of interest are detected by using an object detector based on the reconstructed frame on the host as shown in FIG. 23. While any object detector can be used, Faster R-CNN was used in the prototype for detecting objects of interest owing to its higher accuracy than other deep learning based object detectors. Faster R-CNN includes two modules. The first module includes the convolutional layers of VGG16 which extracts features. A region proposal network (RPN) finds and labels regions of probable objects as foreground or background. The second module classifies the objects in those region proposals and also regresses a bounding box for each object. This object detector on the host has access to only distorted reconstructed frames. For enhancing its performance on degraded data as well, the object detector has been trained on distorted and undistorted data. Additionally, in order to ensure continuity among the frames in terms of detected objects, the bounding boxes predicted by the tracker is used to assist the Faster R-CNN. Multiple classes of objects were used to train the Faster R-CNN network.

The object detector generates bounding box with class labels, which are fed as input to an object tracker. While any tracker can be used, a Kalman Filter-based multiple object tracker was used in the prototype, with Simple Online and Realtime Tracking (SORT) adapted into this object tracker implementation. The object tracker uses a linear motion model to predict the bounding box locations in the next frame $f_{t+1}$. It then associates the identities using linear assignment between the new detections from Faster R-CNN and the most recently predicted bounding boxes. The state of the Kalman Filter, $X_s$, for each detection is modeled using a linear motion model as $$X_s = [u, v, s, r, \dot{u}, \dot{v}, \dot{s}]^T \quad (23)$$

where u and v represent the coordinates of the target's center, and s and r represent the scale (area) and the aspect ratio (width/height) of the target's bounding box, respectively. Three of these time derivatives are part of the state parameters as well, namely $\dot{u}$, $\dot{v}$, and $\dot{s}$.

When a detection is associated with a target, the target state is updated using the detected bounding box. The velocity components of the state can be solved optimally via the Kalman filter framework. The predicted bounding boxes are extracted from predicted state of the Kalman filter. These are the RoIs for acquisition of the next frame $f_{t+1}$ which are also input to the Viterbi algorithm. However, when there is no detection from the object detector, the predicted bounding boxes are translated following the constant motion model for $N_{tracked}$ consecutive frames. The predicted bounding boxes are fed into the Faster R-CNN for up-scoring those predictions. Additionally, the predicted regions are of higher quality due to lower distortion in those regions as described in Eqn. 22. This allows the Faster R-CNN to detect objects in one out of N frames and still be tracked using the Kalman Filter, thereby improving the tracking accuracy.

As discussed herein, the multi-target performance is measured using the Multiple Object Tracking Accuracy (MOTA) evaluation metric, which can be referred to MOTA (Eqn. 15), or as $MOTA_{full}$, $$MOTA_{full} = 1 - \sum_t \frac{m_t + fp_t + mme_t}{g_t} \quad (24)$$

where $m_t$ represents the number of missed detections at time t, $fp_t$ the number of false positives at time t, $mme_t$ the number of mismatch (track switching) errors at time t, and $g_t$ the number of ground truth objects at time t.

A modified MOTA metric which does not penalize the false positives was also considered. It is important for many object tracking applications that all objects that should be tracked are indeed tracked, especially when there is an increased difficulty in detecting the objects in degraded frames. The modified MOTA ($MOTA_{mod}$) is given by $$MOTA_{mod} = 1 - \sum_t \frac{m_t + mme_t}{g_t}. \quad (25)$$

A higher score of $MOTA_{mod}$ and $MOTA_{full}$ corresponds to higher tracking of the objects in the video sequence and hence better performance. Experiments were conducted for different values of $\lambda$ in reference to Eq. 20, which provides operating point in the rate-distortion curve. This provides different average bit rates over a video sequence, which are a fraction of the maximum rate. For different values of $\lambda$, the distortion and the bit rate fluctuates for each frame. However, in practice the communication channel between the chip and the host is bandwidth-limited. Thus the bit rate of the data sent through the channel can only vary within a certain tolerance (e.g., <1%). In order to keep the bit rate constant, for each frame, the value of $\lambda$ is varied. This mode of operation keeps the rate fixed, within certain tolerance, but the distortion varies frame to frame.

The system is designed to achieve good object tracking performance for different bit rates R. The object detector identifies the RoIs, which are input to the object tracker. Hence, the host has a role of detecting and tracking objects in each frame. However, the host has access to only the reconstructed frame $\hat{f}_t$ at time t, which is a distorted version of the uncompressed high quality frame. In order to perform better, the Faster R-CNN can also be trained with similarly distorted frames. This improves the detection accuracy of the Faster R-CNN for system-generated distortions at different bit rates.

Traditionally, object detectors are trained on data from publicly available datasets such as COCO, PASCAL VOC, and ImageNet, among others. Most of the datasets have been curated using a good quality camera, and the inherent distortions and noise in those image/video frames is low. Thus, these object detectors are finely tuned to the image quality of the particular dataset. The detection performance worsens once it is tested with other forms of distortion. In order to address this issue and improve the performance of the detector on distorted frames, training the object detector was performed using a two stage approach. This two step approach achieves much higher performance with system-generated distortions than training with undistorted images. Specifically, the ILSVRC VID dataset was used to train the Faster R-CNN. Since the work is catered to surveillance applications in ground, air and water scenes, the object detector was trained on Airplanes, Watercrafts and Cars as discussed above. However, the system is not so limited, and the proposed architecture can work with an object detector trained on any number of classes. The training data in this dataset has been split into 70:30, randomly, as training and validation data for training the Faster R-CNN.

In a first training operation, the object detector in the host is replaced by Ground Truth bounding boxes. This creates exact bounding boxes (RoIs) precisely encompassing the entire object while still generating data consistent with the degradation one would see in the system.

The RoIs are transmitted to the chip. The chip finds the optimal QT according to the RoIs, $\lambda \in \{50, 100, 250, 400, 650\}$ (the value in the Viterbi optimization algorithm), along with the full undistorted frame $f_t$ on the chip and the previous reconstructed frame $\hat{f}_{t-1}$. The distortion levels in the system are set by the weights $w_i$ in the RoIs and background. The weights are uniquely selected such that the resulting distortion in the background is significantly higher than that in the RoIs. For each value of $\lambda$, the entire training data is passed through the architecture which from $\hat{f}_t$ creates the training and validation dataset for Faster R-CNN. The data in the original dataset corresponding to $\lambda=0$ is also included in the dataset. The Faster R-CNN trained on this distorted data has seen high quality data as well as data with different degrees of distortion corresponding with $\lambda$. The higher the $\lambda$ is, the higher the distortion. Ground truth annotations are used for training and validation of the Faster R-CNN.

Figure 24:
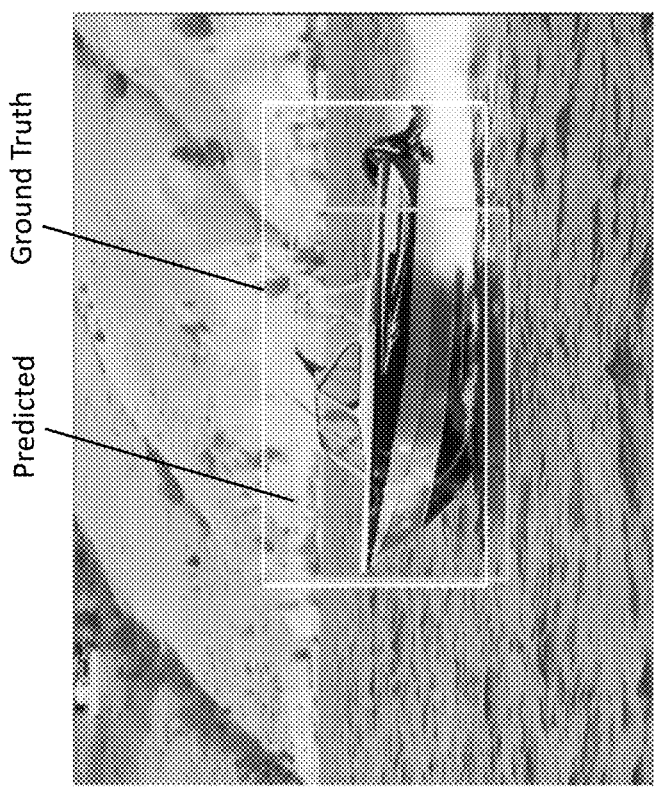
FIG. 24 depicts an example in which a portion of the bounding box does not entirely overlap the object of interest (boat) in accordance with an illustrative embodiment.

The Faster R-CNN trained in the first operation has been trained on perfect bounding boxes which encompass the object completely. However, in actual scenarios, the object detector may detect bounding boxes which may not perfectly align with the object. For example, part of the bounding box may not entirely overlap with the object. FIG. 24 depicts an example in which a portion of the bounding box does not entirely overlap the object of interest (boat) in accordance with an illustrative embodiment. The bounding box predicted by the object detector is labeled, and as shown it does not align perfectly with the ground truth bounding box, also labeled. Specifically, the tail and top of the boat are not covered by the predicted bounding box, whereas portions of the background in the bottom of the boat is included in the predicted bounding box.

Regardless, the Kalman Filter predicts RoIs for the next frame based on these imperfect detections. The chip then acquires the next frame based on these imperfections and sends them to the host. Portions of the object inside the RoI will be less distorted and portions outside the RoI will be highly distorted as per the weight ratio. In order to improve the object detector performance, the Faster R-CNN is trained on this type of unique distortion, in which part of the object is segmented finely with less distortion and the rest of the object is segmented coarsely with high distortion. This is the objective of the second operation in training. The Faster R-CNN trained from the first operation is used as the object detector in the host. The bounding boxes detected by the Faster R-CNN are passed to the Kalman Filter to update the state and predict the RoIs in the next frame. The chip reconstructs the frame based on these RoIs predicted by the Kalman Filter. Analogously to training in the first operation, for each value of $\lambda \in \{50, 100, 250, 400, 650\}$ along with the original dataset ($\lambda=0$), the entire training data is again passed through the architecture which creates $\hat{f}_t$, the training and validation data. The ground truth annotations are used for training and validation in this operation as well.

The Faster R-CNN trained in the first operation, during the testing phase generates the bounding boxes closely aligned to the actual physical object. However, it may not generate perfect bounding boxes exactly aligned to the actual physical object. The bounding box detections partially align with the actual objects in most of the cases. These bounding boxes are then passed onto Kalman Filter, which predicts the RoIs imperfectly compared to the actual object and sends them back to the chip. The reconstructed frame on the chip thus has different degrees of distortion corresponding to the entire actual physical object. The second operation in the training is hence important, as it trains the Faster R-CNN taking into account the different distortion levels for the object.

Figure 25:
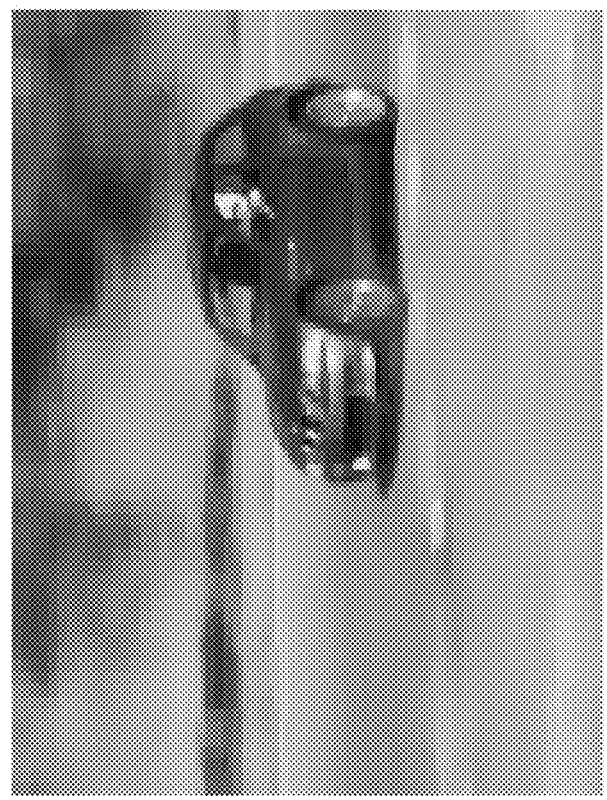
FIG. 25 depicts an example of a frame with differing distortion in the RoIs and the background in accordance with an illustrative embodiment.

The system performance is sensitive to the training data for the object detector. The generation of distorted data for training and validating the Faster R-CNN depends on the weights assigned to the RoIs and elsewhere. This is important as it dictates the extent of relative distortion. Based on randomly selected videos from the training data, for $\lambda \in \{100, 350, 650\}$ corresponding to low, medium, and high distortions respectively, the weights as $w_i=10^7$ for the RoIs and $w_i=10^6$ for the rest of the regions (background) were selected. This was done with reference to Eq. 22, which visually made distortion between the RoIs and the background distinct, and with the background not too heavily distorted compared to the RoIs. FIG. 25 depicts an example of a frame with differing distortion in the RoIs and the background in accordance with an illustrative embodiment. As shown, the car within the RoI, has a finer segmentation (and therefore lower distortion) than the background.

The tracking performance of the system was tested with object detector models trained on different datasets. Specifically, videos including airplanes, cars, and watercraft from the ILSVRC VID dataset of different distortions were used for training six different Faster R-CNN models. In a Pristine NN model, a Faster R-CNN was trained exclusively with pristine (non-distorted) data. In a Uniform NN model, the Faster R-CNN was trained with pristine data and uniformly binned 2×2, 4×4, and 8×8 data. In a Mixed NN model, the Faster R-CNN was trained with pristine data and distorted data for a mixed assortment of $\lambda \in \{50, 100, 250, 400, 650\}$ generated in the first training operation. In a Mixed+NN model, the Faster R-CNN was trained with pristine data and distorted data for $\lambda \in \{50, 100, 250, 400, 650\}$ generated in the second training operation. In a MixedU NN model, the Faster R-CNN was trained with pristine data, uniformly binned 2×2, 4×4, and 8×8 data, and distorted data for $\lambda \in \{50, 100, 250, 400, 650\}$ generated in the first training operation. In a MixedU+NN model, the Faster R-CNN was trained with pristine data, uniformly binned 2×2, 4×4, and 8×8 data, and distorted data for $\lambda \in \{50, 100, 250, 400, 650\}$ generated in the second training operation.

In the Mixed+ model, the Mixed model is used on the Host to generate distorted data as mentioned in the second training operation. Similarly, in order to generate MixedU+ model, the MixedU model is used as the object detector to generate distorted data as mentioned in the second training operation. The NN models were trained using ADAM as the optimizer with a learning rate of $1^{e-5}$. Dropout of 0.5 was used while training the models. During testing, no dropout was used. In alternative embodiments, different dropout values may be used.

Figure 26:
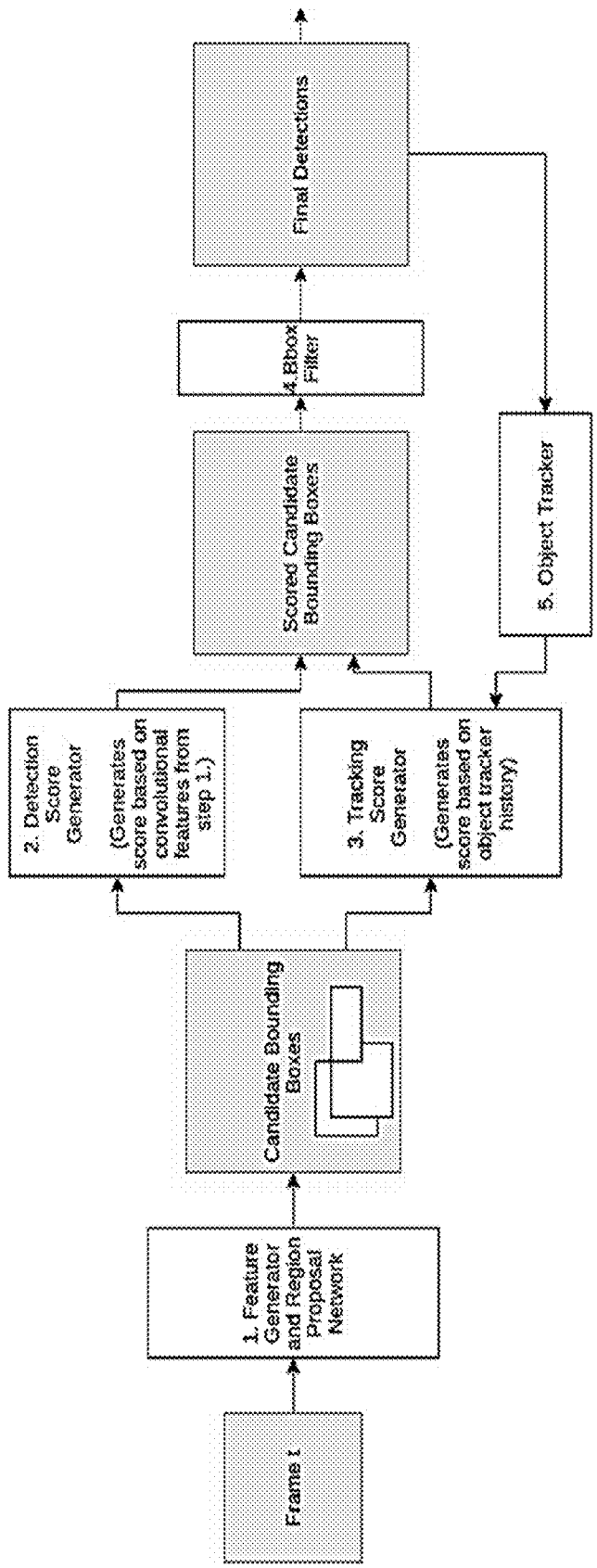
FIG. 26 depicts a joint detector-tracker system in accordance with an illustrative embodiment.

The proposed system uses a region-based object detector (e.g., Faster R-CNN) with the Kalman Filter based tracker to form a joint Detector-Tracker (JDT) system. FIG. 26 depicts a joint detector-tracker system in accordance with an illustrative embodiment. As shown, the region based object detectors (e.g. Faster R-CNN) generates lot of candidate bounding boxes (more than the number of objects in the scene) before eventually removing most of them. To prioritize the candidate bounding boxes overlapping with the object, a set of detection confidence scores are calculated for each candidate bounding boxes. If the detection confidence score of candidate bounding boxes is lower than pre-defined threshold, those candidate bounding boxes are classified as background class and removed. However, this approach does not take into account any temporal continuity between the frames.

In order to utilize the temporal consistency among the image frames, the concept of "tracking confidence score" is introduced to describe the likelihood of a given bounding box containing a tracked object. Similar to detection confidence scores for each class of object, multiple tracking confidence scores are used, one for each object class. The tracking confidence scores are computed based on the highest Intersection over Union (IoU) values between all candidate bounding boxes with the bounding box predicted by the tracker. Additional constraints are forced while computing the IoU in order to remove the false positives. Specifically, candidate bounding boxes with IoU<0.3 are rejected, and candidate bounding boxes with difference in size greater than 50% are not considered.

The joint confidence score $C_j$ is computed from the detection score $C_d$ and tracking score $C_t$ using Eqn. (26) with $w_t$ and $w_d$ as the tunable parameter which weights the tracking confidence score and detector confidence score, respectively.

$$C_j = \sqrt{w_d C_d^2 + w_t C_t^2} \qquad (26)$$

Combining both the tracking and detection scores for the candidate bounding boxes can be complicated. In one embodiment, the two scores are fused into a joint confidence score satisfying the following principles: (1) bounding boxes containing objects entering the scene should not have their score be penalized by lack of tracking information, (2) bounding boxes that have low detection score but high tracking score should have their joint score be boosted by virtue of its high tracking score, and, (3) bounding boxes which have mediocre detection score and tracking score should have a lower joint score than a bounding box with at least one excellent confidence score. With a drop in quality of the frames, the candidate bounding boxes with low detection scores can be compensated with high tracking scores. Also, an object entering the scene without any tracking history is rewarded with a higher detection or tracking score, without penalizing cases where one score is much lower than other.

The experimental performance results of the system are shown by simulating the proposed model on three sequences of the ILSVRC VID dataset: (i) a video of airplanes, ILSVRC2015_val_00007010.mp4; (ii) a video of a watercraft, ILSVRC2015_val_00020006.mp4; and (iii) a video of cars, ILSVRC2015_val_00144000.mp4. These videos are selected to have optically small, medium, and large sized objects as well as sequences with one, two, and multiple objects. The frames were resized to 512×512 to accommodate the QT structure. The maximum depth of the tree is thus N=9.

Figure 28:
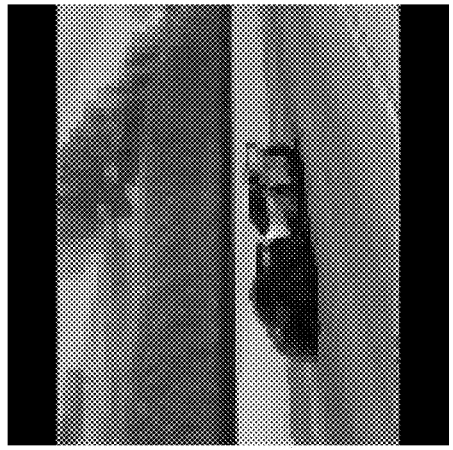
FIG. 28 shows a sample frame $f_{60}$ for different sequences at bit rate of 1.5% of the maximum bit rate in accordance with an illustrative embodiment.
Figure 28:
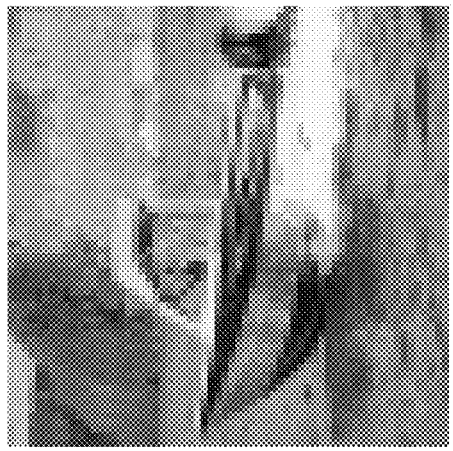
Figure 28:
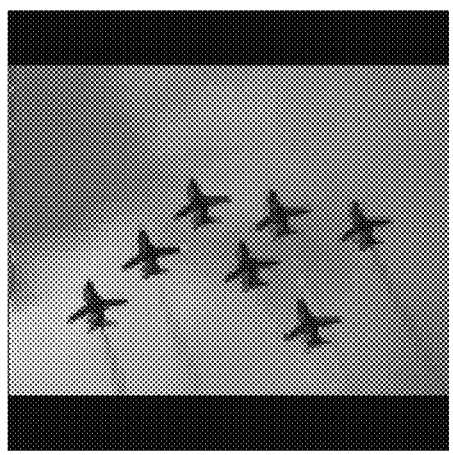

The amount of the distortions at different bit rates are important parameters in identifying the distortion which is generated by this system. FIG. 27 is a table that shows the variations of the distortions as PSNR and SSIM metrics computed for the sequences at different bit rates in accordance with an illustrative embodiment. The uncompressed bit rate was 62.91 Mbits/s. The PSNR and SSIM has been computed at different % bit rate with respect to this uncompressed bit rate. For small and medium sized objects, the PSNR and SSIM are quite low for low bit rates while for relatively larger sized objects (e.g. the boat sequence), the distortions are significantly higher as shown by relatively low PSNR and SSIM values. The performance of the system has been optimized to such high distortion levels where the object is almost not recognizable. FIG. 28 shows a sample frame $\hat{f}_{60}$ for different sequences at bit rate of 1.5% of the maximum bit rate in accordance with an illustrative embodiment. As shown in the watercraft sequence, the tail of the boat is not recognizable, while the cars and planes can be recognized at such bit rates. It should be kept in mind that the PSNR and SSIM values are only for visual quality. The end performance of the system can be determined by the MOTA metric.

Figure 29:
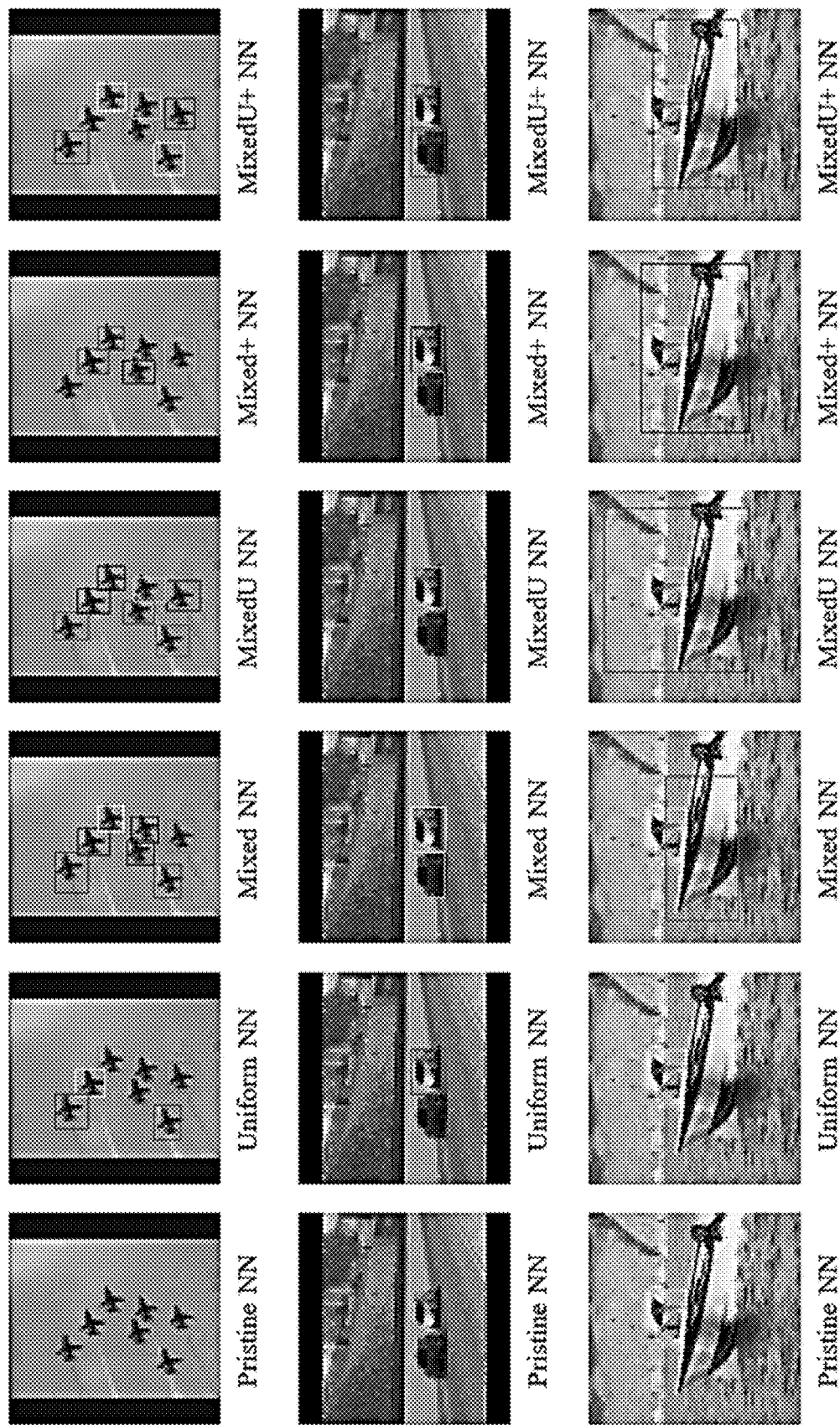
FIG. 29 show the detections in the distorted frame of airplane, car, and watercraft sequences for each of the six Faster R-CNN models, with distorted frames generated at λ=400 in accordance with an illustrative embodiment.

In one mode of operation, $\lambda$ is kept constant. This fluctuates the rate and distortion per frame. MOTA can be computed for each sequence for the performance of the system trained with different object detectors. The effect of the above-described 2 step-training methodology is demonstrated here. Tracker assisted object detector up-scoring is not included in this subsection of experiments. FIG. 29 show the detections in the distorted frame of airplane, car, and watercraft sequences for each of the six Faster R-CNN models, with distorted frames generated at $\lambda$=400 in accordance with an illustrative embodiment. The Pristine NN detector fails to detect the objects in each of the three cases. On the other hand, the Uniform NN detector detects a few objects. Mixed NN and MixedU NN detectors are able to detect almost all of the objects. However, the bounding boxes given by these detectors either overfit the objects with excess background included or underfit the objects. On the other hand Mixed+ and MixedU+NN detectors perform a better job in fitting the bounding box to the objects in the scene including minimum background.

Figure 30:
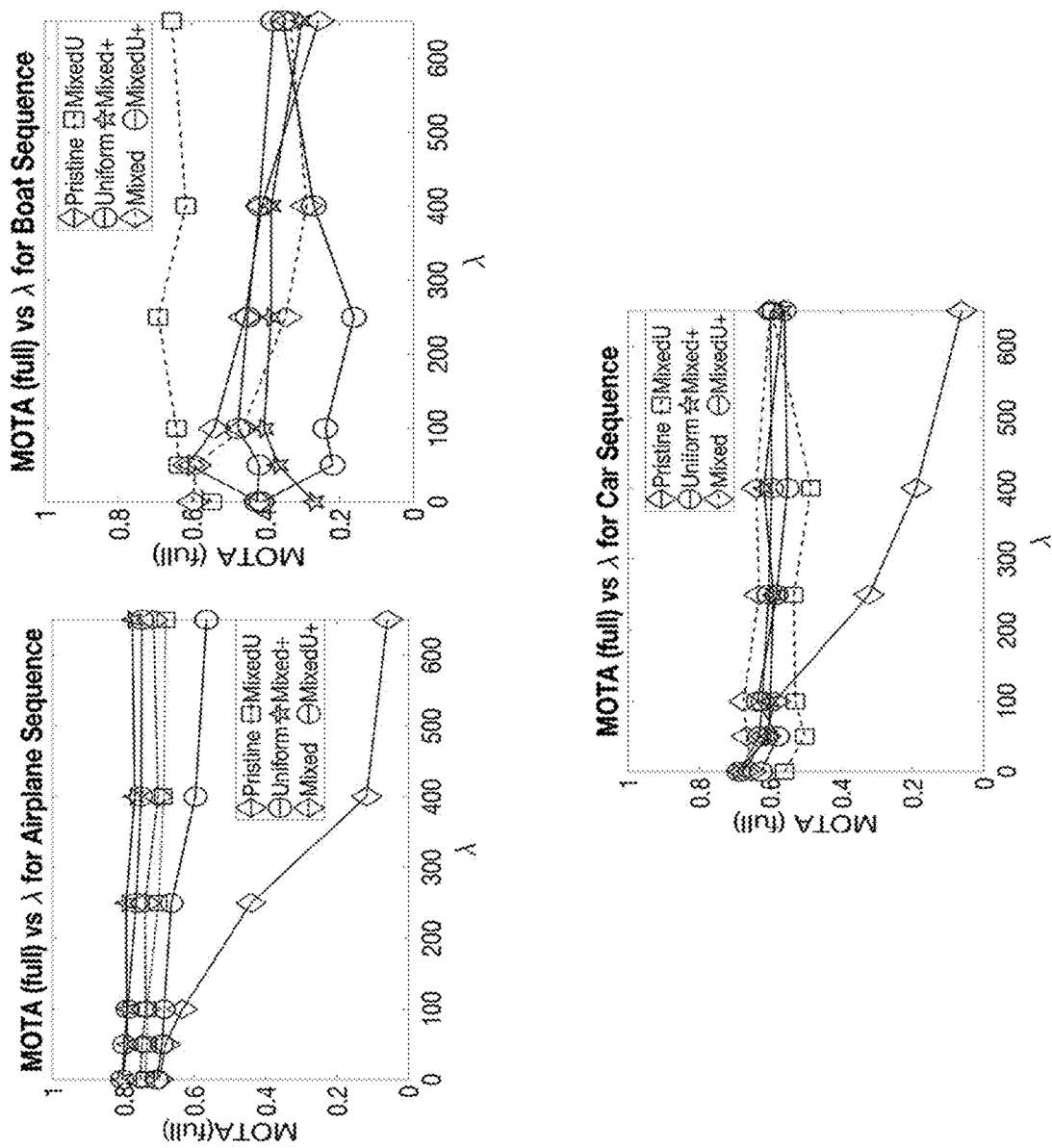
FIG. 30 shows the $MOTA_{full}$ curves (Equation 24) for the airplane, boat, and car sequences in accordance with an illustrative embodiment.
Figure 31:
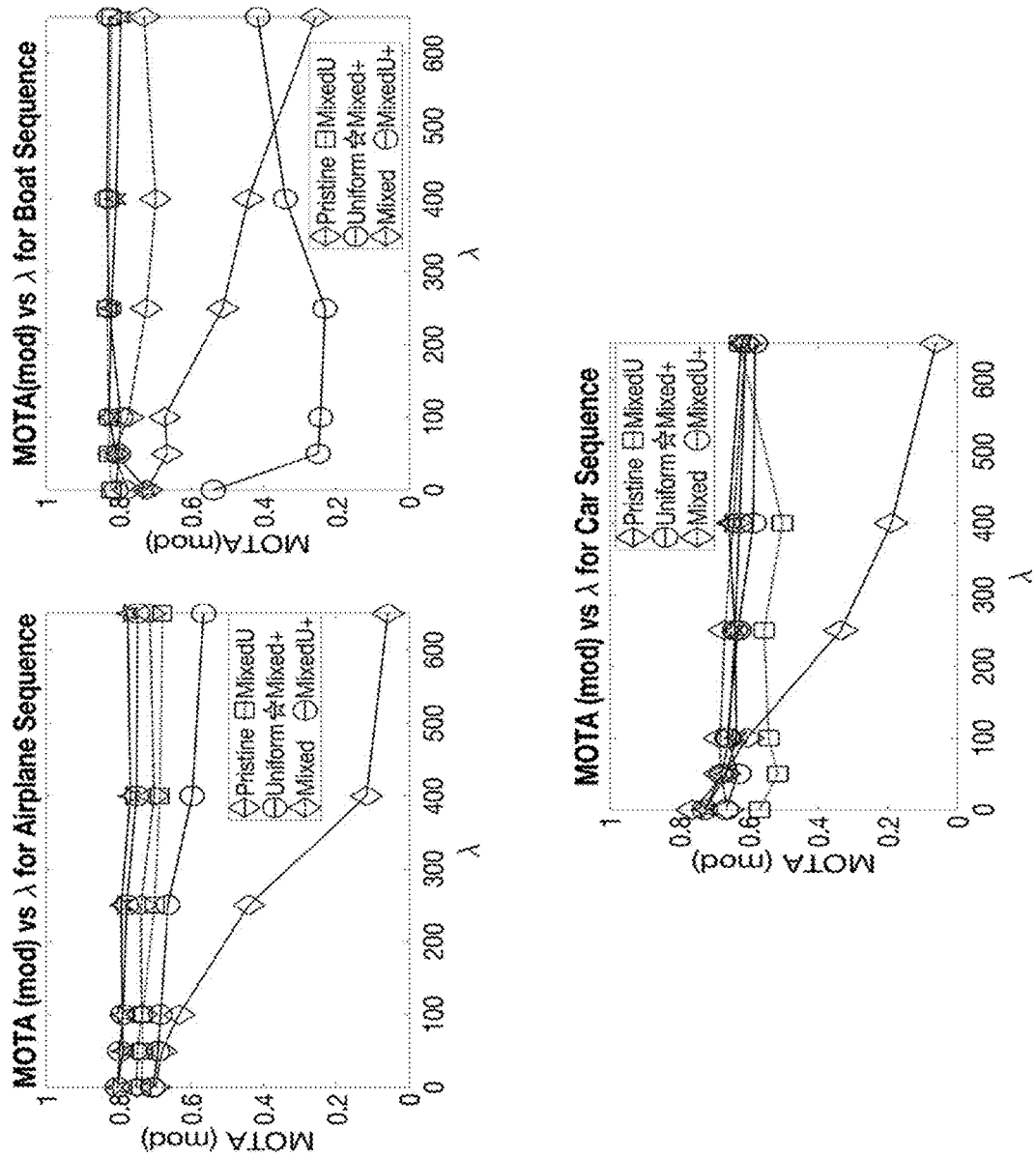
FIG. 31 shows the $MOTA_{mod}$ curves (Equation 25) for the airplane, boat, and car sequences in accordance with an illustrative embodiment.

FIG. 30 shows the MOTA$_{full}$ curves (Equation 24) for the airplane, boat, and car sequences in accordance with an illustrative embodiment. FIG. 31 shows the MOTA$_{mod}$ curves (Equation 25) for the airplane, boat, and car sequences in accordance with an illustrative embodiment. As shown in FIGS. 30 and 31, there are seven small sized airplanes within the full frame, and some become obscured over time. It is seen that the system trained with the Pristine NN has significant deterioration in performance after $\lambda$=250. The performance of the Uniform NN is significantly better for higher $\lambda$ values than the Pristine NN detector. This indicates that the QT for small objects can be replaced with uniform binning. However, the performance of Mixed and MixedU NN-based detectors is better than the Uniform NN detector—suggesting the benefits of using actual degraded data generated by the system for training the Faster R-CNN. The best performance is obtained by using the Mixed+ and MixedU+ NNs. The Mixed+NN detector performance is slightly better than the MixedU+NN detector since the exact degradations correspond to the QT binning. In MixedU+NN, the NN has been trained on actual system generated distortions as well as uniformly binned data. Thus the 2 step training strategy helped in improving the performance metric.

With respect to the cars in FIGS. 30 and 31, it is seen here as well that the Pristine NN has a performance drop after $\lambda$=250. The Uniform NN detector performance is better for higher $\lambda$ values compared to the Pristine NN detector. The Mixed NN detector has higher accuracy than the Uniform NN detector. The MixedU NN detector performance is worse than the Mixed NN and Uniform NN detectors. This indicates that training using both system generated and uniform distortions may lead to a sub-optimal performance. However, with the proposed 2 operation training, the performance of MixedU+ is greater than MixedU. The Mixed+ NN detector performance is within about 0.05 at worse ($\lambda$=100) to the Mixed NN detector for most of the $\lambda$ values. The Mixed NN detector trained with only the system generated data has performance close to that of the Mixed+NN and MixedU+NN detector. However, overall, the performance of MixedU+ and Mixed+NN detectors is better than that of the pristine detectors.

The watercraft sequence has a large boat which occupies most of the frame during the entire sequence. As shown in FIGS. 30 and 31, the Pristine NN performance drops significantly beyond $\lambda \geq 250$ as in the previous two cases of small and medium sized objects. The Uniform NN detector performance is lower for most of the $\lambda$ values than the Pristine NN detector. The Mixed NN detector and MixedU NN detector performance is higher than the Pristine NN detector. Surprisingly, the MixedU NN detector performance is higher than the Mixed NN detector performance. This implies that for large sized objects, the system generated distortion is different from uniform binned distortions, and training the detector with both these types of distortions actually aids the performance. The performance of Mixed+ NN detector is better than the Mixed NN detector. However, the performance of MixedU NN detector is higher due to less false positives. Considering no false positives in the metric, the performance of MixedU+NN, MixedU NN and Mixed+ detectors are very similar. The MixedU+ detector performance is within about 0.05 at worse ($\lambda$=100) to the MixedU NN detector for most of the $\lambda$ values. In this case, the 2-operation training process does improve the system performance especially when one uses the MOTA$_{mod}$ metric, thus highlighting benefit of this training process.

From experimental studies, it was observed that Mixed and MixedU detectors are able to perform better for medium and large sized objects respectively, mostly due to lack of false positives. However, the performance of the Mixed+ and MixedU+ detectors are the best among the different Faster R-CNN models across the board especially when false positives are ignored. It is also observed that when background objects are significantly present (e.g., in the boat sequence), MixedU and Mixed NN detector tends to perform better with false positives considered in MOTA$_{full}$. However, the experimental studies suggest the benefits of the proposed 2-operation training process for improving the performance metric for most of the cases. The object detector trained only once (MixedU and Mixed) has performance improvements over Pristine NN detector as well, but in general the performance gains are lower than that of the 2-operation trained MixedU+ and Mixed+ models.

Figure 32:
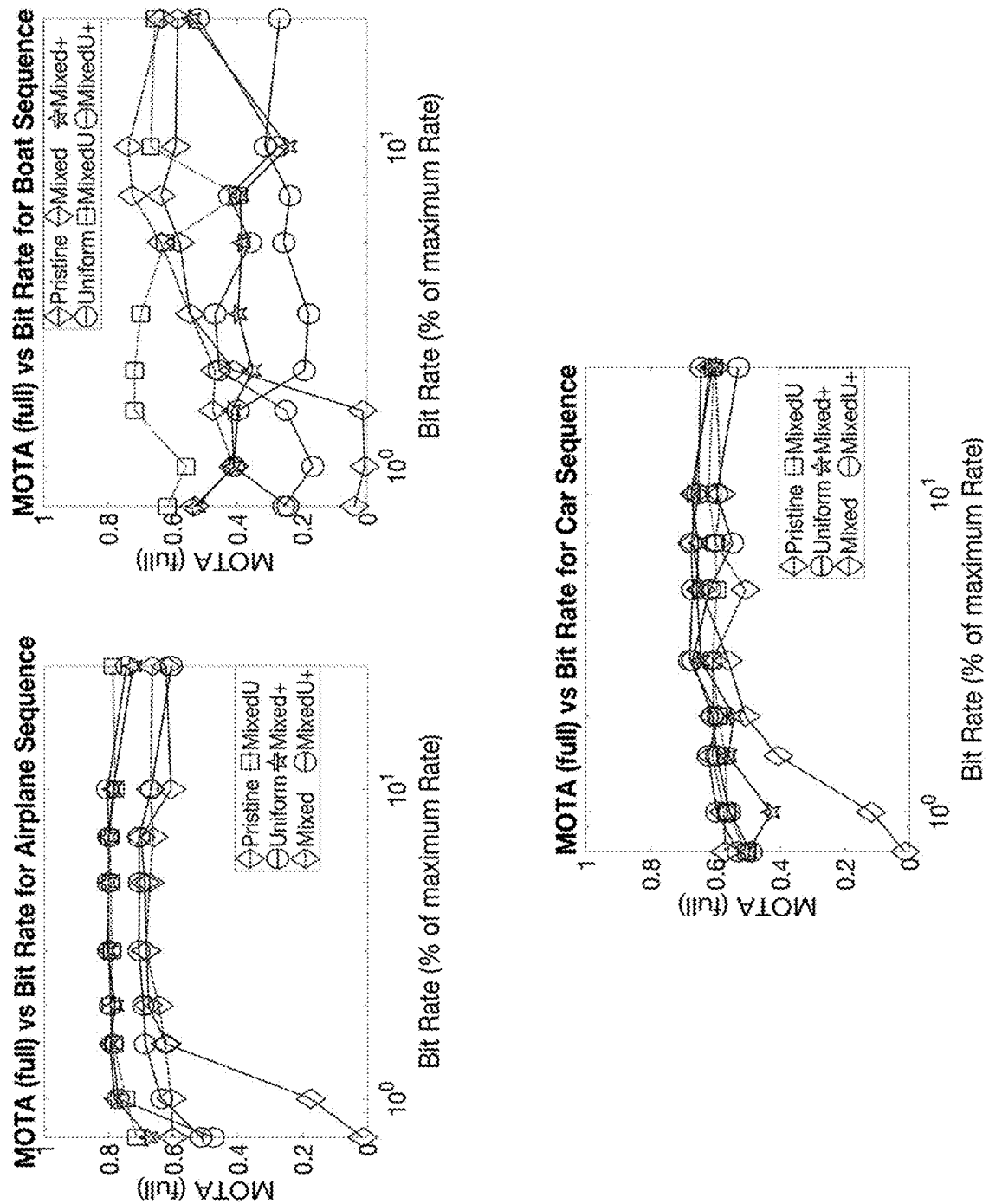
FIG. 32 shows the plot of $MOTA_{full}$ vs. bit-rate for the airplane, boat, and car sequences in accordance with an illustrative embodiment.
Figure 33:
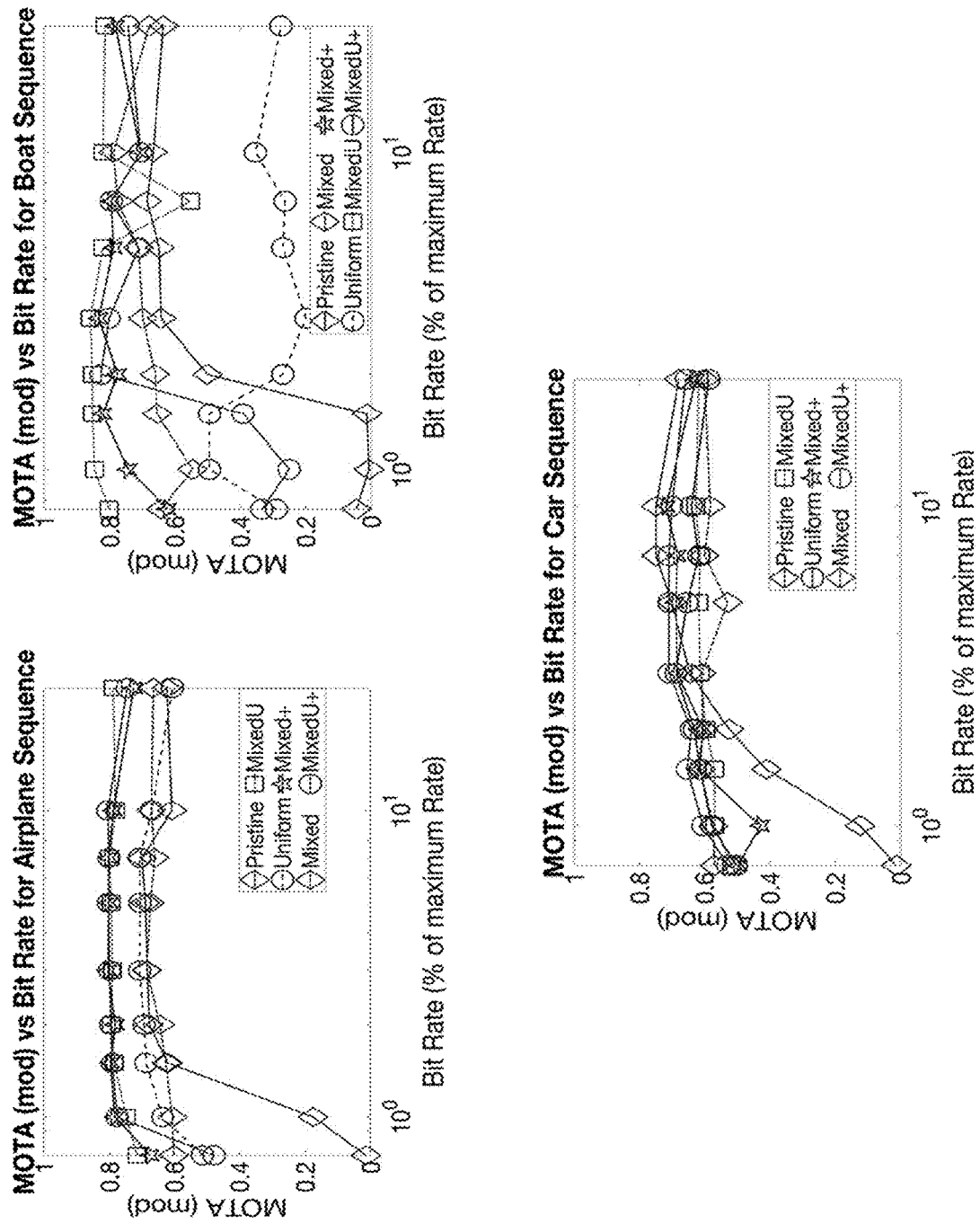
FIG. 33 shows the plot of $MOTA_{mod}$ vs. bit-rate for the airplane, boat, and car sequences in accordance with an illustrative embodiment.

In another mode of operation for the system, the bit rate was forced to be constant as a fraction of the maximum bit rate (within a tolerance of 1% of the fractional bit rate). This makes $\lambda$ and the distortion fluctuate in each frame and in each sequence. The detector has been trained with the 2-step strategy described above, and tracker assisted object detector up-scoring is not included in this set of experiments. MOTA$_{full}$ and MOTA$_{mod}$ is computed for each of these rates. FIG. 32 shows the plot of MOTA$_{full}$ vs. bit-rate for the airplane, boat, and car sequences in accordance with an illustrative embodiment. FIG. 33 shows the plot of MOTA$_{mod}$ vs. bit-rate for the airplane, boat, and car sequences in accordance with an illustrative embodiment. The performance was computed using the Pristine, Uniform, Mixed, MixedU, Mixed+ and MixedU+NN detectors to show the overall performance with each detector. Both MOTA$_{full}$ and MOTA$_{mod}$ increases initially with the increase in the bit rate for the Airplane, Watercraft, and Car sequences, and then remains approximately constant. The false positives are very few as the $MOTA_{full}$ and $MOTA_{mod}$ values are close to each other. The performance of the Mixed+, MixedU+ and MixedU NN detectors are close to each other, with MixedU NN detector performance having less false positives. However, across the board, the Mixed+ detector shows consistently better performance than the MixedU+ detector.

It is also pointed out that for the watercraft sequence especially at lower bit rates (<2%), in some frames there are values of $\lambda$ well over the maximum $\lambda=650$ for which the detectors were trained. Yet, the system trained at medium distortions can even perform quite well at these higher distortions. This shows the robustness of the 2-step training process at distortion levels worse than the trained distortion levels. The early convergence of the curves to high $MOTA_{full}$ and $MOTA_{mod}$ accuracy at low bit rates shows the effectiveness of the 2-operation training procedure over using a Pristine NN detector. The system performance has been shown for 0.75% to 25% of the maximum bit rate of 62.9 Mbits/s, which is the desired range of operation.

Figure 34:
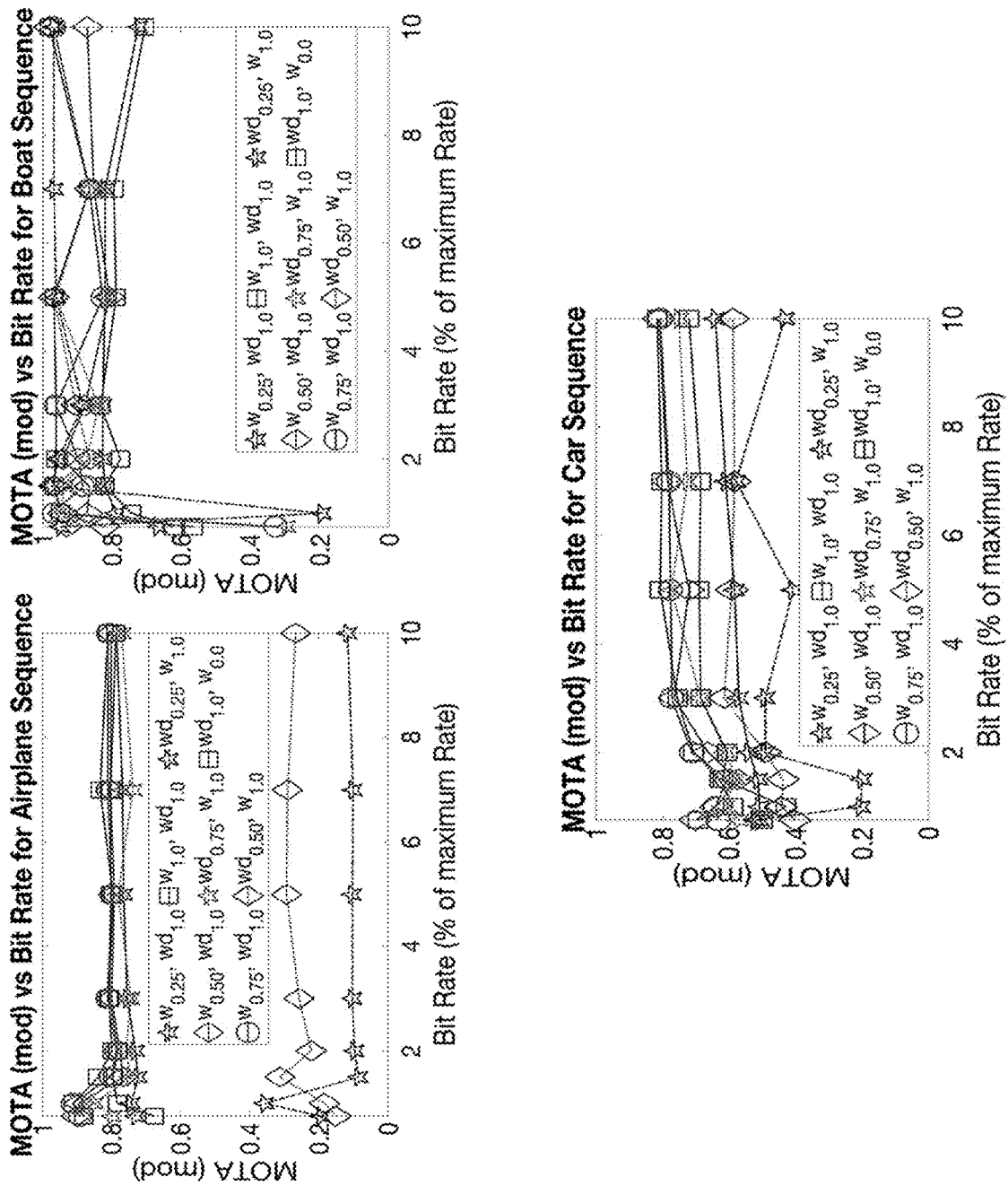
FIG. 34 depicts results of a parametric evaluation of the system performance that was conducted with varying tunable detection weight $w_d$ and tracking weight $w_t$ in accordance with an illustrative embodiment.

Performance of the system was also assessed with tracker assisted object detection along with the 2-operation training strategy for the object detector as mentioned above. FIG. 34 depicts results of a parametric evaluation of the system performance that was conducted with varying tunable detection weight $w_d$ and tracking weight $w_t$ in accordance with an illustrative embodiment. Mixed+ object detector has been used in the experiments as it provides one of the best performance for the system as discussed above. It was observed that for fixed $w_t$ (referred in FIG. 34 as w), the performance deteriorates with reduction in $w_d$ (referred in FIG. 34 as wd) in most of the cases. On the other hand for a fixed $w_d$, the performance of the system is better when $w_t$ is increased. Based on the experimental results, the best performance $MOTA_{mod}$ in most of the cases is when $w_d=1$ and $w_t=1$. It is evident from the experiments that there is a significant increase in the system performance when the object detector is assisted with the tracker, as compared to the system with no assistance from the object tracker $w_d=1$ and $w_t=0$. This is especially true when there is significant background, as in the boat and car sequences.

The performance of the proposed methods were also compared with three other techniques. One of the alternative compression techniques is simple binning of images (without using the proposed system) to 2×2, 4×4, 8×8, and 16×16 blocks, with each block having the intensity value equal to the average of individual pixels within the block. In the case of uniformly binned frames, the pristine detector is used to evaluate the MOTA metric. Alternatively, the video is separately compressed using sophisticated H.264 (AVC) and H.265 (HEVC) techniques, which are most commonly used video compression standards in the video and telecom industry. The FFmpeg library libx265 was used with its HEVC video encoder wrapper (x265). Similarly for H.264 compression, the FFmpeg library libx264 is used. A 2 pass encoding scheme was used for both H.264 and H.265 as the rate control mode to limit the bit-rate. For fair comparison, the performance metric was computed at the same bit-rates of 0.39%, 1.5%, 6.25% and 25% of the maximum bit-rate which is identical to 1/256, 1/64, 1/16 and 1/4 of the maximum bit-rates, respectively. The performance $MOTA_{mod}$ of the videos compressed with native binning, AVC, and HEVC standards has been evaluated with pristine object detectors. These compression standards compress videos with high PSNR and high quality. This makes it reasonable to use the pristine object detector for fair comparison. In the proposed system, the Mixed+ and Mixedu+ detectors were used, assisted with the tracker.

Figure 35:
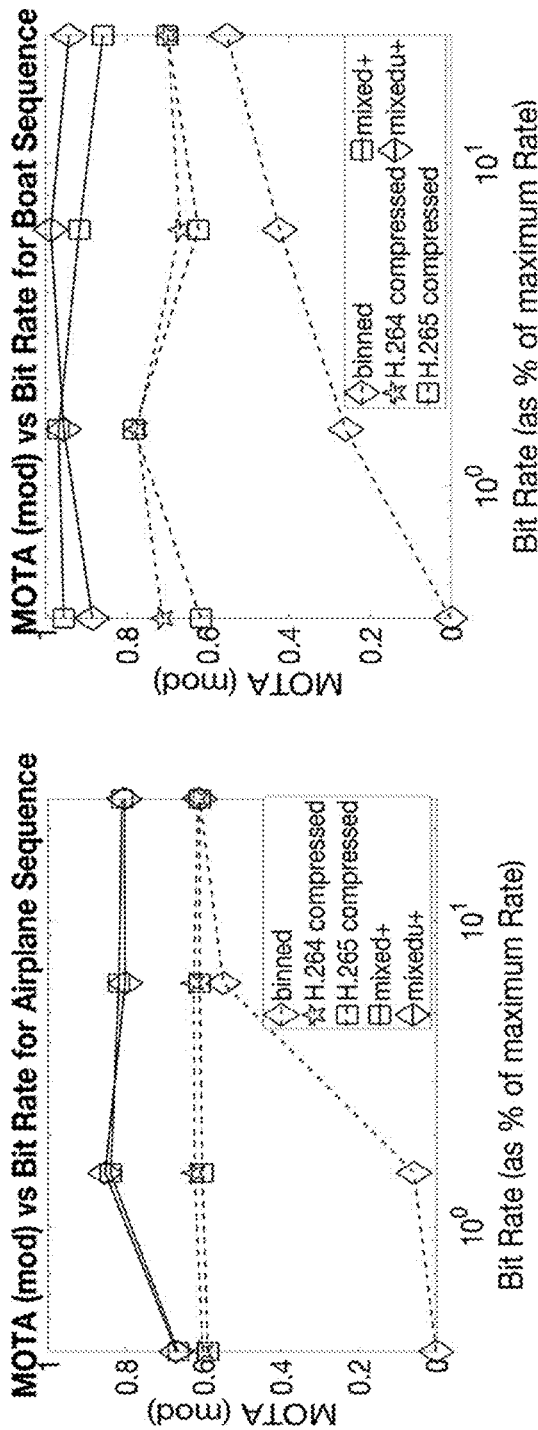
FIG. 35: is a comparison of $MOTA_{mod}$ vs Rate Curves for Binned, Mixed+, MixedU+, H.264 and H.265 videos in accordance with an illustrative embodiment.
Figure 35:
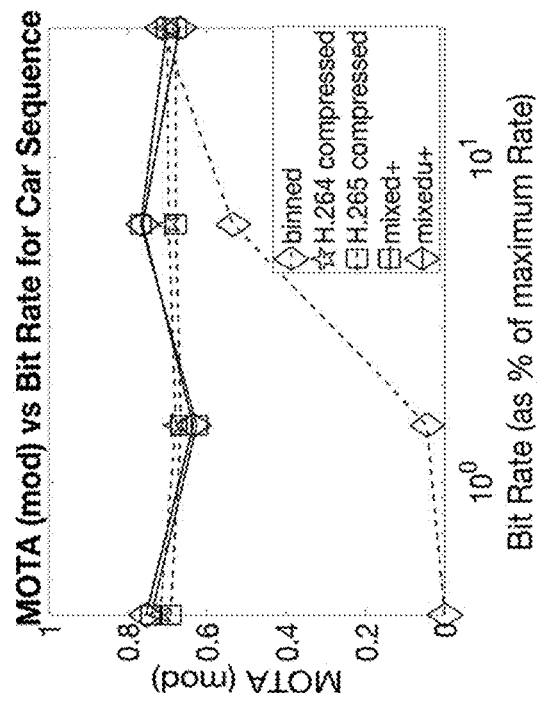

FIG. 35: is a comparison of $MOTA_{mod}$ vs Rate Curves for Binned, Mixed+, MixedU+, H.264 and H.265 videos in accordance with an illustrative embodiment. FIG. 35 shows how the performance of simple binning deteriorates at rates less than 6% of maximum rate. On the other hand, performance of the proposed system, H.264, and H.265 compressed videos do not deteriorate at lower bit rates. In fact, the MOTA performance of the proposed system is better than H.264 and H.265 encoded videos for most of the cases. It is noted that sophisticated video coding techniques such as H.264 or H.265 techniques are computationally heavy and are not suitable to be applied directly in a resource constrained chip. Thus, with the current computationally constrained chip, the proposed system has good tracking accuracy compared to current state-of-the-art compression standards such as H.264 and H.265.

Thus, described in this embodiment, is an intelligent algorithm for adaptive sampling of high bit rate data captured by an imager (chip), optimized together with a reconstruction algorithm for object detection and tracking on a remote host. The model has been developed assuming a chip with low computational power and a remote host with high computational power. In this framework, the communication channel between the chip and host has limited bandwidth and thus limited data transfer capabilities. The chip performs the Viterbi optimization for generating QT and skip/acquire modes, while the host performs the tasks of object detection and tracking, along with predicting the RoIs in the next time instant for the chip. The performance curves of $MOTA_{full}$ and $MOTA_{mod}$ indicate that the performance of the system deteriorates for the Pristine NN Model beyond $\lambda=250$. This is consistent among all the categories of objects which have different sizes. It is also evident that the performance of the Faster R-CNN is dependent on the level of QT binning of the RoIs. The edges of the objects get distorted significantly based on the level of QT binning. Additionally, the texture of the object is affected by the QT binning which in turn affects the detector performance.

It was found that at high distortions, the background influences the amount of false positives. In the case of a flat background like the airplane sequence, the false positives are fewer. However, this increases in the boat and car sequences which have significant content in the background. The dataset contains small, medium, and large sized objects in each class. For high $\lambda$, the distortion is very high and small objects are binned very similarly to the background. This affects the false detections with sufficient background content as the CNN identifies portions of the background as objects. The Faster R-CNN was trained to have a good accuracy over detecting objects of different classes and sizes, which results in more false positives at higher $\lambda$ values that reduce the $MOTA_{full}$ scores. Both $MOTA_{full}$ and $MOTA_{mod}$ scores increase with an increase in bit rate, and then saturate. As the rate reduces, the distortion increases. However, both the detectors trained in the 2-step process have their performance at low rates better than Pristine NN detector.

It was also observed that adding a tracker assisted object detection on the 2-step training strategy further improves the MOTA. A detailed study on the relative weightage of the detection confidence and tracker confidence proposal bounding boxes has been carried out to find the optimal weights of 1:1, which improves the MOTA scores across the board. The performance of the system is comparable to sophisticated AVC and HEVC techniques, which require high computational power on the device. Additionally, the performance metrics is higher than binning techniques, especially at lower bit rates.

Another embodiment of the proposed system involves removing blocking artifacts in video streams using event cameras. The system includes EveRestNet, which refers to a convolutional neural network designed to remove blocking artifacts in video streams using events from neuromorphic sensors. In one embodiment, the video frame is degraded using a quadtree structure to produce the blocking artifacts to simulate transmitting a video under a heavily constrained bandwidth. Events from the neuromorphic sensor are also simulated, but are transmitted in full. Using the distorted frames and the event stream, EveRestNet is able to improve the image quality.

Neuromorphic sensors recently have been gaining in popularity. Unlike traditional color/intensity cameras, these sensors record changes in the log-intensity at each pixel. If a change exceeds the preset threshold, a so-called event is reported as either an increase (say, +1) or a decrease (−1), depending on whether the intensity increases or reduces, respectively. The binary nature of these event cameras is of course a drawback in comparison with other conventional cameras that capture a much wider dynamic range. Each event is represented as a tuple of (x, y, t, p) where (x, y) represent the 2 dimensional coordinate of the event fired, while t and p represent the timestamp and the polarity of the event fired at that location. However, there are a few key engineering trade-offs that these novel devices provide: (i) asynchronous firing of events, (ii) event latency on the order of 10 μs, (iii) low power consumption on the order of 10 mW, and, (iv) redundant capture of static scenes. These benefits open up new paths in solving various imaging problems. Event cameras have brought new solutions to many classical as well as novel problems in computer vision and robotics. For example, switching from a traditional camera to an event-based camera would give longer life to battery-operated robots. Simultaneous Localization and Mapping (SLAM) applications have been tested with event cameras in robotics. Multimodal applications are pursued as well, including high speed video frame interpolation.

In traditional video compression standards, the video is compressed using a quadtree (QT) based compression. At very high distortions corresponding to low bit rates, the quality of the video frames suffer from blocking artifacts. This results in edges having a block-like appearance. These blocking artifacts results in not only poor visual quality of the objects in the scene, but also reduces efficient intelligent analytics in the scene such as object detection or tracking in the scene using deep learning based approaches. Typically, the performance of the neural network based methods work better with high quality frames compared to frames with low bit rates and poor quality. In order to address this issue, one option is the removal of the blocking artifacts in the frames. This can sometimes be solved by image restoration or quality improvement of frames using deep learning approaches such as Generative Adversarial Network (GAN) approaches. On the other hand, the asynchronous events occurring due to relative motion between camera and scene can be used intelligently to remove these blocking artifacts from the captured video frames. However, there has been no prior work addressing this problem using events.

Described herein is a deep learning based approach in order to perform a restoration of low bit rate videos. The deep learning model can include a neural network with residual blocks. The model takes in events occurring between time t−1 and t. The model takes the previous restored frame at time t−1 as input as well. The model generates a restored frame at t. One focus of this system is on restoring image frames with blocking artifacts due to video compression at low bit rates. The framework can be extended onto other restoring applications such as de-blurring, super-resolution, and others. One of the limitations of this approach is the poor reconstruction quality when there is lack of events in the scene, due to small motion or lack of texture in the scene.

Traditional methods of removing blocking artifacts has been performed in various contexts. These methods, however, do not address the fusion problem that is faced by the proposed system. Specifically, a goal of the system is to restore degraded intensity images using events, not generate intensity images from events. Additionally, the blocking artifacts being addressed by the proposed techniques arise from quadtree (QT) compression, which is inherently different than JPEG compression in terms of the size of the blocks and the values that are used to represent the blocks. JPEG compression stores information from the discrete Fourier transform (DFT) for each block, while QT compression stores a singular intensity value that fills the entirety of the size-varying blocks.

As discussed, the compression scheme used to generate blocking artifacts is a QT-based approach. A host-chip architecture is used to analyze large video feeds. The chip, which includes a conventional intensity camera, a neuromorphic camera, and low processing power, compresses each frame before sending it to the host computer over a heavily constrained bandwidth. QTs are used as the method of compression, and due to the low bandwidth, transmit lossy frames.

Figure 36:
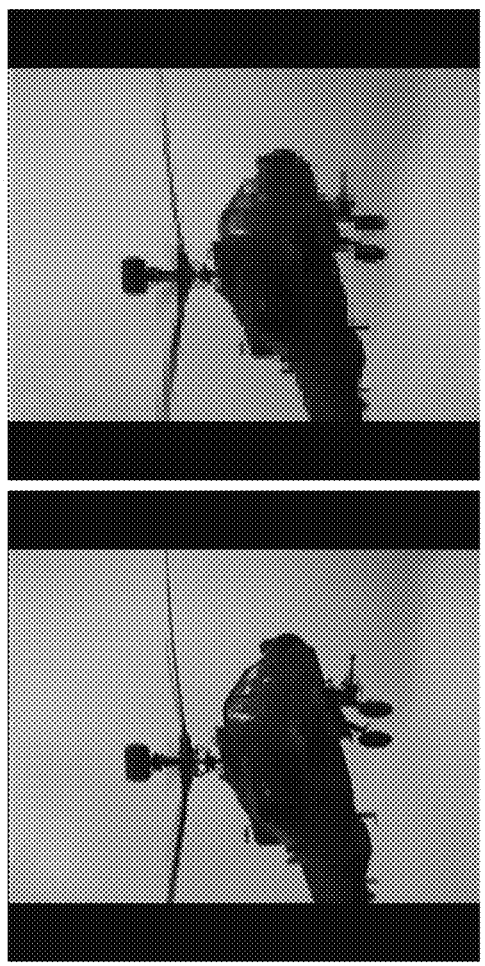
FIG. 36 is a sample frame from the ImageNet Vid dataset, shown as undistorted (left) and distorted (right), in accordance with an illustrative embodiment.

The host computer is assumed to possess as much computational power as needed in order to perform object tracking on the degraded feeds. Based partially on the locations of the objects of interest, the host communicates back the areas where the chip should more finely divide the QT. The video feeds on the host follow a pattern in which objects of interest typically have more QT blocks (i.e. better sampling) than that of the background and objects not of interest. FIG. 36 is a sample frame from the ImageNet Vid dataset, shown as undistorted (left) and distorted (right), in accordance with an illustrative embodiment. It is noted that the binning has produced blocking artifacts particularly along the high spatial frequency components. Specifically, the helicopter blades have noticeably been degraded, and looking closely one can see the jagged edges of the helicopter body.

In order to perform object tracking using deep neural networks, it is generally known that testing or run-time data drawn from a similar distribution as the training data will perform better than data drawn from a different distribution. Also, if a preprocessing step that can transform the data back to its original form is used, then subsequent analysis is generally more accurate. Thus, the proposed system aims to improve the similarity (e.g. PSNR) between the original undistorted image and the distorted image.

A goal of the system is to restore video frames degraded with blocking artifacts by the use of events from neuromorphic sensors. System assumptions include (i) a degraded intensity video feed $F_t=\{\hat{f}_0, \hat{f}_1, \ldots, \hat{f}_t\}$, composed of degraded frames $f_t$ up to time t, and (ii) low-latency events t that contain the set of all events up to time t. Original undistorted frames $F=\{\hat{f}_0, \hat{f}_1, \ldots, \hat{f}_t\}$ are compressed. An individual event at time t can be denoted by $e_t=(x, y, p)$, where (x, y) is the location of the event and $p \in [-1, +1]$ is the event polarity. At any given pixel, an event is fired if the difference in log-intensity goes above (p=+1) or below (p=−1), a predetermined threshold. Using these data, one can greatly improve the quality of the images using deep learning.

Figure 37:
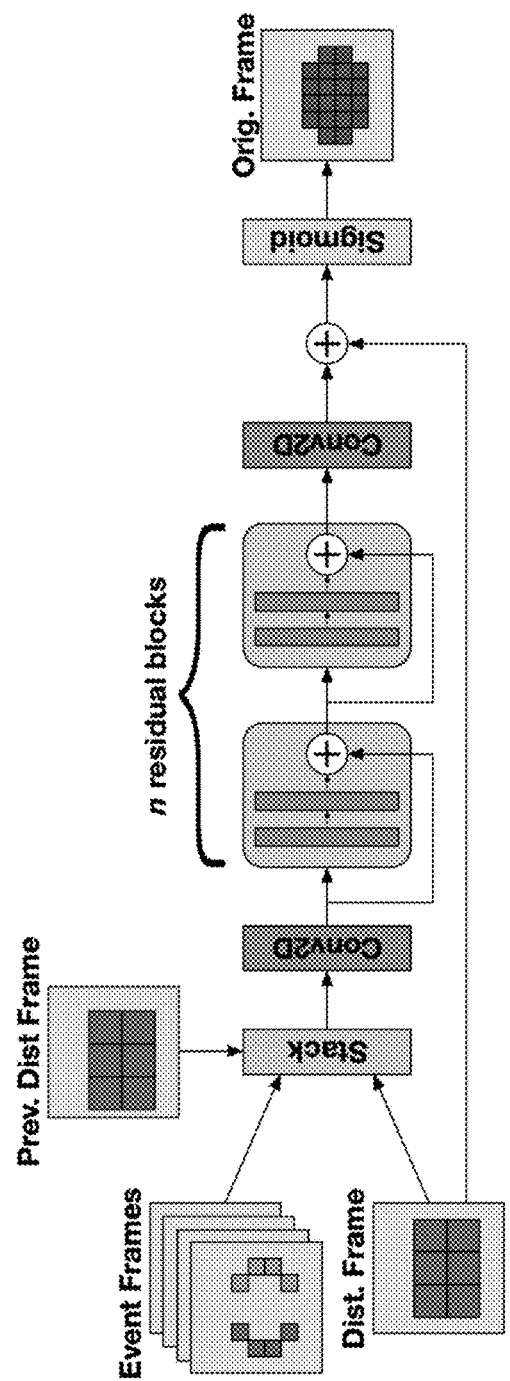
FIG. 37 depicts the architecture of an EveRestNet convolutional neural network in accordance with an illustrative embodiment.

The inventors have thus proposed EveRestNet, which is a convolutional neural network (CNN) that uses (eve)nts to (rest)ore blocking artifacts that appear in intensity-based video feeds. FIG. 37 depicts the architecture of an EveRestNet convolutional neural network in accordance with an illustrative embodiment. The architecture was derived from the successes of ResNet, where the inventors attempted to restore the residual detail lost in an original distorted frame. Since EveRestNet is fully convolutional, it can accept any video resolution.

In an illustrative embodiment, the system uses a subset of the data available at time t. Since a goal is to restore $\hat{f}_t$, it makes sense to also utilize the previous distorted frame $\hat{f}_{t-1}$ along with all the events that were fired between times t−1 and t, i.e. $E_t = \mathcal{E}_t - \mathcal{E}_{t-1}$. Events are fired asynchronously, meaning that the timestamps cannot be discretized without losing information on when they were fired. However, EveRestNet is convolutional, so all dimensions are discretized in order to be valid inputs into the neural network. It was found that temporally binning events in $E_t$ using four bins worked well. These four event frames are denoted as $E_{t,i}$ where i$\in$={1, 2, 3, 4} is an event frame identifier within $E_t$. In another embodiment, the EveRestNet architecture uses six inputs: $X_t = \{\hat{f}_t, \hat{f}_{t-1}, E_{t,i} \forall_i \in I\}$. These inputs are all of the same spatial size, and are all concatenated channel-wise as a data volume that is passed into the network. In alternative embodiments, a different number of inputs may be used.

With respect to loss, the areas in the degraded frames with the lowest signal-to-noise ratio are typically along the high-frequency components where the edges are not as smooth as the ground truth images. When trying to restore the edges, it is important to pay particular attention to those edges since it is where the large errors tend to lie.

Figure 38:
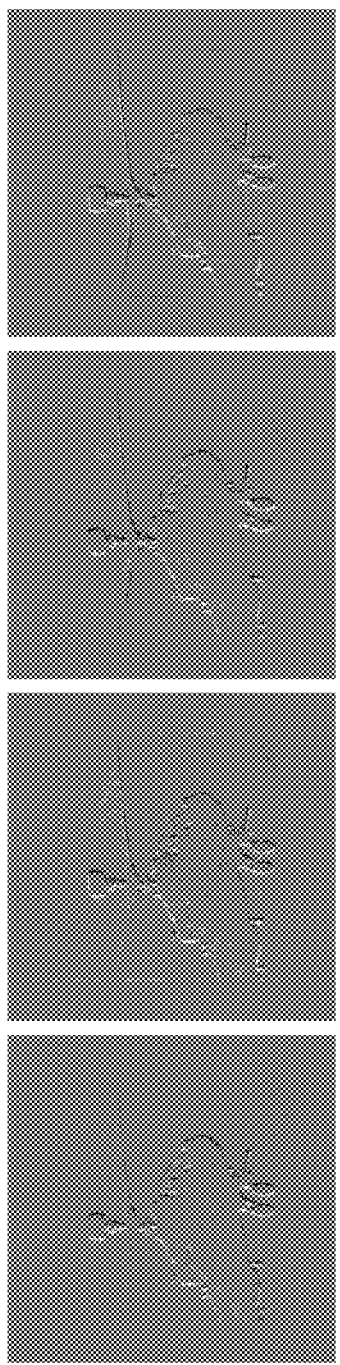
FIG. 38 depicts four binned event frames corresponding to FIG. 36 in accordance with an illustrative embodiment.

Events can be thought of as a threshold of temporal gradients in intensity at each pixel. As the objects move in the video feeds, edges and other textures high in spatial frequency tend to trigger the firing of events. This can be seen in the four event frames of FIG. 38. Specifically, FIG. 38 depicts four binned event frames corresponding to FIG. 36 in accordance with an illustrative embodiment. These event frames correspond to the events that occur between FIG. 36 and its previous frame. Events with p=−1 are represented as black pixels, and events with p=+1 are white pixels. Gray denotes no events in the pixel's location. The event frames can hold information on the smoothness of the object boundaries, and can be used by the system. When training, a loss function that emphasizes the importance of events in restoring the distorted frames is used.

The value rt=EveRestNet($X_t$) can refer to the restored output of EveRestNet, and the proposed loss function can be defined as the sum of two losses: a weighted fidelity term, and a weighted total variation term. The total loss L is $$\mathcal{L} = \mathcal{L}_{fid} + \mathcal{L}_{TV} \quad (27)$$

where $$\mathcal{L}_{fid} = \|(1+\lambda_{fid}\overline{E}_t)*(f_t-r_t)\|_2^2 \quad (28)$$

$$\mathcal{L}_{TV} = \|\lambda_{TV}(4-\overline{E}_t)*\nabla r_t\|_2^2 \quad (29)$$

and where $\overline{E}_t = \Sigma_{i=1}^4 |E_{t,i}|$ represents the number of times an event fired at each pixel and $\nabla r_t$ represents the spatial gradient of the restored image. Weighting parameters $\lambda_{fid}$ and $\lambda_{TV}$ are chosen experimentally.

The fidelity term $\mathcal{L}_{fid}$ is given extra weight at pixels where there were more events, which typically indicate the presence of edges, and the edges are generally the areas where most of the restoration needs to happen. The total variation term $\mathcal{L}_{TV}$ gives lesser weight to areas without events. The goal is to not suppress the edges where the events occurred. However, areas without events tend to be low in texture and can appropriately be smoothed.

Experimental results using EveRestNet show promising improvements in restoring the frames of the degraded video sequences. The training and evaluation of EveRestNet are discussed below. The EveRestNet was trained using a subset of data from the ImageNet Vid dataset with video feeds of airplanes, cars, and watercraft. This dataset does not provide corresponding event data, so ESIM was used to generate simulated events for the video feeds. The simulated events were then temporally binned into four frames per each pair of consecutive image frames.

The degraded frames were generated using a process in which the objects of interest are the three classes chosen to train EveRestNet. These objects in general have finer binning sizes than that of the background, but still experiences blocking artifacts much like what is seen in FIG. 36. Different degrees of degradation were generated by varying the bandwidth constraints. This is to ensure the network can be robust to changes in the amount of distortion.

In an illustrative embodiment, EveRestNet uses 4 residual blocks each with size 3×3×32 convolution kernels. The padding and step size of 1 allows for any sized input. Batch normalization is applied after each convolution within a residual block. Leaky ReLU activation functions with slope 0.2 appear after the first convolution of EveRestNet as well as after the first convolution of each residual block. Gradient $r_t$ is generated using the 3×3 Sobel filters in the x- and y-directions. The following values were used: $\lambda_{fid}=0.5$ and $\lambda_{TV}=0.05$. EveRestNet was optimized using Adam with a learning rate of $5\times10^{-4}$, $\beta_1=0.9$, and $\beta_2=0.999$.

After training, the EveRestNet was tested on 1500 frames of varying degradations. A comparison was conducted between the peak signal-to-noise ratio (PSNR) and the structural similarity index measure (SSIM) of the degraded frame $\hat{f}_t$ and the frame generated by EveRestNet, rt. On average, the system achieved a higher PSNR: the average PSNR of all $\hat{f}_t$ is 24.91, while EveRestNet achieved an average PSNR of 29.05. For SSIM, ft averaged 0.7583 while EveRestNet averaged 0.8479.

Figure 39:
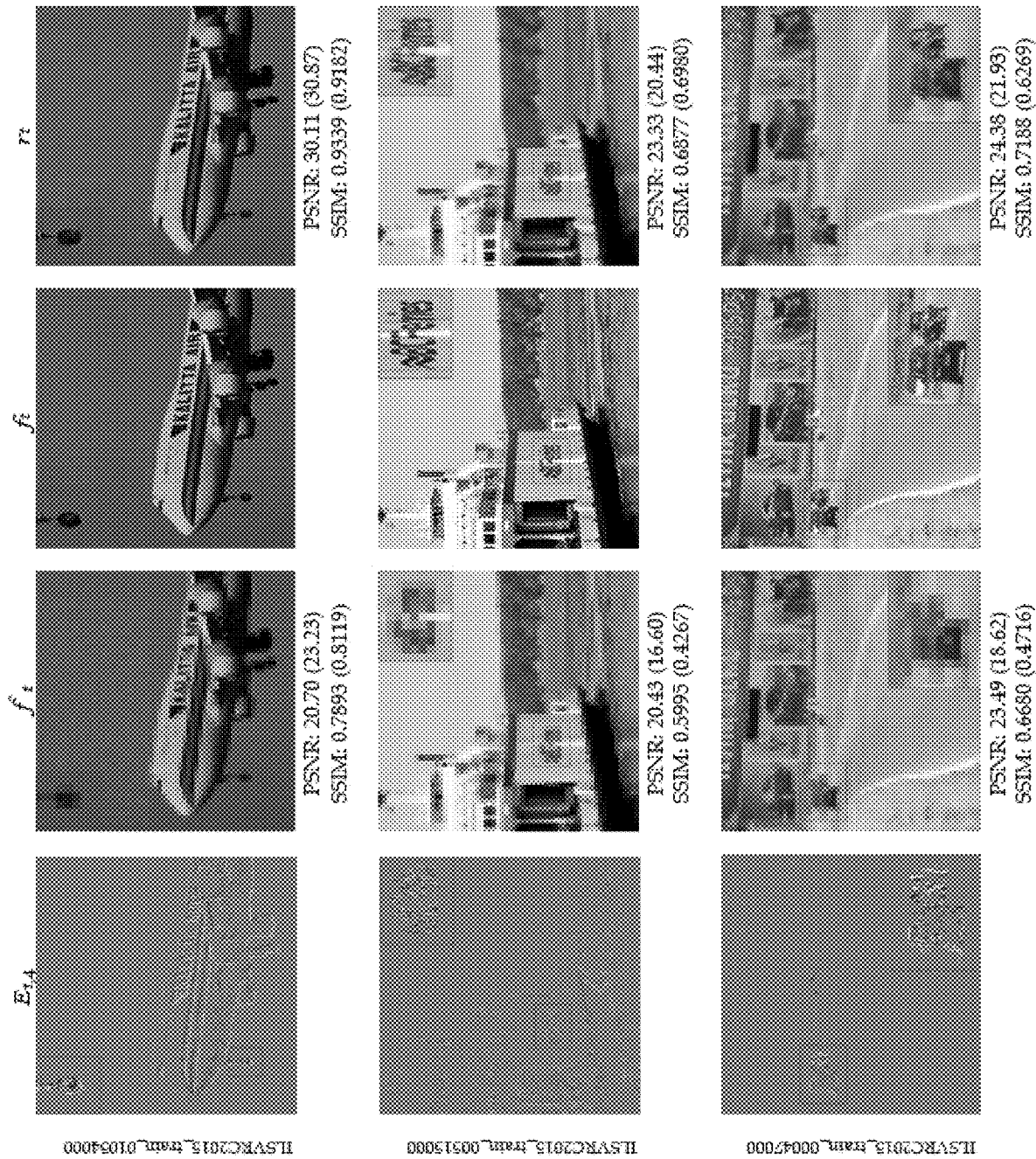
FIG. 39 shows results of using EveRestNet on an airplane sequence (top), a boat sequence (middle), and a car sequence (bottom) in accordance with an illustrative embodiment.

FIG. 39 shows results of using EveRestNet on an airplane sequence (top), a boat sequence (middle), and a car sequence (bottom) in accordance with an illustrative embodiment. To save space and show detail, only the event frame closest temporally to time t, $E_{t,4}$, is shown. The previous degraded frame $\hat{f}_{t-1}$ is also omitted. While there are portions of the results that are enhanced to show the fine detail in the results, one can zoom in to see other details captured by EveRestNet that would otherwise be lost using the degraded frame alone.

The sequences shown in FIG. 39 have stationary fixed camera angles (or effectively stationary in the case of the plane with no discernible background). This is why there is smoothing of edges in the background where no events are fired, whereas in the moving objects themselves it can be seen that the blocking artifacts are effectively removed. In the airplane, the lettering becomes readable, and finer details such as the door and passenger windows become visible. The boat too has a logo that is recovered using EveRestNet. With respect to the car sequence in FIG. 39, use of EveRestNet was able to detail two of the three cars present. Perceptually, the frames are much more informative using EveRestNet than the degraded frames alone. Both quantitative metrics demonstrate significant improvement in the image quality as well.

Another embodiment described herein is related to lossy event compression. A challenge in compressing events results from their unique asynchronous form. To address this problem, a novel event compression algorithm based on a quad tree (QT) segmentation map derived from the adjacent intensity images is proposed. The QT informs 2D spatial priority within the 3D space-time volume. In the event encoding step, events are first aggregated over time to form polarity-based event histograms. The histograms are then variably sampled via Poisson Disk Sampling prioritized by the QT based segmentation map. Next, differential encoding and run length encoding are employed for encoding the spatial and polarity information of the sampled events, respectively, followed by Huffman encoding to produce the final encoded events. The proposed algorithm achieves greater than 6× higher compression compared to the state of the art.

In traditional image/video compression standards, lossy compression is achieved by exploiting the spatial and temporal correlations which have evolved over the last couple of decades. However, events are discrete asynchronous points scattered in the space-time volume in a non-continuous manner. Limited work has been done in predicting the distribution of events in space, time and polarity. Current approaches for compressing Dynamic Vision Sensor (DVS) event data can be classified into two categories: (a) specifically encoding events, (b) applying existing methods to events. However, traditional compression approaches do not consider spatiotemporal encoding of events at the same time.

Figure 40:
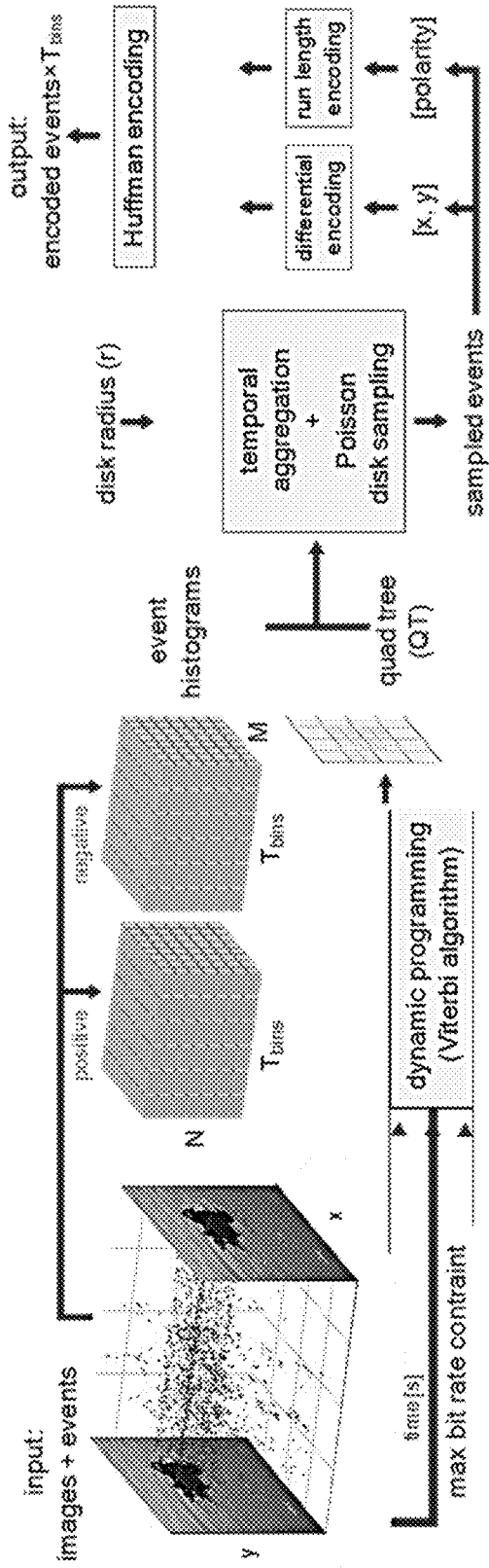
FIG. 40 depicts the overall framework of an event compression system that uses Poisson disk sampling in accordance with an illustrative embodiment.

Thus, described herein is an efficient event compression algorithm that exploits the spatiotemporal redundancy of events with minimal sacrifice of temporal information. The approach considers the hybrid input of RGB images and events. It was reasoned that the adjacent in time images have rich spatial features that can be leveraged to guide event compression. Therefore, a quad tree (QT) structure is computed to serve as the priority map. It is noted that the QT can be generated from events only as well. The events are sampled to generate a blue noise distribution by Poisson Disk Sampling (PDS) locally with the QT defining regions of importance, in 2D space. FIG. 40 depicts the overall framework of an event compression system that uses Poisson disk sampling in accordance with an illustrative embodiment. The process can be referred to as a Poisson Disk Sampling—Lossy Event Compression (PDS-LEC) Algorithm.

Mathematical analysis was conducted, and it revealed a correlation of DVS spikes in both space and time. Also, the adjacent pixels receive the same illumination change (increase or decrease) over time. This leads to spatial as well as temporal correlation in local regions. This fundamental nature of DVS spikes for encoding events is exploited in the following operations.

A first operation involves generation of a QT structure. A time aggregated event stream between two successive intensity frames can be approximated by a difference of these intensity frames. For an event volume $E_{t-1}$, between successive intensity frames $I_{t-1}$ and $\hat{I}_t$, these intensity frames are used to derive a relevant QT structure. The QT is $$J_\lambda(x)=D(x)+\lambda R(x) \quad (30)$$

where $\lambda \geq 0$ is a Lagrangian multiplier. The intensity bit rate is set to be generated for a fixed rate (within a tolerance) constraint. The QT is generated such that the intensity bit rate satisfies this constraint. $\lambda$ is adjusted at each frame for achieving the desired bit rate. The optimal $\lambda^*$ is computed by a convex search in the Bezier curve over the rate-distortion space, which results in convergence in fewer iterations. The optimal QT segmentation map corresponds to $\lambda^*$ and at a set bit rate, satisfies equation 30, derived for intensity frame $I_t$ based on the distorted frame $\hat{I}_{t-1}$. Clearly, at higher bit rates the QT can go to deeper levels (and hence smaller blocks) while for smaller bit rates, the QT branches out to shallow levels only. This 2D segmentation map is applied to event volume $E_{t-1}$ providing priority regions, with block size inversely proportional to priority in the block.

A second operation involves Poisson disk sampling. The QT structure provides a segmentation map, with block sizes indicating importance of the regions. There could be local features in bigger blocks, but these are not of high priority based on the set bit rate on intensity frames. The system can perform lossy compression on events not only by sampling the events from the QT blocks, but also reducing the bit representation for the event timestamps, thereby temporally aggregating the events. Sampling of events inside the QT blocks is challenging due to the presence of both local structure and noise. The events are sampled as a blue noise pattern using PDS which picks up the local event density without adding any inherent artificial structures. This leads to high-quality sampling of multidimensional signals while preventing aliasing. PDS sample events inside the QT blocks, with all events at least r distance apart from each other. Also, a fast PDS strategy in multidimensional space to generate points in space based on the PDS is used to sample events. The resulting sampled events are generated with at least r distance apart from each other. Given M original events, the system can sample $R_e$ events, where $R_e <= M$. Since the QT already provides a priority map, PDS is done with bigger QT blocks having higher r and vice-versa.

PDS needs a reference position to start sampling the events. The reference point can be the location of the event at or nearest to the centroid (geometric median) with respect to the event locations in a QT block. Thus, in a neighborhood of N×N pixels, the geometric median $x_m$, of the M events can be found, as shown in Eqn. (31), where each $x_i \in R^n$ are the event locations in space-time $$x_m = \arg\min_{x_m} \sum_{i=1}^{M} \|x_i - x_m\|_2 \quad (31)$$

Except for the chosen point, the system does not sample the events lying within a disk of radius r (termed as Poisson Disk Radius (PDR)), with respect to this reference point. Next, the reference point is shifted to the nearest event location outside the radius r. This operation is repeated until all events are at least or greater than a spatial distance r from each other. The sampling approach not only reduces the density of the aggregated events near the edges but can also remove the uncorrelated noisy events locally in space.

A third operation is lossy event compression. The system is designed to sample events based on priority as this will retain local features in high priority regions and remove local features from lower priority regions. This is achieved by using different Poisson disk radii r values for different QT block sizes. Specifically, higher and smaller r values are used for bigger and smaller QT blocks, respectively. In the algorithm, PDS is applied to blocks of size 4×4 or bigger. QT blocks smaller than 4 4 are considered to be regions of high priority and hence all events in those regions are critical. The PDS-LEC algorithm has a lossy and a lossless part. The lossy portion of event encoding involves quantizing event timestamps as $T_{bin}$ and PDS of the events with spatial overlap of event (x, y) locations within QT blocks. At the end of these lossy steps, a histogram for the positive and negative events is formed separately for each quantized timestamp. The lossless portion of event encoding involves differentially encoding (DE) the (x, y) location of events followed by Huffman encoding (HE). Polarity is encoded by Run Length Encoding (RLE) followed by HE. The quantized (aggregated) timestamps for events form the basis of aggregating events as subframes corresponding to that timestamp, forming 2 subframes—one for positive events and one for negative events. These events are grouped together as a frame before transmission/storage. PDS-LEC offers flexibility in terms of event compression. Depending on desired bitrate, event compression may be set by the user, by varying r and $T_{bin}$.

The compressed events essentially represent the original 3D spatio-temporal event volume in a quantized manner. However, fidelity of the compressed events with respect to undistorted event volume is important to understand the level of distortion. There is currently no metric available for computing event distortion, so one has been developed. The distortion of the events in both the spatial and temporal aspects should be computed separately to have a complete understanding of the role of different parameters. For spatial distortion, the events over the time bins are aggregated into an (x, y) event image. The PSNR and SSIM metrics computed on the aggregated compressed and uncompressed event images are computed. The temporal distortion is rather difficult to quantify. Thus, a temporal error metric to quantify the quantization error in time is proposed, as described in Eqn. 32:

$$T_{error} = \frac{1}{N_{fr}} \sum_{i=1}^{N_{fr}} \sqrt{\sum_j (T_{j,org} - T_{j,quant})^2} \quad (32)$$

where $N_{fr}$ is the number of event volumes in a sequence, $T_{j,org}$ is the timestamp of $j^{th}$ event in $i^{th}$ frame, and $T_{j,quant}$ is the quantized timestamp of $j^{th}$ event in a compressed $i^{th}$ frame. Based on the end application of events, a weighted distortion metric may be computed with weights $w_s$ and $w_t$ for spatial distortion $D_s$ and temporal distortion $D_t$, respectively, thereby prioritizing spatial and/or temporal distortions differently. Also computed was the end-to-end compression ratio (CR) for the events, considering 64 bits for each event in its uncompressed representation.

In order to demonstrate the performance of PDS-LEC strategy, sequences from the RGB-DAVIS dataset and DAVIS dataset were used. Both indoor and outdoor sequences of DAVIS dataset were used. In one test, system performance with varying $T_{bin}$ only was considered. In order to show the benefits of event timestep quantization, the events are not PDS sampled. The events are temporally quantized into N bins, with N∈{8, 16, 24}. FIG. 41 is a table that shows the CR and average $T_{error}$ over the sequence in accordance with an illustrative embodiment. It is apparent that with the increase in the number of $T_{bin}$, the CR reduces along with the reduction of $T_{error}$. The SSIM is 1, since all events are sampled.

System performance with varying Intensity Bit Rate was also analyzed. The QT is optimized for particular operational bit rate for intensities only. In these experiments, $r_4=1$, $r_8=2r_4$, $r_{16}=3r_4$ and $r_{32}=4r_4$ with $T_{bin}=16$ is used. FIG. 42 is a performance table that shows the results of varying intensity bit rate in accordance with an illustrative embodiment. As bit rate reduces, PSNR and SSIM reduces, while $T_{error}$ and CR increases, indicating bigger QT blocks for lower bit rates with considerably higher distortion.

Performance with varying PDR and $T_{bin}$ was also analyzed. In these experiments, performance is evaluated at a particular bit rate, but the Poisson disk radius $r_4$ is varied, with $r_8=2r_4$, $r_{16}=3r_4$, $r_{32}=4r_4$ and $T_{bin}=16$. FIG. 43 is a table showing performance with varying PDR and $T_{bin}$ in accordance with an illustrative embodiment. As shown, PSNR and SSIM reduces as $r_4$ increases. $T_{error}$ increases with an increase of $r_4$, indicating the increase of temporal distortion. CR also increases with increase of $r_4$. By setting different $r_4$, one can obtain target bit rate for events at a particular distortion.

Comparative Performance measured with other benchmark strategies was also considered. The proposed PDS-LEC algorithm is compared with other compression algorithms in literature such as TALVEN and Spike Coding using sequences from DAVIS dataset which have good CR. A comparison to the proposed method was performed by replacing the QT with 16×16 uniform blocks and PDS by random sampling of 50% of the events followed by temporal quantization (Random=0.5). The rest of the coding strategy in PDS-LEC is followed. Additional comparisons were performed by generating fewer events by using higher contrast thresholds (CT) of 0.25, 0.30 and 0.35 in ESIM and applying PDS-LEC by replacing the QT with uniform 16×16 blocks and removing PDS step (thresh=0.25, 0.30, 0.35, respectively). It was shown that PDS-LEC outperforms current existing algorithms almost in all cases. For Random=0.5, at lower temporal aggregation CR is higher than PDS-LEC (at higher bit rates and/or lower PDR) only at the cost of higher distortion.

Figure 44:
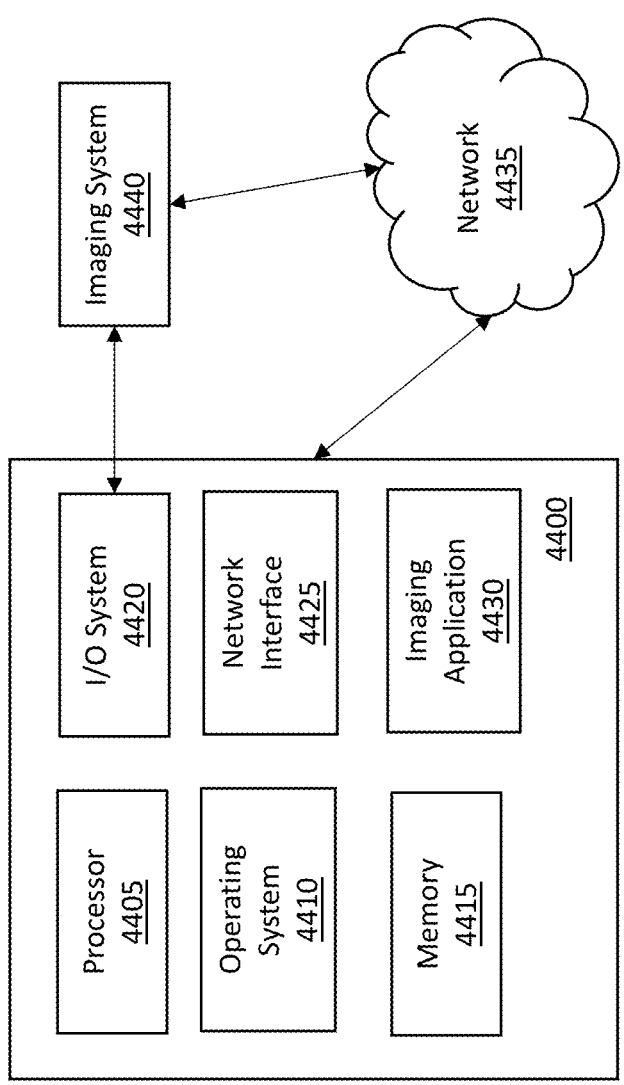
FIG. 44 is a block diagram of a computing system to implement the imaging system in accordance with an illustrative embodiment.

FIG. 44 is a block diagram of a computing system to implement the imaging system in accordance with an illustrative embodiment. The computing system includes a host 4400 and an imaging system (or chip) 4440 in communication with the host 4400. The imaging system 4440 can be any type of camera or imager that is able to capture events, and can include a processor, memory, transceiver, user interface, etc. in addition to the image capturing components, such as one or more light source, one or more lenses, etc. The imaging system 4440 can be used to capture event data and/or normal image data. The imaging system 4440 can communicate directly with the host 4400, or through the network 4435, depending on the implementation.

The host 4400 includes a processor 4405, an operating system 4410, a memory 4415, an input/output (I/O) system 4420, a network interface 4425, and an imaging application 4430. In alternative embodiments, the host 4400 may include fewer, additional, and/or different components. The components of the host 4400 communicate with one another via one or more buses or any other interconnect system. The host 4400 can be any type of computing device (e.g., tablet, laptop, desktop, etc.) that has sufficient processing power to perform the operations described herein.

The processor 4405 can be in electrical communication with and used to control any of the system components described herein. For example, the processor can be used to execute the imaging application 4430, process received user selections, send data and commands to the imaging system 4440, receive raw data from the imaging system 4440, process the data using the algorithms described herein, etc. The processor 4405 can be any type of computer processor known in the art, and can include a plurality of processors and/or a plurality of processing cores. The processor 4405 can include a controller, a microcontroller, an audio processor, a graphics processing unit, a hardware accelerator, a digital signal processor, etc. Additionally, the processor 4405 may be implemented as a complex instruction set computer processor, a reduced instruction set computer processor, an x86 instruction set computer processor, etc. The processor 4405 is used to run the operating system 4410, which can be any type of operating system.

The operating system 4410 is stored in the memory 4415, which is also used to store programs, user data, pacemaker readings, network and communications data, peripheral component data, the imaging application 4430, and other operating instructions. The memory 4415 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. In some embodiments, at least a portion of the memory 4415 can be in the cloud to provide cloud storage for the system. Similarly, in one embodiment, any of the computing components described herein (e.g., the processor 4405, etc.) can be implemented in the cloud such that the system can be run and controlled through cloud computing.

The I/O system 4420 is the framework which enables users and peripheral devices to interact with the host 4400. The I/O system 4420 can include a display, one or more speakers, one or more microphones, a keyboard, a mouse, one or more buttons or other controls, etc. that allow the user to interact with and control the host 4400. The I/O system 4420 also includes circuitry and a bus structure to interface with peripheral computing devices such as power sources, universal service bus (USB) devices, data acquisition cards, peripheral component interconnect express (PCIe) devices, serial advanced technology attachment (SATA) devices, high definition multimedia interface (HDMI) devices, proprietary connection devices, etc.

The network interface 4425 includes transceiver circuitry (e.g., a transmitter and a receiver) that allows the host 4400 to transmit and receive data to/from other devices such as the imaging system 4440, other remote computing systems, servers, websites, etc. The network interface 4425 enables communication through the network 4435, which can be one or more communication networks. The network 4435 can include a cable network, a fiber network, a cellular network, a wi-fi network, a landline telephone network, a microwave network, a satellite network, etc. The network interface 4425 also includes circuitry to allow device-to-device communication such as Bluetooth® communication.

The imaging application 4430 can include software and algorithms in the form of computer-readable instructions which, upon execution by the processor 4405, performs any of the various operations described herein such as compressing data, segmenting data, other image processing operations, transmitting data, receiving data, etc. The imaging application 4430 can utilize the processor 4405 and/or the memory 4415 as discussed above. In an alternative implementation, the imaging application 4430 can be remote or independent from the host 4400, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system to process imaging data, the system comprising:
    an imaging system configured to:
        capture image data of a scene and event data of the scene, wherein a red-green-blue camera imaging sensor captures the image data and an event camera imaging sensor captures the event data;
        compress the image data and the event data; and
        transmit the compressed image data and the compressed event data to a host; and
    the host operatively coupled to the imaging system, wherein the host includes a processor configured to:
        perform object detection on the compressed image data and the compressed event data to identify one or more objects;
        perform object tracking on the one or more objects;
        predict one or more regions of interest for subsequent data capture based on the object detection and the object tracking, wherein prediction of the one or more regions of interest includes a prediction of one or more first regions of interest based on the image data and a prediction of one or more second regions of interest based on the event data, and wherein the processor fuses the one or more first regions of interest and the one or more second regions of interest to form the one or more regions of interest; and
        provide the one or more regions of interest to the imaging system to control capture of additional image data and additional event data by the imaging system.

2. The system of claim 1, wherein the imaging system compresses the image data and the event data with quadtree compression.

3. The system of claim 2, wherein the imaging system performs a quadtree decomposition of the image data and the event data to form quadtree blocks as part of the quadtree compression.

4. The system of claim 3, wherein the imaging system is configured to spatially sample the event data based at least in part on a size of the quadtree blocks to provide spatial redundancy of the event data.

5. The system of claim 4, wherein the imaging system is configured to discretize timestamps corresponding to the event data to provide temporal redundancy of the event data.

6. The system of claim 2, wherein the imaging system is configured to minimize a weighted rate distortion of the event data to perform the quadtree decomposition.

7. The system of claim 6, wherein the weighted rate distortion is normalized over an area that includes at least a portion of the one or more regions of interest.

8. The system of claim 6, wherein the imaging system uses a dynamic Viterbi algorithm to minimize the weighted rate distortion of the event data.

9. The system of claim 3, wherein each of the quadtree blocks includes one or more skip modes, one or more acquire modes, and a value for each of the one or more acquire modes.

10. The system of claim 1, wherein the image data comprises distorted intensity data, and wherein the object detection is performed through a faster region-based convolutional neural network.

11. The system of claim 1, wherein the object tracking is performed with a Kalman filter based object tracker.

12. The system of claim 1, wherein the processor is further configured to perform edge reconstruction to correct distorted edges of the one or more objects.

13. The system of claim 1, wherein the one or more regions of interest provided to the imaging system are in the form of one or more bounding box locations.

14. A method of processing imaging data, the method comprising:
  capturing, by an imaging system that includes a red-green-blue camera imaging sensor and an event camera imaging sensor, image data of a scene and event data of the scene, wherein the red-green-blue camera imaging sensor captures the image data and the event camera imaging sensor captures the event data;
  compressing, by the imaging system, the image data and the event data;
  transmitting, by the imaging system, the compressed image data and the compressed event data to a host;
  performing, by a processor of the host, object detection on the compressed image data and the compressed event data to identify one or more objects;
  performing, by the processor, object tracking on the one or more objects;
  predicting one or more regions of interest for subsequent data capture based on the object detection and the object tracking, wherein predicting the one or more regions of interest includes predicting one or more first regions of interest based on the image data and predicting one or more second regions of interest based on the event data, and wherein the processor performs fusing of the one or more first regions of interest and the one or more second regions of interest to form the one or more regions of interest; and
  providing the one or more regions of interest to the imaging system to control capture of additional image data and additional event data by the imaging system.

15. The method of claim 14, wherein the compressing comprises performing a quadtree decomposition of the image data and the event data to form quadtree blocks.

16. The method of claim 15, further comprising spatially sampling the event data based at least in part on a size of the quadtree blocks to provide spatial redundancy of the event data.

17. The method of claim 15, further comprising minimizing a weighted rate distortion of the event data to perform the quadtree decomposition.

18. The method of claim 14, further comprising discretizing, by the imaging system, timestamps corresponding to the event data to provide temporal redundancy of the event data.

* * * * *